United States Patent
Kimura et al.

(10) Patent No.: US 10,424,343 B2
(45) Date of Patent: Sep. 24, 2019

(54) IMAGING DEVICE AND PLAYBACK DEVICE

(71) Applicant: CANON KABUSHIKI KAISHA, Tokyo (JP)

(72) Inventors: Masafumi Kimura, Kawasaki (JP); Yasuo Suda, Yokohama (JP); Koichi Washisu, Tokyo (JP); Akihiko Nagano, Ichihara (JP); Ryo Yamasaki, Tokyo (JP); Makoto Oikawa, Yokohama (JP); Fumihiro Kajimura, Kawasaki (JP); Go Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/845,404

(22) Filed: Dec. 18, 2017

(65) Prior Publication Data
US 2018/0158487 A1   Jun. 7, 2018

Related U.S. Application Data

(63) Continuation of application No. 15/258,564, filed on Sep. 7, 2016, now Pat. No. 9,881,648.

(30) Foreign Application Priority Data

Sep. 9, 2015 (JP) .................. 2015-177587
Jun. 23, 2016 (JP) .................. 2016-124714

(51) Int. Cl.
*G11B 27/10* (2006.01)
*H04N 1/21* (2006.01)
(Continued)

(52) U.S. Cl.
CPC ........... *G11B 27/105* (2013.01); *H04N 1/212* (2013.01); *H04N 5/23245* (2013.01);
(Continued)

(58) Field of Classification Search
None
See application file for complete search history.

(56) References Cited

U.S. PATENT DOCUMENTS 8,154,619 B2 * 4/2012 Satoh .................. H04N 5/2353
                                                348/222.1
8,698,927 B2   4/2014 Nagano
(Continued)

FOREIGN PATENT DOCUMENTS

CN     101064791 A    10/2007
CN     101064792 A    10/2007
(Continued)

OTHER PUBLICATIONS

Notification of the First Office Action issued by the China National Intellectual Property Administration on Jul. 16, 2019 in corresponding Chinese Patent Application No. 201610815188.4, with English translation.

*Primary Examiner* — James M Hannett
(74) *Attorney, Agent, or Firm* — Carter, DeLuca & Farrell LLP

(57) ABSTRACT

An imaging device includes an imaging element that acquires a first image based on signal charge generated during a first accumulation time, and a second image based on signal charge generated during a second accumulation time relatively longer than the first accumulation time and synchronized with the first image during a synchronization period including the first accumulation time, and a moving image file generating unit that generates a moving image file including a first moving image based on the first image, a second moving image based on the second image, and synchronization information for synchronizing the first moving image and the second moving image frame by frame.

11 Claims, 33 Drawing Sheets

(51) Int. Cl.
*H04N 5/232* (2006.01)
*H04N 5/77* (2006.01)
*H04N 5/92* (2006.01)
*H04N 9/804* (2006.01)
*H04N 5/355* (2011.01)
*H04N 5/3745* (2011.01)
*H04N 9/04* (2006.01)
*H04N 101/00* (2006.01)

(52) U.S. Cl.
CPC ......... *H04N 5/355* (2013.01); *H04N 5/35554* (2013.01); *H04N 5/35563* (2013.01); *H04N 5/3745* (2013.01); *H04N 5/772* (2013.01); *H04N 5/9205* (2013.01); *H04N 9/045* (2013.01); *H04N 9/8042* (2013.01); *H04N 2101/00* (2013.01)

(56) References Cited

U.S. PATENT DOCUMENTS

| | | |
|---|---|---|
| 9,451,175 B2 | 9/2016 | Kimura |
| 9,554,054 B2 | 1/2017 | Kimura |
| 2009/0109323 A1* | 4/2009 | Muraki ............... G03B 7/003 348/362 |
| 2009/0262215 A1* | 10/2009 | Sano ............... H04N 5/2353 348/229.1 |
| 2010/0201862 A1* | 8/2010 | Hatabu ............... H04N 5/3535 348/311 |
| 2011/0096216 A1* | 4/2011 | Kawai ............... G03B 7/091 348/296 |
| 2013/0248689 A1 | 9/2013 | Eldesouki |
| 2014/0027613 A1* | 1/2014 | Smith ............... H04N 5/2352 250/208.1 |
| 2014/0218575 A1* | 8/2014 | Yanai ............... H04N 5/3532 348/296 |
| 2015/0109522 A1 | 4/2015 | Kimura |
| 2017/0302023 A1 | 10/2017 | Kimura et al. |
| 2017/0347032 A1 | 11/2017 | Kajimura et al. |

FOREIGN PATENT DOCUMENTS

| | | |
|---|---|---|
| JP | 2003-125344 A | 4/2003 |
| JP | 2013172210 A | 9/2013 |
| JP | 2014-048459 A | 3/2014 |

\* cited by examiner

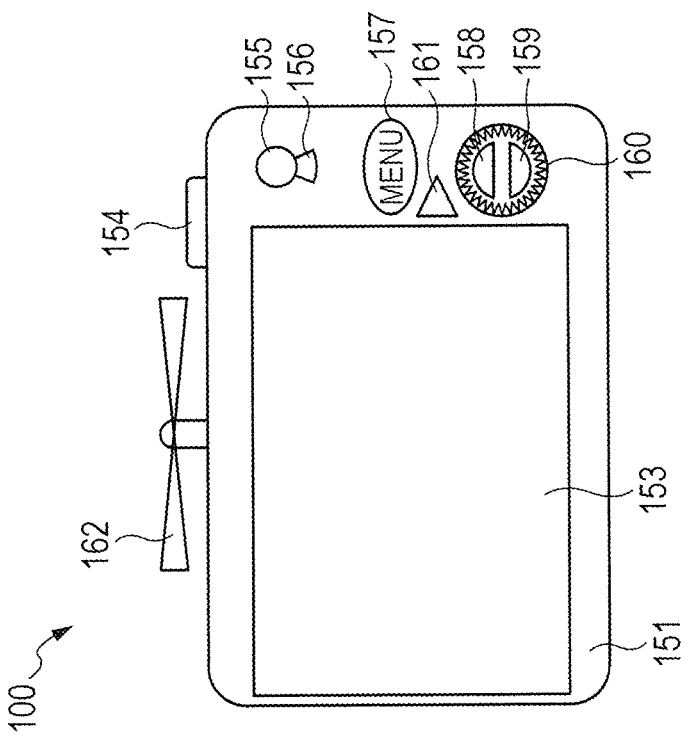
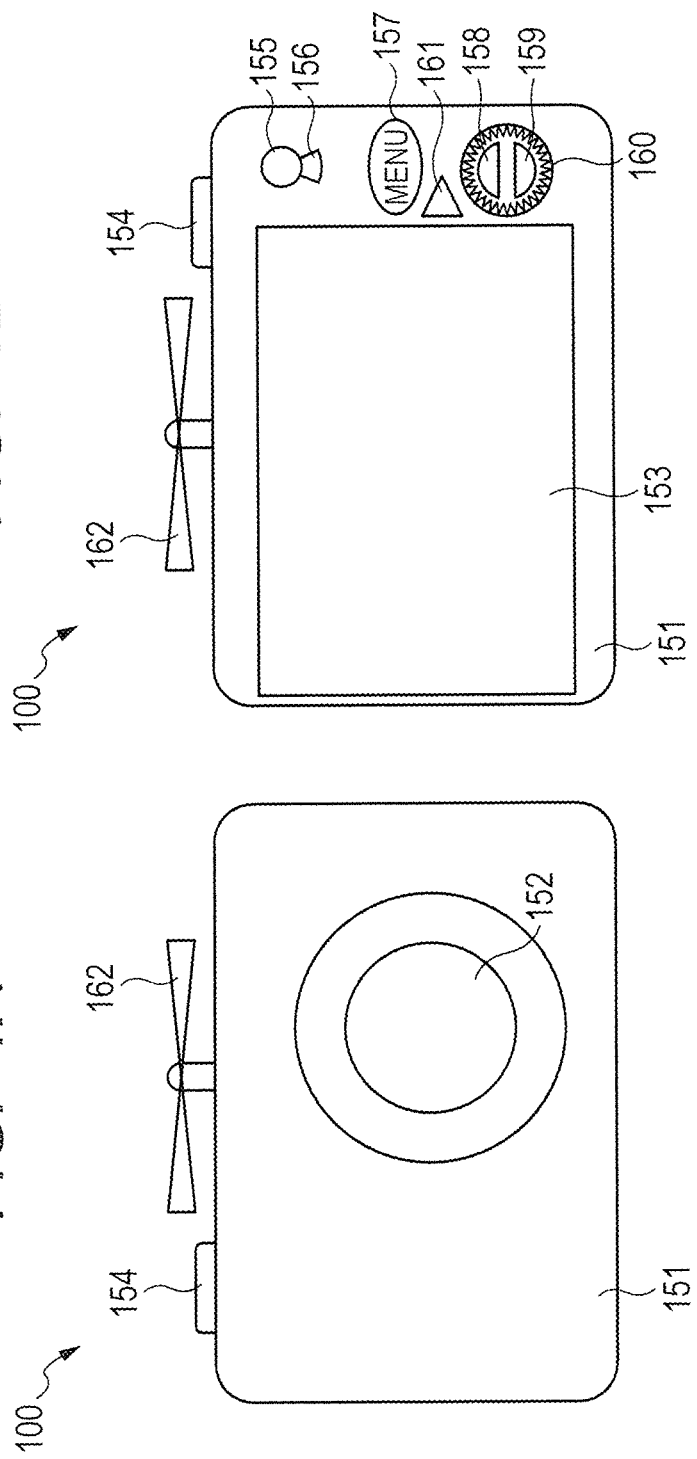
FIG. 1A
FIG. 1B

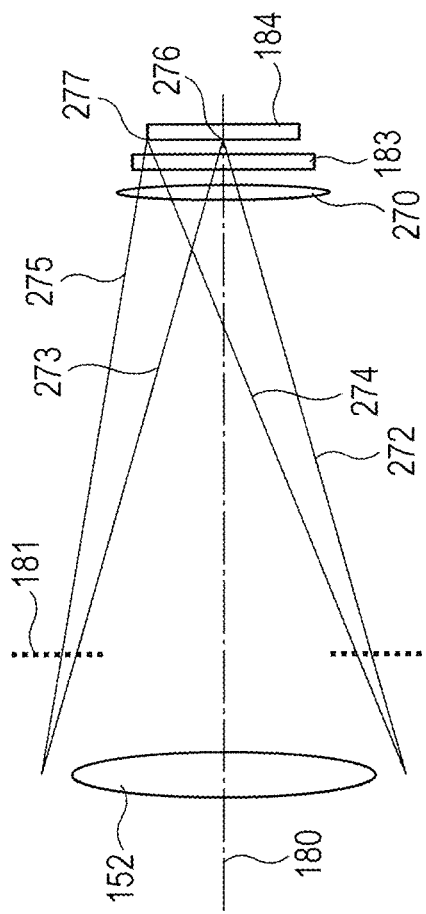
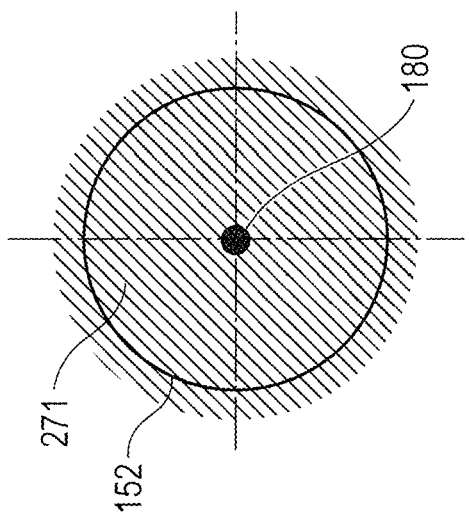
FIG. 6B
FIG. 6A

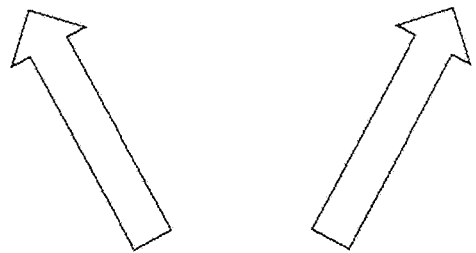

| BOX TYPE | | | | SIZE (BYTE COUNT) | DEFINITION | |
|---|---|---|---|---|---|---|
| skip | | | | | FREE SPACE | ~505 |
| | udta | | | | USER DATA | ~506 |
| | | p2dt | | | META DATA | ~507 |
| | | | clpn | 6 | CLIP NAME | ~508 |
| | | | umid | 64 | CLIP UMID | ~509 |
| | | | sttc | 8 | FIRST VALUE OF TIME CODE | ~510 |
| | | | p2sn | 20 | SERIAL NUMBER OF RECORDING MEDIUM | ~511 |

APERTURE   SHUTTER SPEED
F4.0       1/1000

APERTURE   SHUTTER SPEED
F4.0       1/60

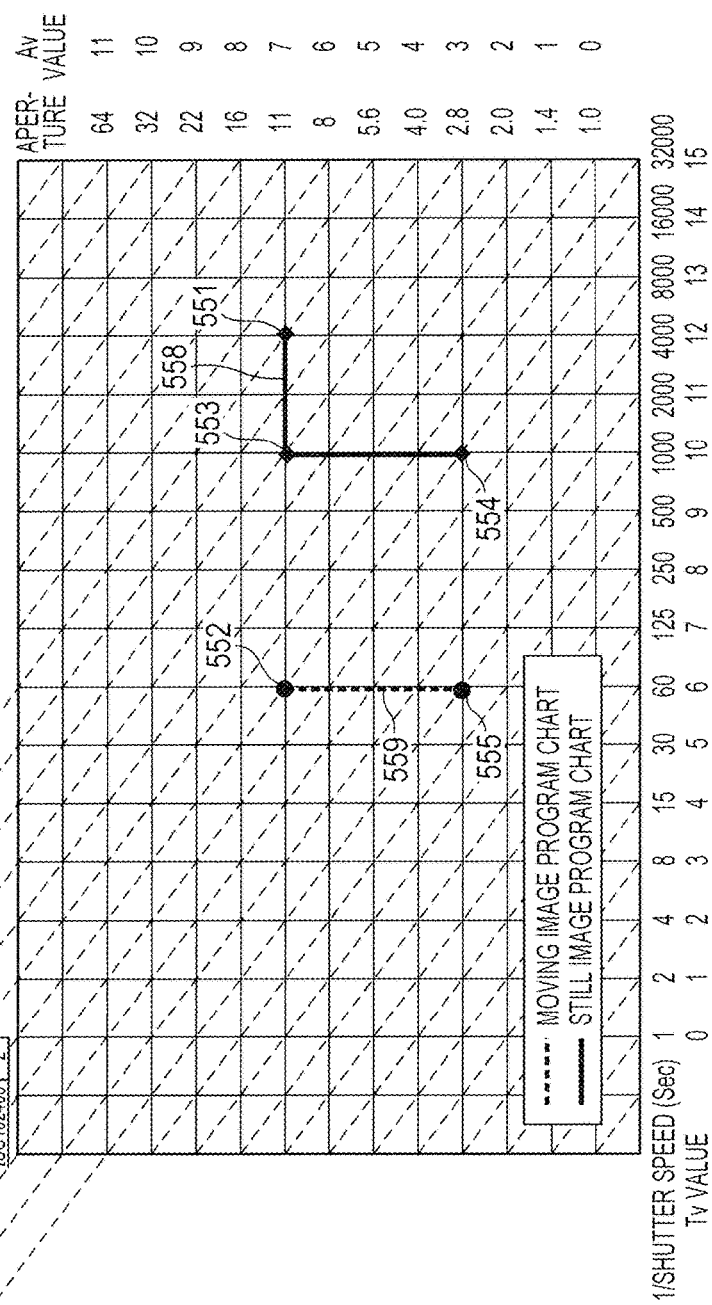
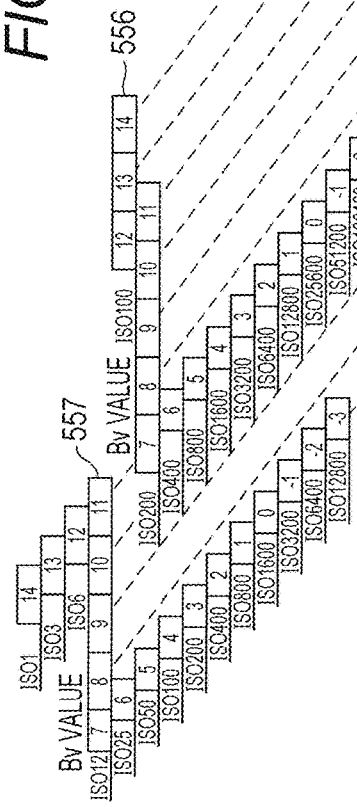
FIG. 33

IMAGING DEVICE AND PLAYBACK DEVICE

CROSS REFERENCE TO RELATED APPLICATIONS

This application is a continuation of U.S. patent application Ser. No. 15/258,564, filed on Sep. 7, 2016, which claims the benefit of and priority to Japanese Patent Application Nos. 2015-177587 and 2016-124714, filed on Sep. 9, 2015 and Jun. 23, 2016, respectively, the entire contents of each of which are hereby incorporated by reference herein in their entireties.

BACKGROUND OF THE INVENTION

Field of the Invention

The present invention relates to an imaging device having an image playback function, and a playback device.

Description of the Related Art

If a moving image and a still image can be shot at the same time with one camera, not only can a shooting scene be viewed as a moving image, but also a decisive scene in the moving image can be seen as a still image for fun. This can significantly enhance the values of shot images. Further, if a moving image at a normal frame rate and a moving image at a high frame rate can be shot at the same time with one camera, a specific scene can be switched to a slow-motion moving image to enjoy the image as a high-definition moving image. This can give a viewer an uplifting feeling.

In the meantime, when a phenomenon, so-called jerkiness, like a kind of frame-by-frame advance happens to a moving image played back, it is common that the quality of the moving image is largely degraded. In order to suppress the jerkiness, there is a need to set an accumulation time close to one frame period in a series of shooting processes. In other words, if the frame rate is 30 fps, a relatively longer accumulation time, such as 1/30 second or 1/60 second, will be adequate. Particularly, in such a situation that the attitude of a camera is instable such as a helicopter shot, this setting is important.

On the other hand, since a still image is required to have the sharpness of shooting a moment, there is a need to set a short accumulation time, for example, about 1/1000 second, in order to obtain a stop motion effect. Further, in the case of a moving image at a high frame rate, one frame period is short. Therefore, for example, when the frame rate is 120 fps, a short accumulation time such as 1/125 second or 1/250 second is inevitably set.

Shooting two images at the same time through a single photographic lens, such as a moving image and a still image, or a moving image at a normal frame rate and a moving image at a high frame rate, means that the aperture values used to shooting these images are the same. Even in this case, it is desired that similar levels of signal charge should be obtained in an imaging element while shooting two images in different accumulation time settings to obtain noiseless images having excellent S/N ratios.

Japanese Patent Application Laid-Open No. 2014-048459 discloses an imaging device including a pair of photodiodes having the shape of pupils asymmetric with respect to each pixel. In the imaging device described in Japanese Patent Application Laid-Open No. 2014-048459, the light-receiving efficiency of one of the pair of photodiodes is high and the light-receiving efficiency of the other photodiode is low. Two signals from the pair of photodiodes are used as separate pieces of image data so that the two images can be shot at the same time.

Further, Japanese Patent Application Laid-Open No. 2003-125344 discloses an imaging device that shoots a high-resolution image (an image having a quality enough for viewing as a still image) during moving image shooting, and a method of processing the shot image. Japanese Patent Application Laid-Open No. 2003-125344 teaches that images are reproduced up to a predetermined resolution (high-resolution images up to the same resolution as the moving image) by a progressive method during moving image playback to enable viewing as a moving image, while the high-resolution image is extracted and transferred as a still image in the case of a still image application.

Although such an imaging device capable of shooting two images at the same time as described in Japanese Patent Application Laid-Open No. 2014-048459 can be expected to improve convenience by presenting two images properly, there is no specific mention on a useful presentation method.

Further, Japanese Patent Application Laid-Open No. 2003-125344 does not present a preferred playback mode of switching between the moving image and the still image at arbitrary times.

SUMMARY OF THE INVENTION

It is an object of the present invention to provide an imaging device capable of acquiring images suitable for viewing of both a moving image and a still image, and a playback device capable of presenting the acquired images properly.

According to one aspect of the present invention, there is provided an imaging element that acquires a first image based on signal charge generated during a first accumulation time, and a second image based on signal charge generated during a second accumulation time relatively longer than the first accumulation time and recorded in synch with the first image during a synchronization period including the first accumulation time, and a moving image file generating unit that generates a moving image file including a first moving image based on the first image, a second moving image based on the second image, and synchronization information for synchronizing the first moving image and the second moving image frame by frame.

According to another aspect of the present invention, there is provided a playback device including a playback unit that playbacks a moving image file captured by an imaging device that acquires a first image based on signal charge generated during a first accumulation time, and a second image based on signal charge generated during a second accumulation time relatively longer than the first accumulation time and recorded in synch with the first image during a synchronization period including the first accumulation time, wherein the playback unit includes as modes of playbacking the moving image file a first presentation mode without any change in presented image with time, and a second presentation mode to change the presented image with time, wherein a first moving image based on the first image is selected from the moving image file and presented in the first presentation mode, and a second moving image based on the second image is selected from the moving image file and presented in the second presentation mode.

According to still another aspect of the present invention, there is provided a playback method of playbacking a moving image file shot with an imaging device that acquires a first image based on signal charge generated during a first accumulation time, and a second image based on signal charge generated during a second accumulation time relatively longer than the first accumulation time and recorded in synch with the first image during a synchronization period including the first accumulation time, the method including selecting and presenting a first moving image based on the first image from the moving image file according to a playback instruction in a first presentation mode without any change in presented image with time, and selecting and presenting a second moving image based on the second image from the moving image file according to a playback instruction in a second presentation mode to change the presented image with time.

Further features of the present invention will become apparent from the following description of exemplary embodiments with reference to the attached drawings.

BRIEF DESCRIPTION OF THE DRAWINGS

FIG. 1A and FIG. 1B are external views of an imaging device according to a first embodiment of the present invention.

FIG. 6A and FIG. 6B are diagrams illustrating the relationship between a photographing optical system and the imaging element in the imaging device according to the first embodiment of the present invention.

FIG. 7A, FIG. 7B, and FIG. 7C are schematic diagrams for describing image signals output from the imaging element.

FIG. 33 is a program AE chart in a dual image mode of the imaging device according to the third embodiment of the present invention.

DESCRIPTION OF THE EMBODIMENTS

Figure 2:
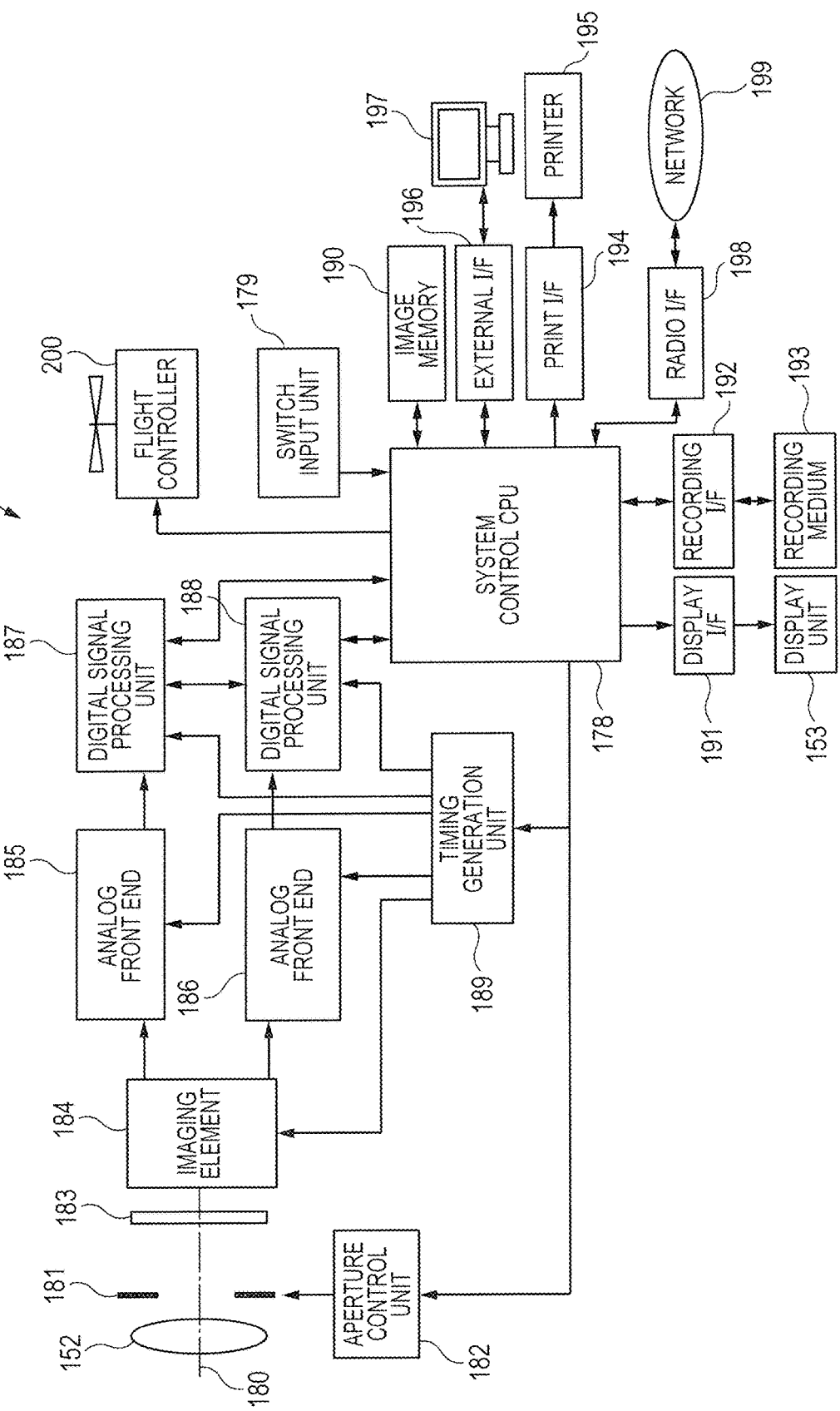
FIG. 2 is a block diagram illustrating a schematic configuration of the imaging device according to the first embodiment of the present invention.

Preferred embodiments of the present invention will now be described in detail in accordance with the accompanying drawings.

First Embodiment

An imaging device according to a first embodiment of the present invention will be described with reference to FIG. 1A to FIG. 30. In the present embodiment, description will be made by taking, as an example of a preferred embodiment of the present invention, an imaging device including an imaging element, a photographing optical system, and the like for imaging, and an image playback device. Note that the image playback device is not necessarily required to be part of the imaging device, and it may be configured in hardware different from that of the imaging element and the photographing optical system. Further, the overall or part of the function of the image playback device may be included in the imaging element.

FIG. 1A and FIG. 1B are external views of a digital still motion camera as an example of the imaging device according to the present embodiment. FIG. 1A illustrates a front view and FIG. 1B illustrates a back view.

An imaging device 100 according to the present embodiment includes a housing 151, a photographing optical system 152 provided in a front portion of the housing 151, and a switch ST 154 and a propeller 162 provided on the top face of the housing 151. The imaging device 100 also includes, on the back side of the housing 151, a display unit 153, a switch MV 155, a shooting mode selecting lever 156, a menu button 157, up and down switches 158, 159, a dial 160, and a playback button 161.

The housing 151 is a case for housing various functional parts, such as the imaging element, a shutter, and the like, which constitute the imaging device 100. The photographing optical system 152 is an optical system for forming an optical image of an object. The display unit 153 is configured to include a display for displaying photographic information and an image. A movable mechanism may be provided in the display unit 153 to angle a screen as necessary. The display unit 153 has a display brightness range capable of displaying an image having a wide dynamic range without suppressing the brightness range of the image. The switch ST 154 is a shutter button mainly used to shoot a still image. The switch MV 155 is a button used to start or stop moving image shooting. The shooting mode selecting lever 156 is a selector switch for selecting a shooting mode. The menu button 157 is a button to move to a function setting mode for setting the function of the imaging device 100. The up and down switches 158, 159 are buttons used to change various set values. The dial 160 is a dial for changing various set values. The playback button 161 is a button to move to a playback mode for playbacking, on the display unit 153, an image recorded on a recording medium housed in the imaging device 100. The propeller 162 is to make the imaging device 100 float in the air in order to take images from the air.

FIG. 2 is a block diagram illustrating a schematic configuration of the imaging device 100 according to the present embodiment. As illustrated in FIG. 2, the imaging device 100 includes an aperture 181, an aperture control unit 182, an optical filter 183, an imaging element 184, analog front ends 185, 186, digital signal processing units 187, 188, and a timing generation unit 189. The imaging device 100 also includes a system control CPU 178, a switch input unit 179, an image memory 190, and a flight controller 200. Further, the imaging device 100 includes a display interface unit 191, a recording interface unit 192, a recording medium 193, a print interface unit 194, an external interface unit 196, and a radio interface unit 198.

The imaging element 184 is to convert an optical image of an object formed through the photographing optical system 152 into an electrical image signal. Though not particularly limited, the imaging element 184 includes the number of pixels, the signal readout rate, the color gamut, and the dynamic range enough to meet a standard such as the UHDTV (Ultra High Definition Television) standard. The aperture 181 is to adjust the amount of light passing through the photographing optical system 152. The aperture control unit 182 is a circuit or a processor configured to control the aperture 181. The optical filter 183 is to limit the wavelength of light incident on the imaging element 184 and the spatial frequency to be transmitted to the imaging element 184. The photographing optical system 152, the aperture 181, the optical filter 183, and the imaging element 184 are disposed on an optical axis 180 of the photographing optical system 152.

The analog front ends 185, 186 are a circuit or a processor configured to perform analog signal processing and analog-digital conversion processing of an image signal output from the imaging element 184. Each of the analog front ends 185, 186 is, for example, composed of a correlated double sampling (CDS) circuit for removing noise, an amplifier for adjusting signal gain, an A/D converter for converting an analog signal to a digital signal, and the like. The digital signal processing units 187, 188 are to compress image data after making various corrections to digital image data output from the analog front ends 185, 186. The corrections made by the digital signal processing units 187, 188 include crosstalk correction to be described later. The timing generation unit 189 is a circuit or a processor configured to output various timing signals to the imaging element 184, the analog front ends 185, 186, and the digital signal processing units 187, 188. The system control CPU 178 is a control unit for carrying out various operations and performing overall control of the imaging device 100. The image memory 190 is to temporarily store image data.

The display interface unit 191 is an interface between the system control CPU 178 and the display unit 153 to display a shot image in the display unit 153. The recording medium 193 is a recording medium such as a semiconductor memory to record image data, additional data, and the like, which may be equipped in the imaging device 100 or be removable. The recording interface unit 192 is an interface between the system control CPU 178 and the recording medium 193 to perform recording on the recording medium 193 or reading from the recording medium 193. The external interface unit 196 is an interface between the system control CPU 178 and an external device to communicate with the external device such as an external computer 197. The print interface unit 194 is an interface between the system control CPU 178 and a printer 195 to output a shot image to the printer 195 such as a small ink-jet printer in order to print out the shot image. The radio interface unit 198 is an interface between the system control CPU 178 and a network 199 such as the Internet to communicate with the network 199. The switch input unit 179 includes plural switches to switch various modes, such as the switch ST 154 and the switch MV 155. The flight controller 200 is a controller to control the propeller 162 so as to fly the imaging device 100 in order to do shooting from the air.

In an imaging device including an image playback device like the imaging device 100 described in the present embodiment, shot image data can be playbacked using the display unit 153 or an external monitor. During the playback of the image data, the image data and additional data are read out from the recording medium 193. The readout data are demodulated in the digital signal processing units 187, 188 according to an instruction from the system control CPU 178 to be presented as an image in the display unit 153 through the display interface unit 191. A user can operate an operation part (the menu button 157, the up and down switches 158, 159, the dial 160, and the like) provided on the back side of the imaging device 100 to control the operation during playback. The user operations include the playback, stop, and pause of a moving image.

Figure 3:
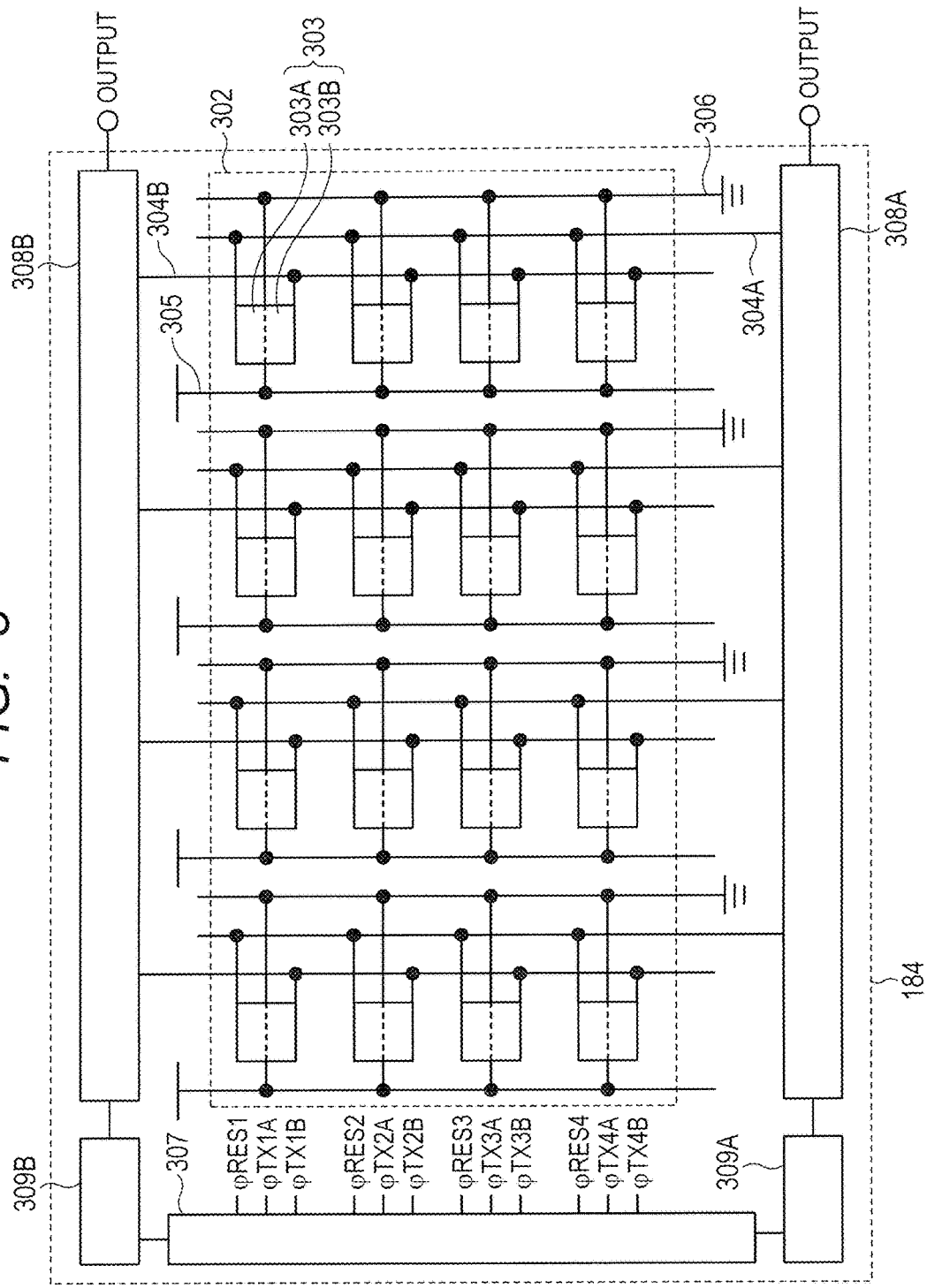
FIG. 3 is a block diagram illustrating a configuration example of an imaging element of the imaging device according to the first embodiment of the present invention.

FIG. 3 is a block diagram illustrating a configuration example of the imaging element 184. As illustrated in FIG. 3, the imaging element 184 includes a pixel array 302, a vertical scanning circuit 307, readout circuits 308A, 308B, and timing control circuits 309A, 309B.

In the pixel array 302, a plurality of pixels 303 are arranged in the shape of a matrix. Although the actual number of pixels 303 belonging to the pixel array 302 is generally enormous, only 16 pixels 303 arranged in a 4×4 matrix are illustrated here for the sake of simplifying the figure. Each of the plurality of pixels 303 includes a pair of a pixel element 303A and a pixel element 303B. In FIG. 3, the upper half area of the pixel 303 is the pixel element 303A, and the lower half area of the pixel 303 is the pixel element 303B. The pixel element 303A and the pixel element 303B generate signals by photoelectric conversion, respectively.

Signal output lines 304A, 304B extending in the column direction are provided in each column of the pixel array 302, respectively. The signal output line 304A in each column is connected to the pixel elements 303A belonging to the column. Signals from the pixel elements 303A are output to the signal output line 304A. The signal output line 304B in each column is connected to the pixel elements 303B belonging to the column. Signals from the pixel elements 303B are output to the signal output line 304B. Further, in each column of the pixel array 302, a power source line 305 and a ground line 306 extending in the column direction are provided, respectively. The power source line 305 and the ground line 306 in each column are connected to the pixels 303 belonging to the column. The power source line 305 and the ground line 306 may also be signal lines extending in the row direction.

The vertical scanning circuit 307 is arranged adjacent to the pixel array 302 in the row direction. The vertical scanning circuit 307 outputs predetermined control signals to the plurality of pixels 303 of the pixel array 302 in units of rows through unillustrated control lines arranged to extend in the row direction in order to control readout circuits in the pixels 303. In FIG. 3, a reset pulse φRESn and transfer pulses φTXnA, φTXnB are illustrated as control signals (where n is an integer corresponding to each row number).

The readout circuits 308A, 308B are arranged adjacent to the pixel array 302 in the column direction to sandwich the pixel array 302 therebetween. The readout circuit 308A is connected to the signal output line 304A in each column. The readout circuit 308A selectively activates the signal output line 304A in each column sequentially to read signals from the signal output line 304A in each column in a sequential order and perform predetermined signal processing. Similarly, the readout circuit 308B is connected to the signal output line 304B in each column. The readout circuit 308B selectively activates the signal output line 304B in each column sequentially to read signals from the signal output line 304B in each column in a sequential order and perform predetermined signal processing. Each of the readout circuits 308A, 308B can include a noise cancellation circuit, an amplifier circuit, an analog/digital converter circuit, and a horizontal scanning circuit, respectively, to output signals after being subjected to the predetermined signal processing sequentially.

The timing control circuit 309A is connected to the vertical scanning circuit 307 and the readout circuit 308A. The timing control circuit 309A outputs a control signal to control the drive timing of the vertical scanning circuit 307 and the readout circuit 308A. The timing control circuit 309B is connected to the vertical scanning circuit 307 and the readout circuit 308B. The timing control circuit 309B outputs a control signal to control the drive timing of the vertical scanning circuit 307 and the readout circuit 308B.

Figure 4:
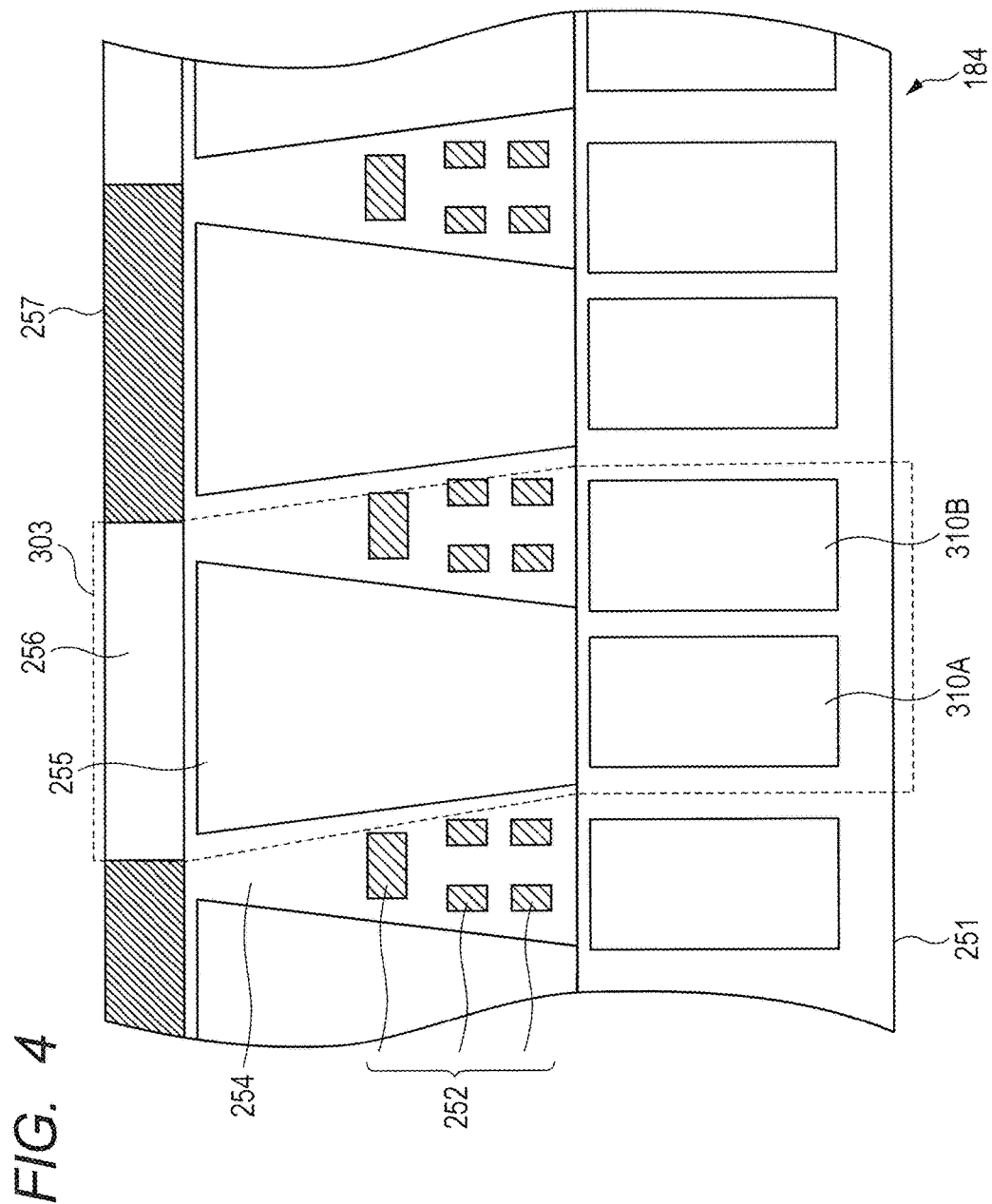
FIG. 4 is a cross-sectional view illustrating the internal structure of the imaging element in the imaging device according to the first embodiment of the present invention.

FIG. 4 is a cross-sectional view illustrating the internal structure of each pixel 303 of the imaging element 184. As illustrated in FIG. 4, each pixel 303 includes two photodiodes 310A, 310B, a light guide 255, and a color filter 256. The photodiode 310A forms part of the pixel element 303A and the photodiode 310B forms part of the pixel element 303B. The photodiodes 310A, 310B are provided in a silicon substrate 251. The light guide 255 is provided in an insulating layer 254 provided over the silicon substrate 251. The insulating layer 254 is, for example, made of silicon oxide, and the light guide 255 is made of a material having a higher refractive index than the insulating layer 254 such as silicon nitride. Interconnection layers 252 are provided in the insulating layer 254 between adjacent light guides 255. The color filter 256 having predetermined spectral transmittance characteristics is provided over the light guide 255. Note that FIG. 4 illustrates an example in which color filters of adjacent two pixels 303 are color filters 256, 257 having spectral transmittance characteristics different from each other.

The light guide 255 has the property of confining light therein due to a refractive index difference from the insulating layer 254. This enables the light guide 255 to guide light incident through the color filter 256 to the photodiodes 310A, 310B. The photodiodes 310A, 310B are arranged asymmetric with respect to the light guide 255, and a light flux propagating through the light guide 255 enters the photodiode 310A with relatively high efficiency and enters the photodiode 310B with relatively low efficiency. Further, the depth and inclined angle of the light guide 255 can be adjusted to prevent nonuniformity in the incident angle characteristics of incident light flux capable of being converted photoelectrically by the photodiodes 310A, 310B effectively.

Figure 5:
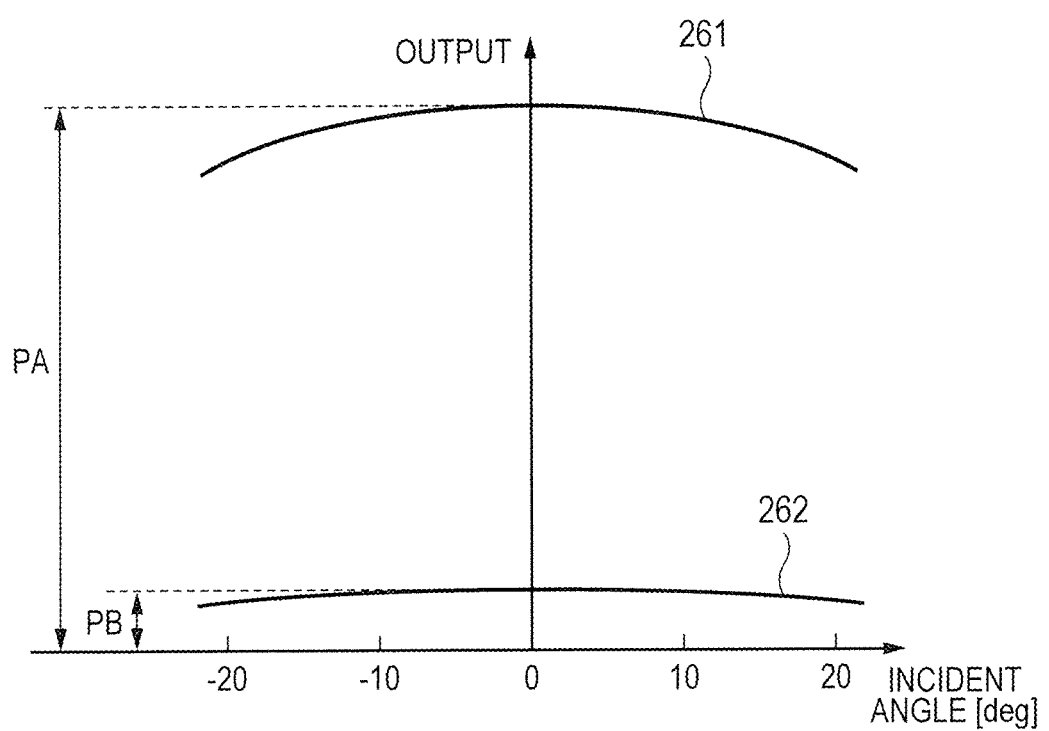
FIG. 5 is a graph illustrating a relationship between the angle of a light beam incident on a pixel and output from photodiodes.

FIG. 5 is a graph illustrating a relationship between the angle of a light beam incident on a pixel and output from photodiodes. In FIG. 5, the abscissa represents the angle of the light beam incident on the pixel, and the ordinate represents output from the photodiodes. In FIG. 5, an output characteristic 261 from the photodiode 310A and an output characteristic 262 from the photodiode 310B are illustrated.

As illustrated in FIG. 5, the characteristic 261 and the characteristic 262 both exhibit gentle hill-like shapes symmetric about peaks, each of which the incident angle of the light beam is zero. The peak intensity PB of the characteristic 262 is about ⅛ of the peak intensity PA of the characteristic 261. This means that the dependences of the photodiodes 310A, 310B on the incident angle are both small and the light-receiving efficiency of the photodiode 310B is ⅛ of that of the photodiode 310A. In other words, when the sensitivity of the photodiode 310B is replaced by a set value of the ISO sensitivity, the sensitivity of the photodiode 310B becomes lower by three steps than that of the photodiode 310A.

Next, a relationship between the photographing optical system 152 and the imaging element 184 will be described more specifically with reference to FIG. 6A and FIG. 6B. FIG. 6A and FIG. 6B are diagrams for describing the relationship between the photographing optical system 152 and the imaging element 184. FIG. 6A is a diagram when the photographing optical system 152 is viewed from a direction along an optical axis 180. FIG. 6B is a diagram more specifically illustrating a section from the photographing optical system 152 to the imaging element 184 in FIG. 2.

As illustrated in FIG. 6B, it is assumed that the imaging element 184 includes a pixel 276 located in a central portion of the imaging area and a pixel 277 located near the outer edge of the imaging area. In this case, the pixel 276 can receive a light flux from an area surrounded by a light beam 272 and a light beam 273. The pixel 277 can receive a light flux from an area surrounded by a light beam 274 and a light beam 275. On this occasion, since a field lens 270 is arranged between the optical filter 183 and the photographing optical system 152, the light flux received by the pixel 276 and the light flux received by the pixel 277 are overlapped near the photographing optical system 152 as indicated by an area 271 in FIG. 6A. As a result, both of the pixels can receive the light flux emitted from the photographing optical system 152 with high efficiency.

FIG. 7A to FIG. 7C are schematic diagrams for describing image signals output from the imaging element. Suppose here that color filters having predetermined optical transmittance characteristics are arranged over the pixel array 302 in the layout of a color filter array 281 illustrated in FIG. 7A. FIG. 7A schematically illustrates the pixel array 302 with the pixels 303 arranged in a matrix with six rows and eight columns, and the colors of color filters arranged on respective pixels. In FIG. 7A, R denotes a red color filter, G1 and G2 denote green color filters, and B denotes a blue color filter, respectively. The illustrated color filter array 281 is a color filter array, a so-called Bayer array, where color filters of respective colors are arranged repeatedly in each row like G1BG1B . . . , RG2RG2 . . . , G1BG1B . . . , and so on.

Output data 282, 283 illustrated in FIG. 7B and FIG. 7C are obtained from the pixel array 302 having such a color filter array 281. In FIG. 7B, g1A and g2A represent output from pixel elements 303A of the pixels 303 with the green color filters arranged thereon. bA represents output from pixel elements 303A of the pixels 303 with the blue color filter arranged thereon. rA represents output from pixel elements 303A of the pixels 303 with the red color filter arranged thereon. In FIG. 7C, g1B and g2B represent output from pixel elements 303B of the pixels 303 with the green color filters arranged thereon. bB represents output from pixel elements 303B of the pixels 303 with the blue color filter arranged thereon. rB represents output from pixel elements 303B of the pixels 303 with the red color filter arranged thereon.

As described with reference to FIG. 3, two types of output from the readout circuits 308A, 308B can be obtained from the imaging element 184. One type of output is the output data 282 illustrated in FIG. 7B, and the other type of output is the output data 283 illustrated in FIG. 7C. The output data 282 are subjected to predetermined signal processing to generate an image signal "picture A." The output data 283 are subjected to predetermined signal processing to generate an image signal "picture B." In the following description, the image signal based on the output data 282 is referred to as "picture A," and the image signal based on the output data 283 is referred to as "picture B." Although the "picture A" and "picture B" are image signals after being subjected to a predetermined correction in a precise sense, image signals before or during the correction may also be referred to as the "picture A" and "picture B" for the purpose of illustration.

Figure 8:
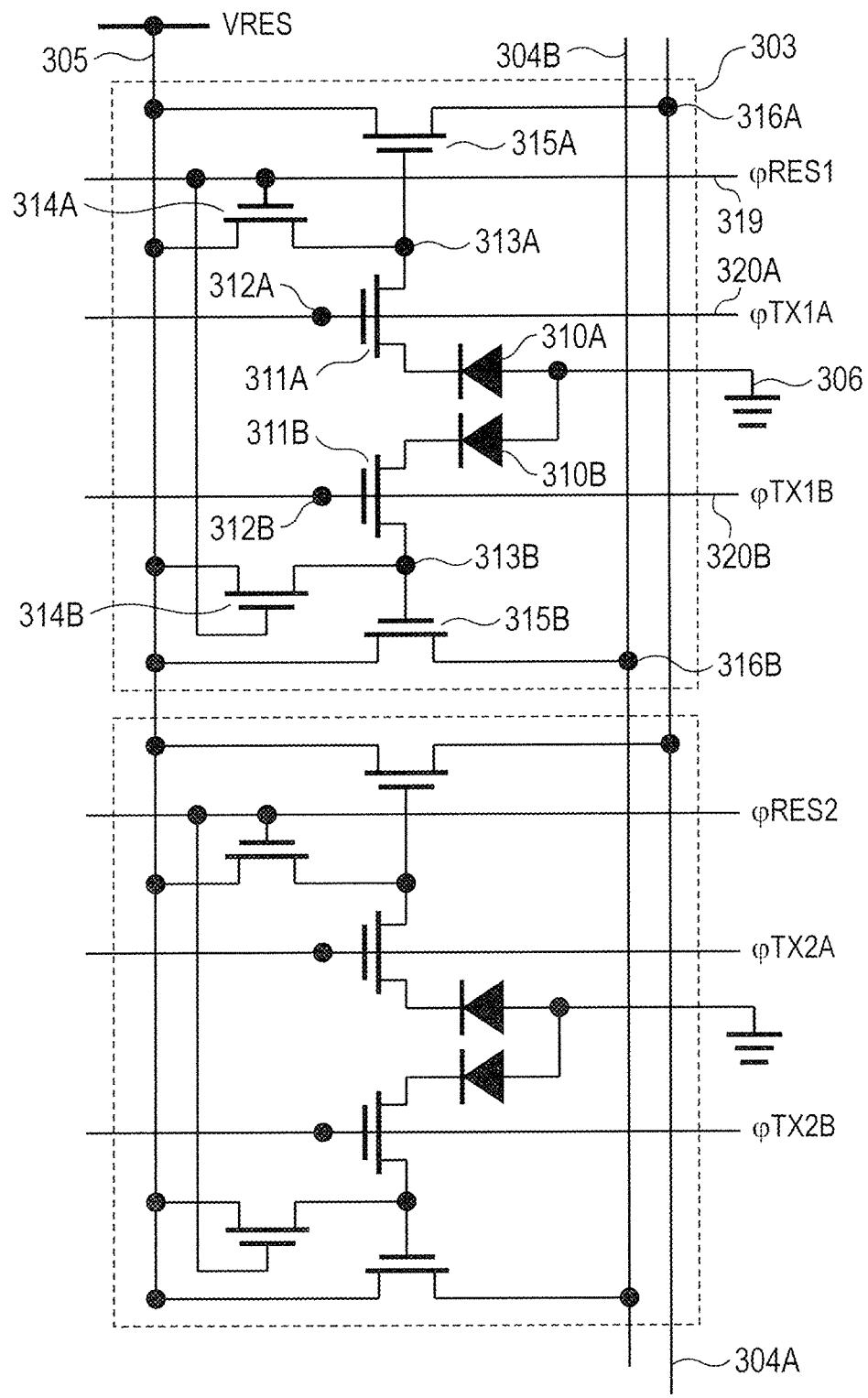
FIG. 8 is a circuit diagram illustrating a configuration example of each pixel of the imaging element of the imaging device according to the first embodiment of the present invention.

FIG. 8 is a circuit diagram illustrating a configuration example of each pixel 303. As mentioned above, the pixel 303 includes the pixel element 303A and the pixel element 303B. The pixel element 303A includes the photodiode 310A, a transfer transistor 311A, a floating diffusion region 313A, a reset transistor 314A, and an amplifier transistor 315A. The pixel element 303B includes the photodiode 310B, a transfer transistor 311B, a floating diffusion region 313B, a reset transistor 314B, and an amplifier transistor 315B. Note that the photodiode 310A corresponds to the photodiode 310A illustrated in FIG. 4, and the photodiode 310B corresponds to the photodiode 310B illustrated in FIG. 4.

The anode of the photodiode 310A is connected to the ground line 306, and the cathode of the photodiode 310A is connected to the source of the transfer transistor 311A. The drain of the transfer transistor 311A is connected to the source of the reset transistor 314A and the gate of the amplifier transistor 315A. A connection node of the drain of the transfer transistor 311A, the source of the reset transistor 314A, and the gate of the amplifier transistor 315A forms the floating diffusion region 313A. The drain of the reset transistor 314A and the drain of the amplifier transistor 315A are connected to the power source line 305. The source of the amplifier transistor 315A that forms a pixel signal output part 316A is connected to the signal output line 304A.

Similarly, the anode of the photodiode 310B is connected to the ground line 306, and the cathode of the photodiode 310B is connected to the source of the transfer transistor 311B. The drain of the transfer transistor 311B is connected to the source of the reset transistor 314B and the gate of the amplifier transistor 315B. A connection node of the drain of the transfer transistor 311B, the source of the reset transistor 314B, and the gate of the amplifier transistor 315B forms the floating diffusion region 313B. The drain of the reset transistor 314B and the drain of the amplifier transistor 315B are connected to the power source line 305. The source of the amplifier transistor 315B that forms a pixel signal output part 316B is connected to the signal output line 304B.

The pixels 303 in each row are connected to a reset control line 319 and transfer control lines 320A, 320B arranged in the row direction from the vertical scanning circuit 307. The reset control line 319 is connected to the gate of the reset transistor 314A and the gate of the reset transistor 314B. The transfer control line 320A is connected to the gate of the transfer transistor 311A via a contact part 312A. The transfer control line 320B is connected to the gate of the transfer transistor 311B via a contact part 312B. The reset control line 319 supplies the reset pulse φRESn, output from the vertical scanning circuit 307, to the gate of the reset transistor 314A and the gate of the reset transistor 314B. The transfer control line 320A supplies the transfer pulse φTXnA, output from the vertical scanning circuit 307, to the gate of the transfer transistor 311A. The transfer control line 320B supplies the transfer pulse φTXnB, output from the vertical scanning circuit 307, to the gate of the transfer transistor 311B. Note that n attached to the reset pulse φRESn, the transfer pulse φTXnA, and the transfer pulse φTXnB is an integer corresponding to the row number. In FIG. 8, n is replaced by an integer corresponding to the row number.

The photodiode 310A is a first photoelectric conversion unit that generates electric charge by photoelectric conversion, and the photodiode 310B is a second photoelectric conversion unit that generates electric charge by photoelectric conversion. The floating diffusion regions 313A, 313B are regions to accumulate electric charge. The transfer transistor 311A transfers, to the floating diffusion region 313A, the electric charge generated by the photodiode 310A. The transfer transistor 311B transfers, to the floating diffusion region 313B, the electric charge generated by the photodiode 310B.

When a high-level transfer pulse φTXnA is output from the vertical scanning circuit 307, the transfer transistor 311A is turned on to connect the photodiode 310A and the floating diffusion region 313A. Similarly, when a high-level transfer pulse φTXnB is output from the vertical scanning circuit 307, the transfer transistor 311B is turned on to connect the photodiode 310B and the floating diffusion region 313B. When a high-level reset pulse φRESn is output from the vertical scanning circuit 307, the reset transistors 314A, 314B are turned on to reset the photodiodes 310A, 310B, and the floating diffusion regions 313A, 313B.

When a low-level transfer pulse φTXnA is output from the vertical scanning circuit 307, the transfer transistor 311A is turned off to cause the photodiode 310A to start accumulating signal charge generated by the photoelectric conversion. After that, when the high-level transfer pulse φTXnA is output from the vertical scanning circuit 307, the transfer transistor 311A is turned on to transfer the signal charge of the photodiode 310A to the floating diffusion region 313A. Then, the amplifier transistor 315A amplifies and outputs, to the signal output line 304A, the voltage of the floating diffusion region 313A according to the amount of signal charge transferred from the photodiode 310A.

Similarly, when a low-level transfer pulse φTXnB is output from the vertical scanning circuit 307, the transfer transistor 311B is turned off to cause the photodiode 310B to start accumulating signal charge generated by the photoelectric conversion. After that, when the high-level transfer pulse φTXnB is output from the vertical scanning circuit 307, the transfer transistor 311B is turned on to transfer the signal charge of the photodiode 310B to the floating diffusion region 313B. Then, the amplifier transistor 315B amplifies and outputs, to the signal output line 304B, the voltage of the floating diffusion region 313B according to the amount of signal charge transferred from the photodiode 310B.

Figure 9:
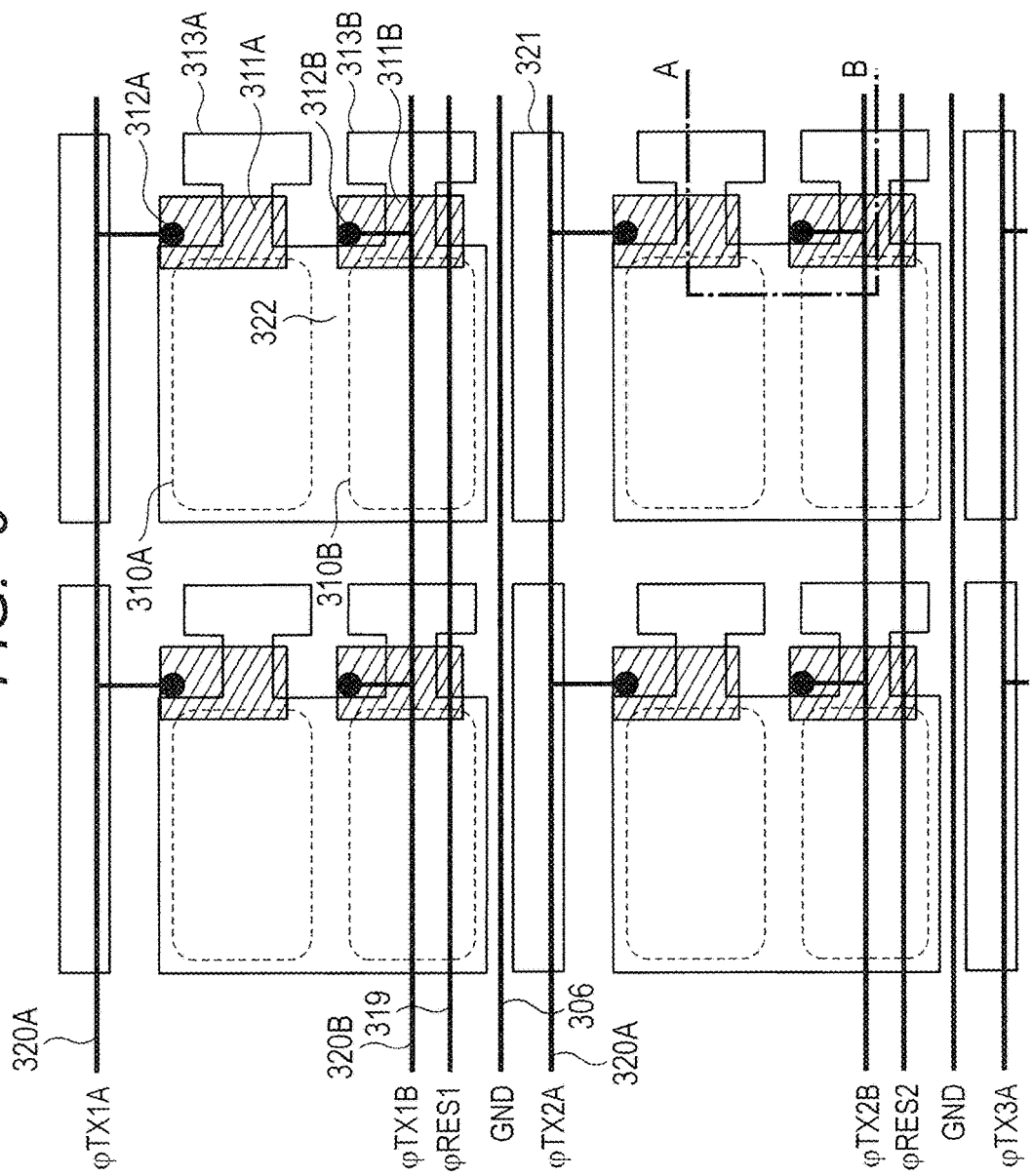
FIG. 9 and FIG. 10 are planar layout diagrams illustrating the main part of each pixel of the imaging element of the imaging device according to the first embodiment of the present invention.
Figure 10:
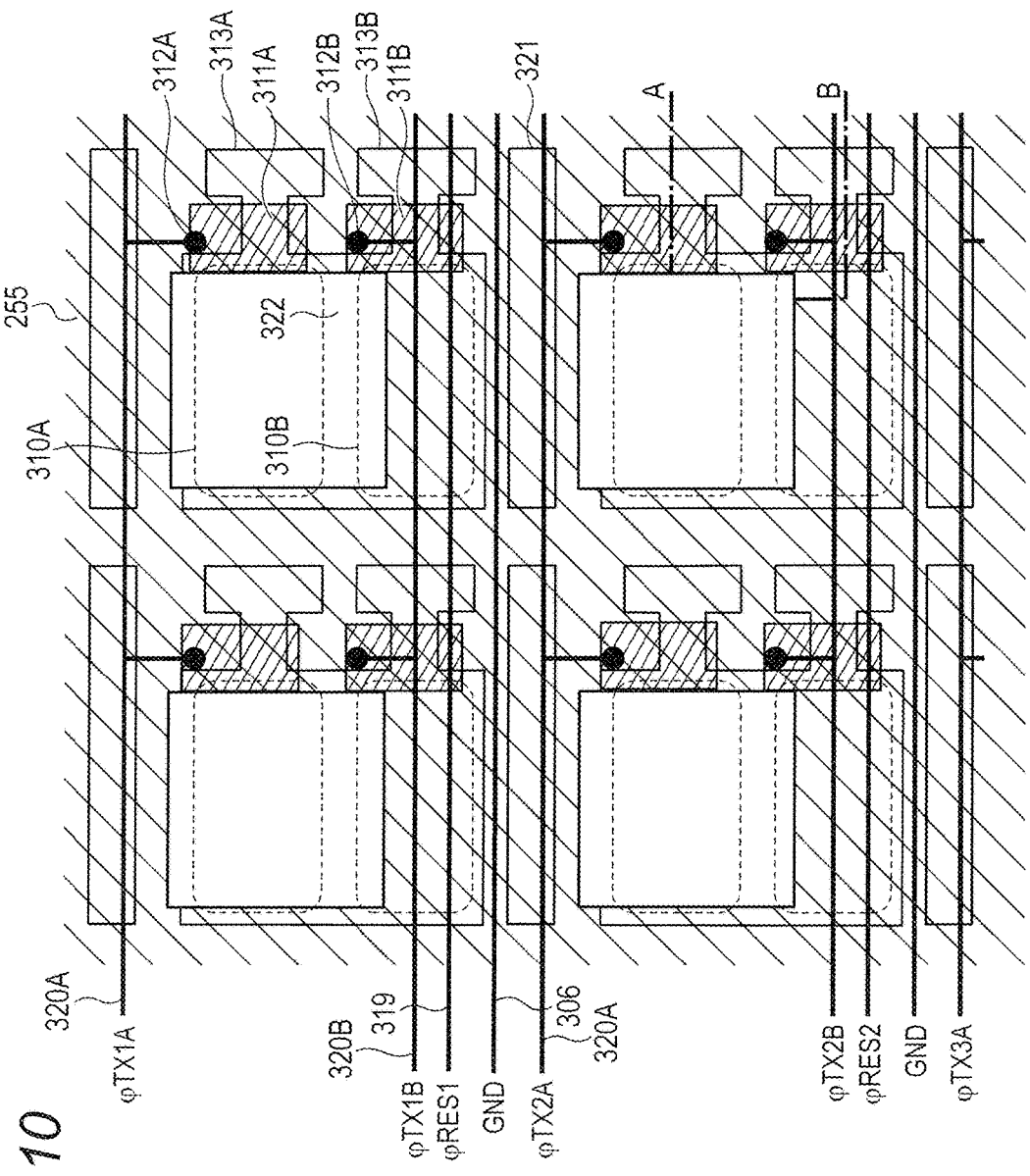

FIG. 9 and FIG. 10 are planar layout diagrams illustrating the main part of each pixel 303. Among the constituent elements of the pixel 303, the photodiodes 310A, 310B, the transfer transistors 311A, 311B, and the floating diffusion regions 313A, 313B are illustrated in FIG. 9. The other circuit elements including the reset transistors 314A, 314B and the amplifier transistors 315A, 315B are represented as a readout circuit part 321 in FIG. 9 to omit detailed illustration. Further, the signal output lines 304A, 304B, and the power source line 305 arranged in the vertical direction of the pixel 303 are omitted, and the contact parts of the reset control line 319, the power source line 305, and the ground line 306 are omitted. In addition to the constituent elements illustrated in FIG. 9, the light guide 255 described with reference to FIG. 4 is illustrated in FIG. 10. In the light guide 255, the shaded area indicates a low refractive index area and the outlined blank area indicates a high refractive index area, namely a light guiding area.

In FIG. 9 and FIG. 10, the contact part 312A is a contact part to connect the transfer control line 320A and the gate of the transfer transistor 311A. The contact part 312B is a contact part to connect the transfer control line 320B and the gate of the transfer transistor 311B. Each of the photodiodes 310A, 310B is a photoelectric conversion unit that performs the photoelectric conversion, having a first conductivity-type (e.g., p-type) semiconductor region and a second conductivity-type (e.g., n-type) semiconductor region (n-type electron accumulation region) to form a p-n junction with the first conductivity-type semiconductor region. The second conductivity-type semiconductor region of the photodiode 310A and the second conductivity-type semiconductor region of the photodiode 310B are isolated by an isolation part 322.

The transfer transistors 311A, 311B, the contact parts 312A, 312B, and the transfer control lines 320A, 320B are arranged line-symmetric or substantially line-symmetric to the isolation part 322 between the photodiodes 310A, 310B, respectively. On the other hand, the light guide 255 is arranged in a position deviated from the isolation part 322 as illustrated in FIG. 10. In other words, the photodiode 310A occupies most of the area of the bottom of the light guide 255, whereas the photodiode 310B slightly overlaps the bottom of the light guide 255. Therefore, the light-receiving efficiency of the photodiode 310A is relatively high, and the light-receiving efficiency of the photodiode 310B is relatively low.

In the imaging element 184 according to the present embodiment, the ratio of the light-receiving efficiency between the photodiodes 310A and 310B is set to about 8:1, i.e., the difference in sensitivity is set to about three steps. Then, two images are shot in the settings of different accumulation times to obtain nearly equal signal charge in each pixel element. This can make both images be noiseless images having excellent S/N ratios, or can synthesize both images to obtain a high-definition HDR image. The details will be described later.

Figure 11:
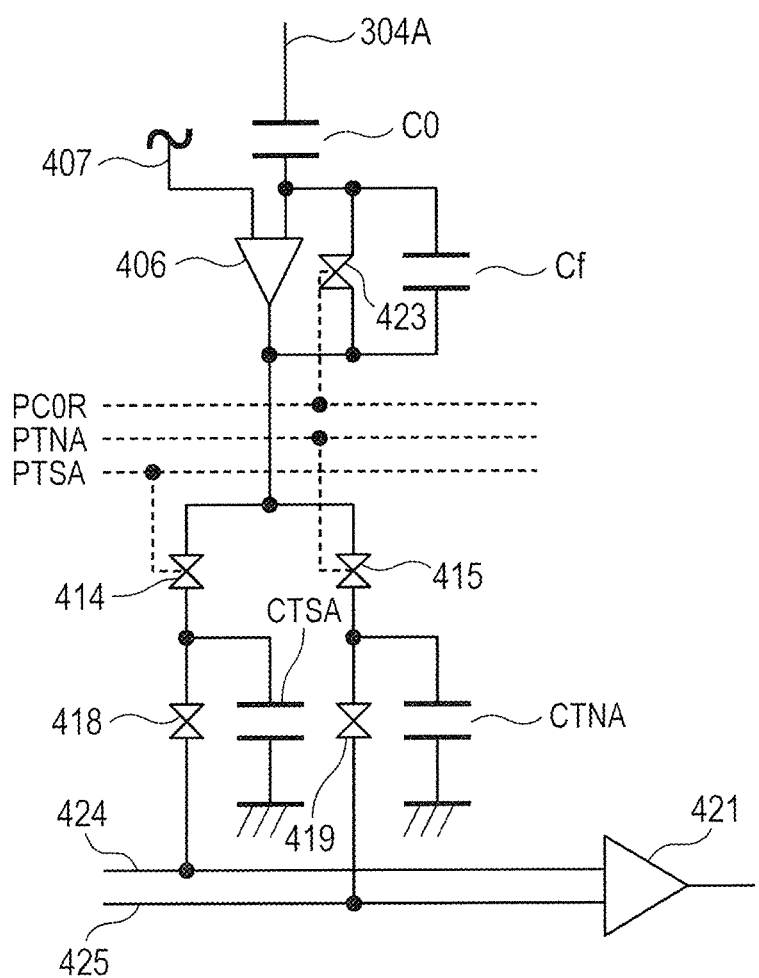
FIG. 11 is a circuit diagram illustrating a configuration example of readout circuits of the imaging element of the imaging device according to the first embodiment of the present invention.

FIG. 11 is a circuit diagram illustrating a configuration example of the readout circuits 308A, 308B of the imaging element 184. Assuming the readout circuit 308A, "A" is suffixed to some constituent elements in FIG. 11. It should be understood that "B" will be suffixed to corresponding constituent elements in the readout circuit 308B.

As illustrated in FIG. 11, the readout circuit 308A includes a clamp capacitor C0, a feedback capacitor Cf, an operational amplifier 406, a reference voltage source 407, and a switch 423. One input terminal of the operational amplifier 406 is connected to the signal output line 304A via the clamp capacitor C0. The feedback capacitor Cf and the switch 423 are connected in parallel between the one input terminal and the output terminal of the operational amplifier 406. The other input terminal of the operational amplifier is connected to a reference voltage source 407. The reference voltage source 407 supplies a reference voltage Vref to the operational amplifier 406. The switch 423 is a switch controlled by a signal PCOR to be turned on when the signal PCOR is at high level so as to short-circuit both ends of the feedback capacitor Cf.

The readout circuit 308A also includes switches 414, 415, 418, and 419, a capacitor CTSA, a capacitor CTNA, horizontal output lines 424, 425, and an output amplifier 421. The switches 414, 415 are switches that control the writing of pixel signals to the capacitors CTSA and CTNA. The switch 414 is a switch controlled by a signal PTSA to be turned on when the signal PTSA is at high level so as to connect the output terminal of the operational amplifier 406 and the capacitor CTSA. The switch 415 is a switch controlled by a signal PTNA to be turned on when the signal PTNA is at high level so as to connect the output terminal of the operational amplifier 406 and the capacitor CTNA.

The switches 418, 419 are switches to control the output of pixel signals, held in the capacitors CTSA and CTNA, to the output amplifier 421. The switches 418, 419 are turned on in response to a control signal from a horizontal shift register. Thus, the signal written in the capacitor CTSA is output to the output amplifier 421 via the switch 418 and a horizontal output line 424. The signal written in the capacitor CTNA is output to the output amplifier 421 via the switch 419 and a horizontal output line 425. The signal PCOR, the signal PTNA, and the signal PTSA are signals supplied from the timing generation unit 189 under the control of the system control CPU 178.

The readout circuit 308B also have a configuration equivalent to that of the readout circuit 308A. Note that a signal PTNB and a signal PTSB in the following description are signals supplied from the timing generation unit 189 under the control of the system control CPU 178, having roles equivalent to the signal PTNA and the signal PTSA in the readout circuit 308A.

Figure 12:
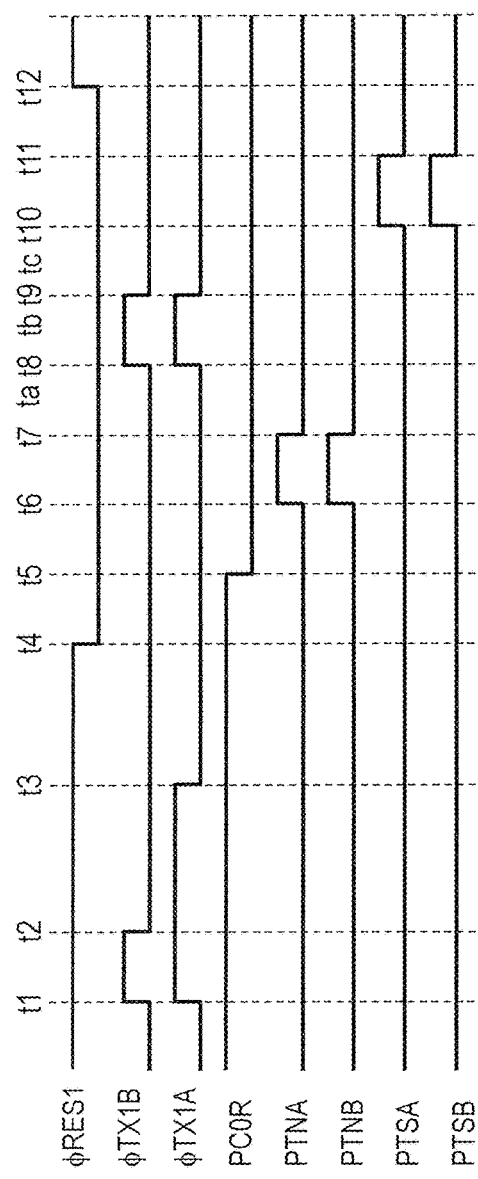
FIG. 12 is a timing chart illustrating a driving sequence of the imaging element.

Next, reset, accumulation, and readout operations in the imaging element 184 will be sequentially described with reference to a timing chart of FIG. 12 by taking, as an example, reading operation from pixels 303 in the first row.

First, at time t1, the vertical scanning circuit 307 shifts the transfer pulses φTX1A, TX1B output to the transfer control lines 320A, 320B from the low level to the high level. Thus, the transfer transistors 311A, 311B are turned on. At this time, since the high-level reset pulse φRES1 is output to the reset control line 319 from the vertical scanning circuit 307, the reset transistors 314A, 314B are also in the on-state. Therefore, the photodiodes 310A, 310B are connected to the power source line 305 via the transfer transistors 311A, 311B and the reset transistors 314A, 314B to get into the reset state. On this occasion, the floating diffusion regions 313A, 313B are also in the reset state.

Then, at time t2, the vertical scanning circuit 307 shifts the transfer pulse φTX1B from the high level to the low level. Thus, the transfer transistor 311B is turned off to cause the photodiode 310B to start accumulating signal charge by the photoelectric conversion.

Then, at time t3, the vertical scanning circuit 307 shifts the transfer pulse φTX1A from the high level to the low level. Thus, the transfer transistor 311A is turned off to cause the photodiode 310A to start accumulating signal charge by the photoelectric conversion.

Then, at time t4, the vertical scanning circuit 307 shifts the reset pulse φRES1 from the high level to the low level. Thus, the reset transistors 314A, 314B are turned off to release the rest of the floating diffusion regions 313A, 313B.

Accordingly, the potential of the floating diffusion region 313A is read out as a pixel signal of a reset signal level to the signal output line 304A via the amplifier transistor 315A, and input to the readout circuit 308A. Further, the potential of the floating diffusion region 313B is read out as a pixel signal of a reset signal level to the signal output line 304B via the amplifier transistor 315B, and input to the readout circuit 308B.

At time t4, since the high-level signal PCOR is output from the timing generation unit 189 to the readout circuit 308A and the readout circuit 308B, the switch 423 is in the on-state. Therefore, the pixel signal of the reset signal level from the pixel element 303A is input to the readout circuit 308A in a state where the operational amplifier 406 buffers the output of the reference voltage Vref. Though not illustrated, the pixel signal of the reset signal level from the pixel element 303B is also input to the readout circuit 308B in the same manner.

Then, at time t5, the signal PCOR output from the timing generation unit 189 to the readout circuit 308A and the readout circuit 308B is changed from the high level to the low level to turn off the switch 423.

Then, at time t6, the signal PTNA output from the timing generation unit 189 to the readout circuit 308A is changed from the low level to the high level to turn on the switch 415 so that the output of the operational amplifier 406 at the time will be written to the capacitor CTNA. Similarly, the signal PTNB output from the timing generation unit 189 to the readout circuit 308B is changed from the low level to the high level to turn on the switch 415 so that the output of the operational amplifier 406 at the time will be written to the capacitor CTNB.

Then, at time t7, the signal PTNA output from the timing generation unit 189 to the readout circuit 308A is changed from the high level to the low level to turn off the switch 415 so as to complete the writing to the capacitor CTNA. Similarly, the signal PTNB output from the timing generation unit 189 to the readout circuit 308B is changed from the high level to the low level to turn off the switch 415 so as to complete the writing to the capacitor CTNB.

Then, at time t8, the vertical scanning circuit 307 changes the transfer pulses φTX1A, φTX1B from the low level to the high level to turn on the transfer transistors 311A, 311B. Thus, the signal charge accumulated in the photodiode 310A is transferred to the floating diffusion region 313A, and the signal charge accumulated in the photodiode 310B is transferred to the floating diffusion 31B.

Since the end timings of the accumulation periods of the photodiodes 310A, 310B are synchronized by changing the transfer pulses φTX1A, φTX1B to the high level at time t8 at the same time, readout is done at the same time after both complete the accumulation. Therefore, a crosstalk correction such as to correct data on "picture B" using data on "picture A" or to correct data on "picture A" using data on "picture B" can be made with a very simple arithmetical operation.

Then, at time t9, the vertical scanning circuit 307 changes the transfer pulses φTX1A, φTX1B from the high level to the low level to turn off the transfer transistors 311A, 311B. Thus, the readout of the signal charge accumulated in the photodiode 310A into the floating diffusion region 313A and the readout of the signal charge accumulated in the photodiode 310B into the floating diffusion region 313B are completed.

Accordingly, the potential of the floating diffusion region 313A, which is changed by the signal charge, is read out as a pixel signal of an optical signal level to the signal output line 304A via the amplifier transistor 315A, and input to the readout circuit 308A. Further, the potential of the floating diffusion region 313B, which is changed by the signal charge, is read out as a pixel signal of an optical signal level to the signal output line 304B via the amplifier transistor 315B, and input to the readout circuit 308B.

Then, in the readout circuit 308A, voltage which is subjected to inverted gain with respect to a voltage change at a capacitance ratio between the clamp capacitor CO and the feedback capacitor Cf is output from the operational amplifier 406. Similarly, in the readout circuit 308B, voltage which is subjected to inverted gain with respect to the voltage change at the capacitance ratio between the clamp capacitor CO and the feedback capacitor Cf is output from the operational amplifier 406.

Then, at time t10, the signal PTSA output from the timing generation unit 189 to the readout circuit 308A is changed from the low level to the high level to turn on the switch 414 so that the output of the operational amplifier 406 at the time will be written to the capacitor CTSA. Similarly, the signal PTSB output from the timing generation unit 189 to the readout circuit 308B is changed from the low level the high level to turn on the switch 414 so that the output of the operational amplifier 406 at the time will be written to the capacitor CTSB.

Then, at time t11, the signal PTSA output from the timing generation unit 189 to the readout circuit 308A is changed from the high level to the low level to turn off the switch 414 so as to complete the writing to the capacitor CTSA. Similarly, the signal PTSB output from the timing generation unit 189 to the readout circuit 308B is changed from the high level to the low level to turn off the switch 414 so as to complete the writing to the capacitor CTSB.

Then, at time t12, the vertical scanning circuit 307 changes the reset pulse φRES1 from the low level to the high level to turn on the reset transistors 314A, 314B. Thus, the floating diffusion regions 313A, 313B are connected to the power source line 305 via the reset transistors 314A, 314B to get into the reset state.

Figure 13:
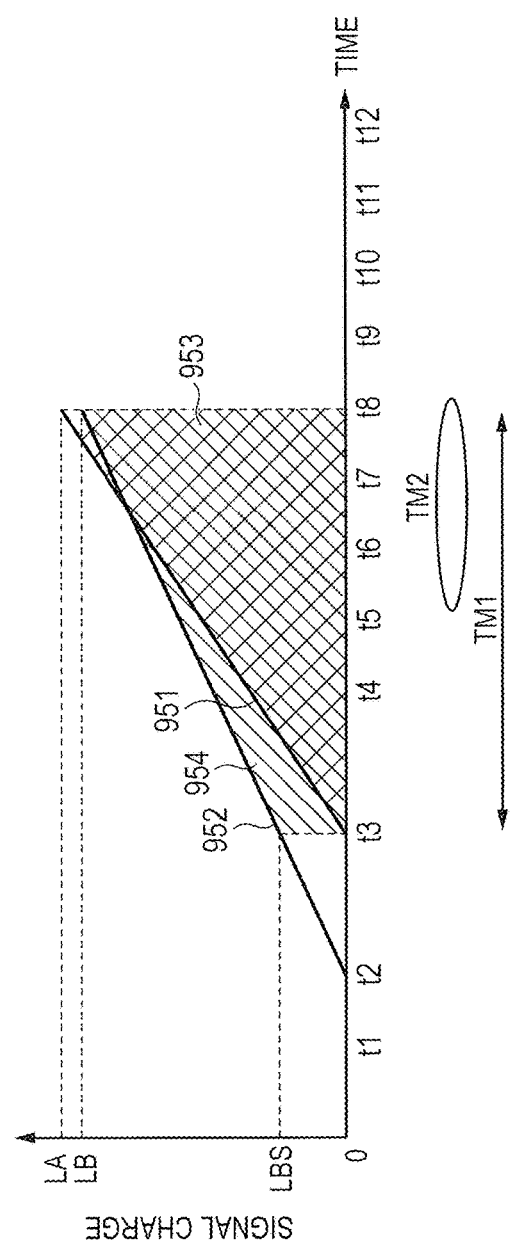
FIG. 13 is a graph illustrating temporal changes in signal charge in photodiodes.

FIG. 13 is a graph illustrating temporal changes in signal charge generated by photoelectric conversion and accumulated in the photodiodes 310A, 310B. In FIG. 13, the abscissa of the graph represents time and the ordinate represents the amount of signal charge. On the time axis, time t1 to time t12 illustrated in FIG. 12 are marked.

At time t2, when the transfer pulse φTX1B is changed to the low level to turn off the transfer transistor 311B so as to start the accumulation of signal charge in the photodiode 310B, the amount of signal charge held in the photodiode 310B increases with time. The increase in signal charge continues until the transfer pulse φTX1B is changed to the high level at time t8 to turn on the transfer transistor 311B so as to transfer the signal charge of the photodiode 310B to the floating diffusion region 313B.

Further, at time t3, the transfer pulse φTX1A is changed to the low level to turn off the transfer transistor 311A so as to start the accumulation of signal charge in the photodiode 310A. Thus, the amount of signal charge held in the photodiode 310A increases with time. The increase in signal charge continues until the transfer pulse φTX1A is changed to the high level at time t8 to turn on the transfer transistor 311A so as to transfer the signal charge of the photodiode 310A to the floating diffusion region 313A.

At time t8, a signal charge amount LB held in the photodiode 310B and a signal charge amount LA held in the photodiode 310A become substantially the same level by cancelling out the difference in light-receiving efficiency with the difference in accumulation time.

In a period TM1 where the transfer pulse φTX1B and the transfer pulse φTX1A are both at the low level, crosstalk occurs between the photodiode 310A and the photodiode 310B. The period TM1 takes a value shorter between the accumulation period of the photodiode 310A and the accumulation time of the photodiode 310B. Since the crosstalk amount is approximately proportional to the amount of signal charge, relatively more crosstalk occurs in a period TM2 as the second half of the period TM1, where the signal charge amount increases.

A crosstalk amount CTAB from the photodiode 310A to the photodiode 310B is proportional to the area of a region 953 indicated by hatching diagonally right down. A crosstalk amount CTBA from the photodiode 310B to the photodiode 310A is proportional to the area of a region 954 indicated by hatching diagonally left down. If these constants of proportion are defined by k and g, respectively, the crosstalk amounts CTAB and CTBA can be expressed as follows.

$$CTAB = k \times (LA \times TM1)/2 \quad (1)$$

$$CTBA = g \times (LA + LBS) \times TM1/2 \quad (2)$$

LBS is a signal charge amount of the photodiode 310B at time t3. Further, though not illustrated in FIG. 13, an approximation to LB=LBS can be achieved if a period from time t2 to time t3 is sufficiently shorter than the period TM1. Therefore, Equation (2) can be modified as follows.

$$CTBA = g \times LB \times TM1 \quad (3)$$

Thus, it is found from Equation (1) and Equation (3) that the crosstalk amount CTAB is a function of the signal charge amount LA and a value (period TM1) shorter between the accumulation time of the photodiode 310A and the accumulation time of the photodiode 310B. It is also found that the crosstalk amount CTBA is a function of the signal charge amount LB and a value (period TM1) shorter between the accumulation time of the photodiode 310A and the accumulation time of the photodiode 310B.

Figure 14A:
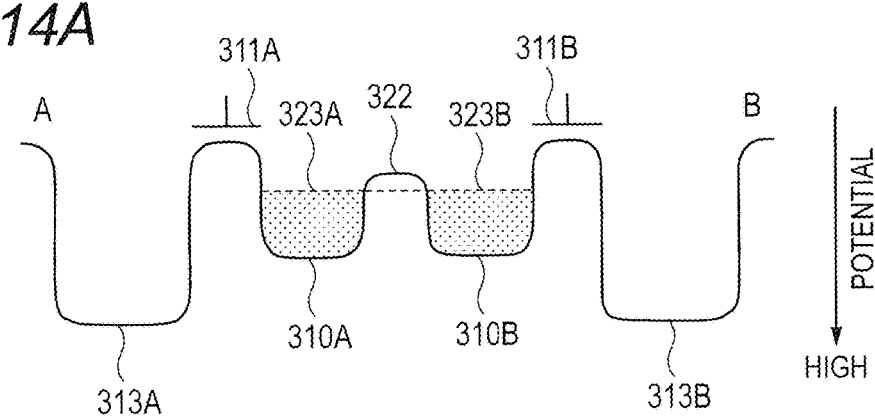
FIG. 14A, FIG. 14B, and FIG. 14C are potential diagrams of the pixel taken along A-B line in FIG. 9.
Figure 14B:
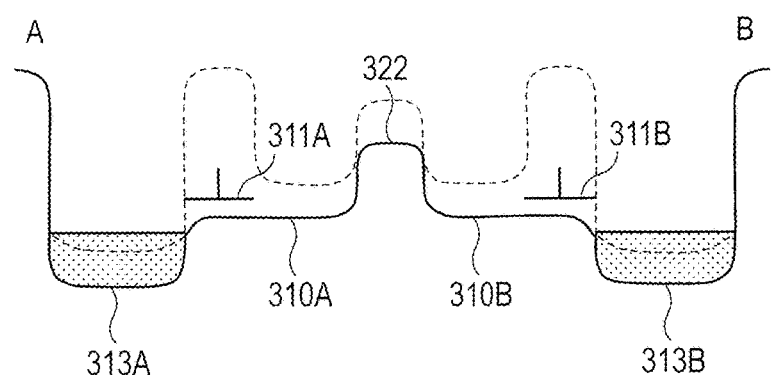
Figure 14C:
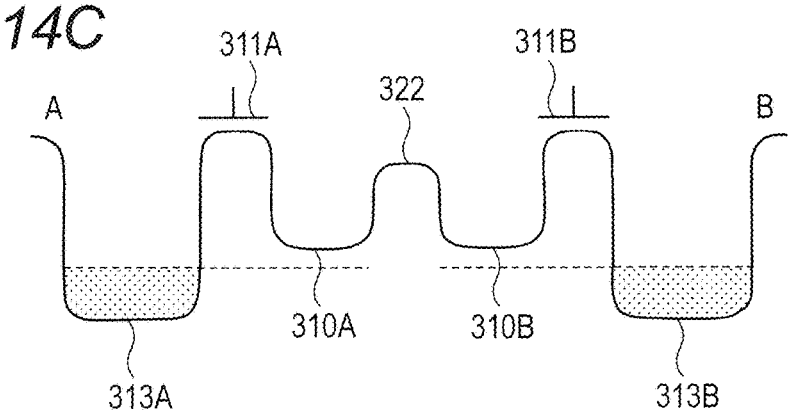

FIG. 14A to FIG. 14C are potential diagrams of the pixel 303 taken along A-B line in FIG. 9. FIG. 14A is a potential diagram at time ta in FIG. 12, FIG. 14B is a potential diagram at time tb in FIG. 12, and FIG. 14C is a potential diagram at time tc in FIG. 12.

As illustrated in FIG. 14A, the transfer transistors 311A, 311B are in the off-state at time ta, and signal charges at signal accumulation levels 323A, 323B are accumulated in the photodiodes 310A, 310B, respectively. As mentioned above, although the photodiode 310A and the photodiode 310B are different in light-receiving efficiency, the signal accumulation levels 323A, 323B are substantially the same level by cancelling out the difference in light-receiving efficiency with the difference in accumulation time. Since this state lasts a relatively long time, a phenomenon that the accumulated electric charge of the photodiode 310A leaks into the adjacent photodiode 310B and a phenomenon that the accumulated electric charge of the photodiode 310B leaks into the adjacent photodiode 310A occur at a non-negligible level.

As illustrated in FIG. 14B, the transfer transistors 311A, 311B are in the on-state at time tb, and the potential barriers of the transfer transistors 311A, 311B are low. Thus, the signal charge accumulated in the photodiode 310A is transferred to the floating diffusion region 313A, and the signal charge accumulated in the photodiode 310B is transferred to the floating diffusion region 313B. On this occasion, although the potential barrier of the isolation part 322 is also low, the potential barriers of the transfer transistors 311A, 311B are sufficiently low. Therefore, the phenomena that the accumulated electric charges of the photodiodes 310A, 310B leak into the adjacent photodiodes 310B, 310A through the isolation part 322 at this timing hardly occur.

As illustrated in FIG. 14C, the transfer transistors 311A, 311B are in the off-state at time tc, and the potentials return to the state in FIG. 14A.

Figure 15:
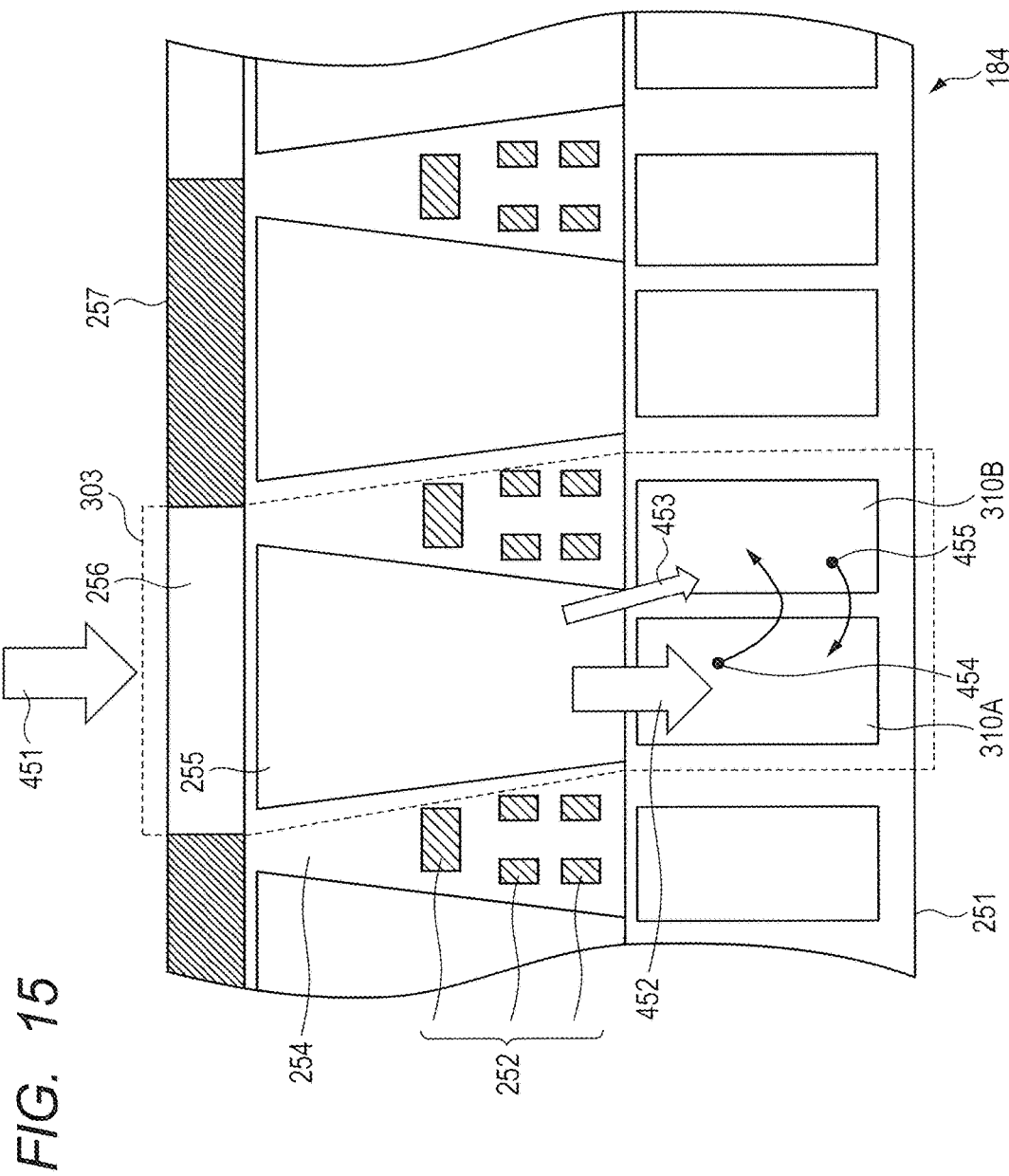
FIG. 15 is a cross-sectional view illustrating the propagation of light and the behavior of electric charges generated by the photoelectric conversion inside the imaging element.

FIG. 15 is a cross-sectional view illustrating the behavior of electric charges generated by the propagation of light and photoelectric conversion inside the imaging element 184. In FIG. 15, an arrow 451 indicates a light flux entering the pixel 303. The light flux 451 first enters the color filter 256, where a predetermined wavelength component is absorbed, passes through an interfacial passivation film (not illustrated) corresponding to the uppermost part of the insulating layer 254, and enters the light guide 255. As described above with reference to FIG. 5, orientation information of the light beam, i.e., pupil information is lost inside the light guide 255 by the behavior of light waves. The light flux 451 moves on the side of the silicon substrate 251 while being confined in the light guide 255 due to the refractive index difference between the light guide 255 and the insulating layer 254, and reaches the bottom of the light guide 255. The bottom of the light guide 255 lies adjacent to the silicon substrate 251, and the light flux emitted from the light guide 255 enters the silicon substrate 251. The photodiode 310A and the photodiode 310B provided adjacent to each other inside the silicon substrate 251 are arranged to be greatly eccentric from the light guide 255. Therefore, a light flux 452 as most of the light flux emitted from the light guide 255 enters the photodiode 310A, and a light flux 453 as part of the rest of the light flux emitted from the light guide 255 enters the photodiode 310B. The incident photons are converted to signal charges in the photodiodes 310A, 310B.

On this occasion, signal charges generated inside the silicon substrate 251 of the imaging element 184 may leak into adjacent pixel elements by diffusion. For example, signal charge 454 generated in the photodiode 310A leaks into the photodiode 310B by diffusion. Further, signal charge 455 generated in the photodiode 310B leaks into the photodiode 310A by diffusion. This phenomenon has an adverse effect on the image, resulting in a blur in the image.

Figure 16:
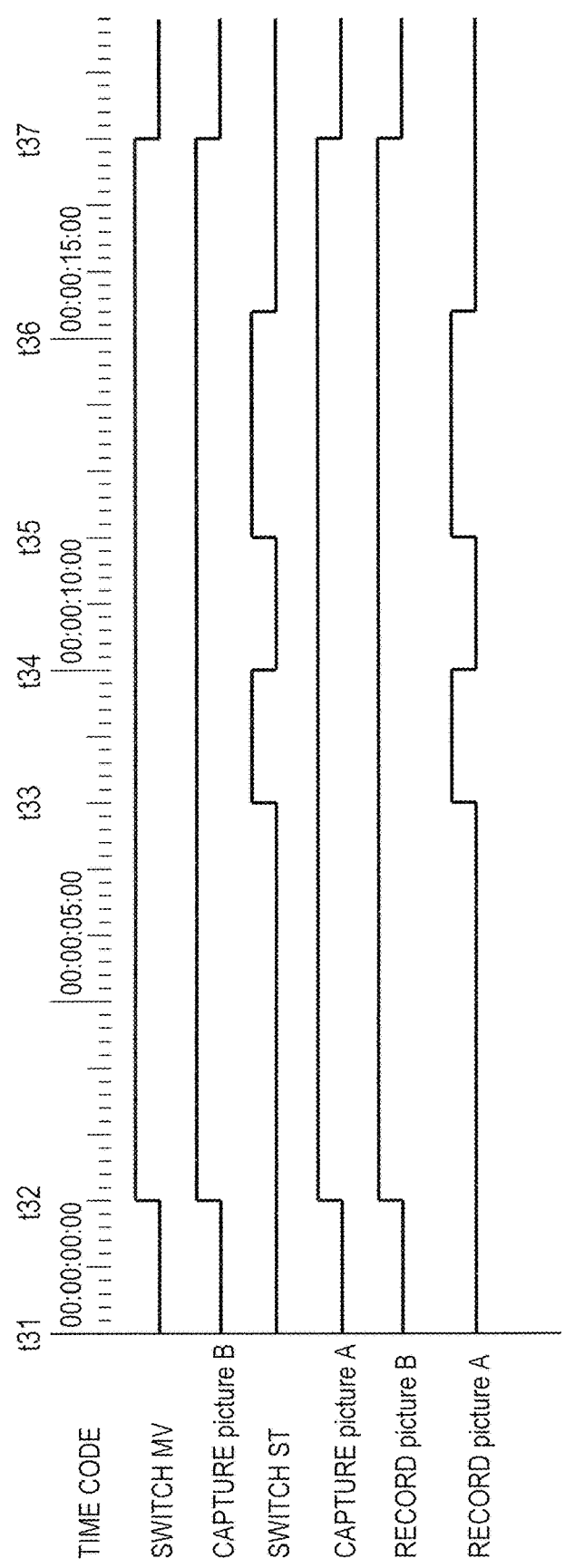
FIG. 16 is a timing chart for describing an imaging sequence in the imaging device according to the first embodiment of the present invention.

FIG. 16 is a timing chart for describing an imaging sequence in the imaging device according to the present embodiment. The term "time code" on the top of the chart indicates time after power activation, and "00:00:00:00" indicates "Hr:Min:Sec:Frame."

Time t31 is the power activation time of the imaging device 100.

At time t32, the switch MV 155 as a moving image shooting button is operated by a user to be turned on to start imaging of "picture B" and imaging of "picture A" are started in response thereto. In response to operating the switch MV 155 as the button to shoot a moving image, image data on the "picture B" are written onto the recording medium 193 after being subjected to predetermined signal processing.

The reason for imaging the "picture A" simultaneously with imaging the "picture B" is to active a crosstalk correction to be described later at all times. Since the transfer transistor 311A will be in the on-state unless the transfer pulse φTX1A illustrated in FIG. 13 is at the low level, the signal charge generated in the photodiode 310A is never accumulated. However, if only the period of operating the switch ST 154 is targeted for the crosstalk correction, the "picture B" recorded at the operating timing of the switch ST 154 will be subjected to delicate brightness variation or hue variation due to the influence of a crosstalk correction error.

During a period of time t33 to time t34 and a period of time t35 to time t36, the switch ST 154 used to shoot a still image is operated. Therefore, during these periods, image data on the "picture A" are also written onto the recording medium 193 after being subjected to predetermined signal processing. The image data on the "picture A" may also be written onto the recording medium 193 during the same period as that of the image data on the "picture B" in addition to the period of time t33 to time t34 and the period of time t35 to time t36.

Figure 17:
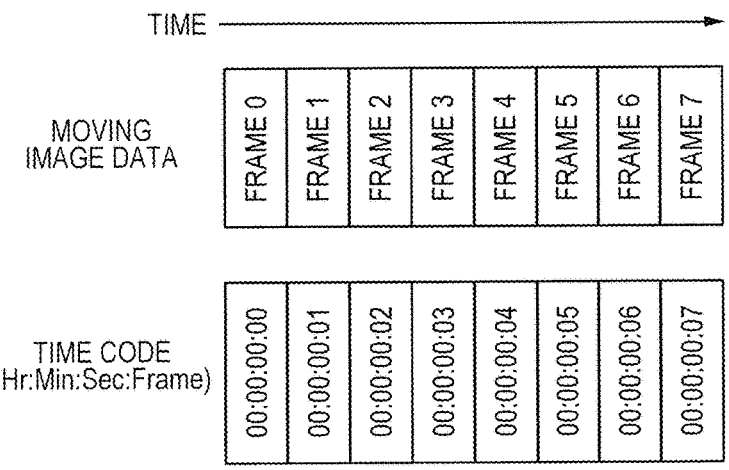
FIG. 17 is a diagram illustrating an example of time code values added to each frame of moving image data.

In both of the "picture A" and the "picture B," it is assumed that each piece of image data recorded on the recording medium 193 is a moving image at the same frame rate, e.g., 60 fps, and the NTSC time code is added. For example, the time code value added to each frame of the moving image data is as illustrated in FIG. 17.

Figure 18:
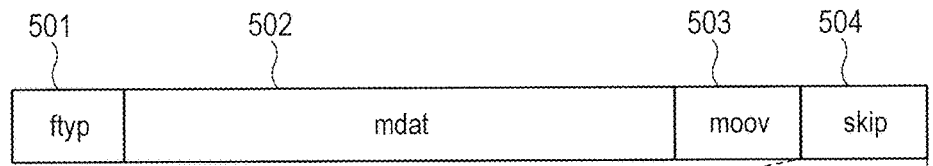
FIG. 18 is a diagram illustrating an example of the file structure of "picture A" and "picture B."

FIG. 18 is a diagram illustrating an example of the file structure of image data on "picture A" and "picture B." Although an example of MP4 file is illustrated as the format of image data here, the format of image data is not limited to this. The MP4 file format is standardized in ISO/IEC 14496-1/AMD6. All pieces of information are stored in a structure called a Box, and composed of multiplexed video and audio bit streams (media data) and management information (meta data) on these pieces of media data. The box type of each Box is represented by an identifier made up of four letters, respectively. A file type Box 501 (ftyp) is located at the top of the file as a Box to identify the file. In a media data Box 502 (mdat), the video and audio bit streams are multiplexed and stored. In a movie Box 503 (moov), management information used to play back a stored bit stream stored in the media data Box 502 is stored. A skip Box 504 (skip) is a Box to skip data stored in the skip Box 504 during playback.

In the skip Box 504, a clip name 508 of a clip including this image data file, and a clip UMID (Unique Material Identifier) 509 (CLIP-UMID) assigned to the material are stored. Also stored in the skip Box 504 are a time code value (time code head value) 510 of a clip head frame, and a serial number 511 of a recording medium on which the material file is recorded. In FIG. 18, a free space 505, user data 506, and meta data 507 are also contained in the skip Box 504. Since special data such as UMID of the material file and the serial number of the recording medium are stored in the skip Box, such data have no impact during playback on a general-purpose viewer.

The same CLIP-UMID is set for respective MP4 files of the "picture A" and "picture B." This enables a search for a file having the same CLIP-UMID from one material file using the CLIP-UMID to associate both files mechanically without any human confirmation work.

Figure 19:
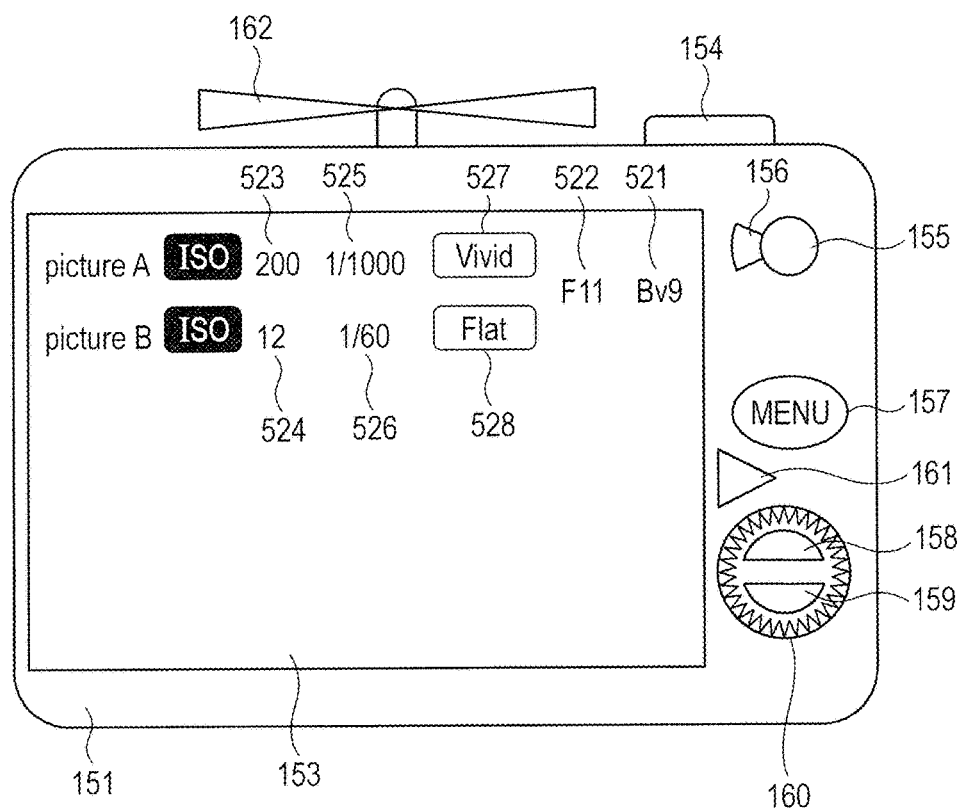
FIG. 19 is a diagram for describing a shooting condition setting screen for "picture A" and "picture B."

FIG. 19 is a diagram for describing a shooting condition setting screen for "picture A" and "picture B." It is assumed that the shooting mode selecting lever 156 is rotated 90 degrees clockwise, for example, from the position in FIG. 1B to enter a dual image mode capable of shooting two images at the same time. A Bv value 521 corresponding to the brightness of an object at the time, F-number 522, and respective ISO sensitivities 523, 524 and shutter speeds 525, 526 of the "picture A" and the "picture B" are displayed on the display unit 153. Further, picture modes 527, 528 currently set for the "picture A" and the "picture B" are displayed, respectively. A picture mode to suit the purpose of shooting can be selected from among plural options using the up and down switches 158, 159, and the dial 160.

Figure 20:
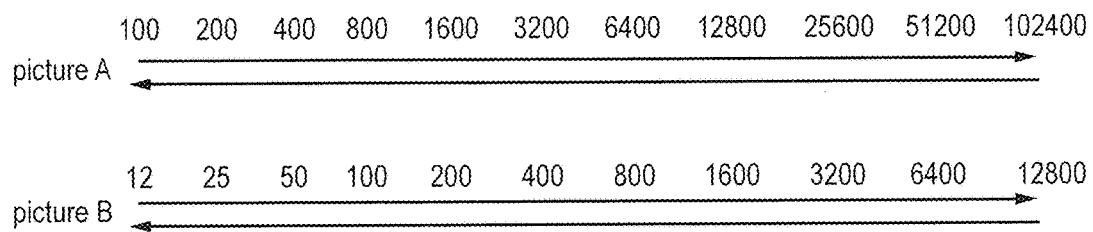
FIG. 20 is a diagram illustrating a relationship between ISO sensitivity ranges of "picture A" and "picture B."

As mentioned above, the difference in light-receiving efficiency between the photodiode 310A and the photodiode 310B is set as three-step difference. Therefore, there is a three-step difference in ISO sensitivity range between the "picture A" and the "picture B." As illustrated in FIG. 20, the ISO sensitivity range of the "picture A" is from ISO 100 to ISO 102400, and the ISO sensitivity range of the "picture B" is from ISO 12 to ISO 12800.

Figure 21:
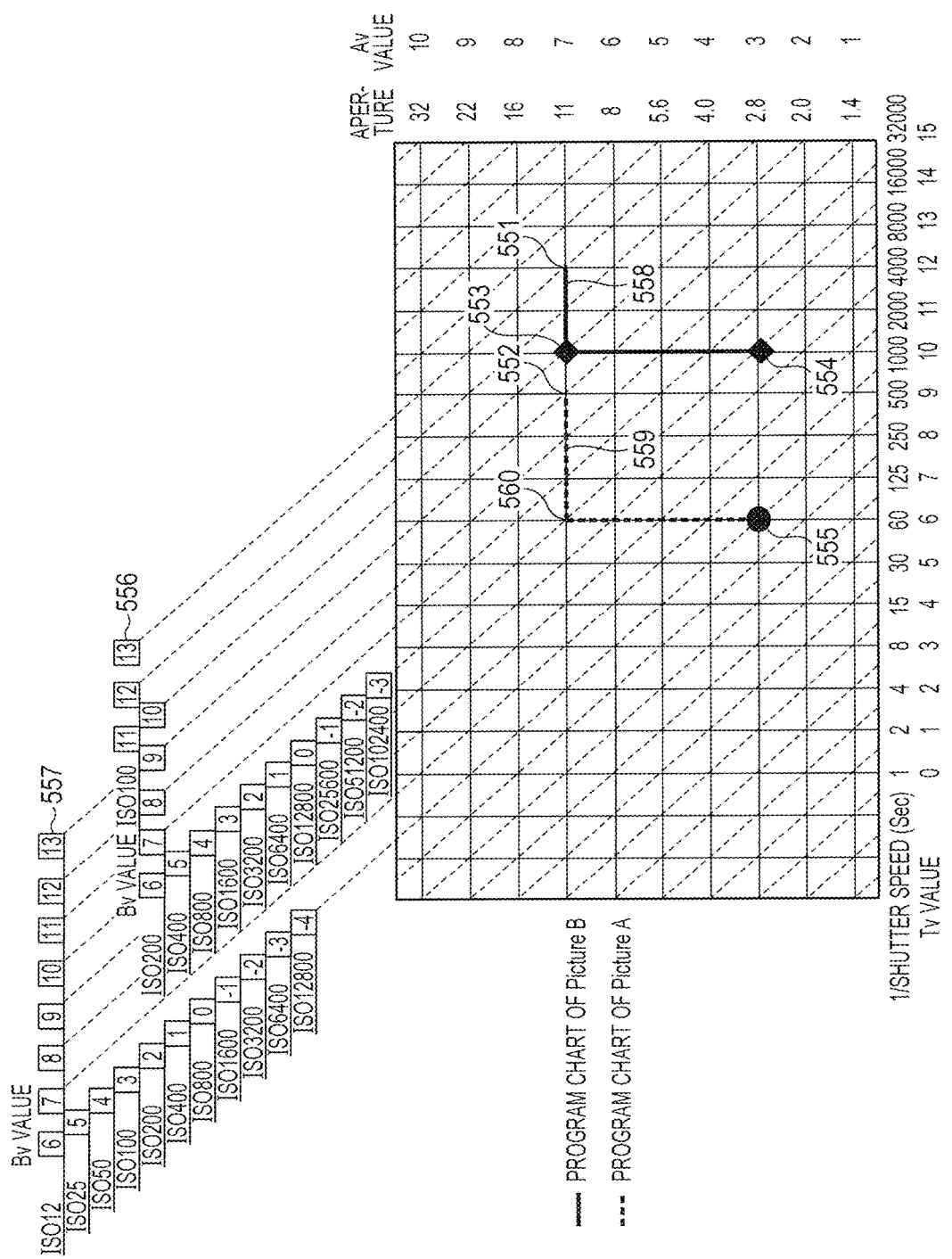
FIG. 21 is a program AE chart in a dual image mode of the imaging device according to the first embodiment of the present invention.

FIG. 21 is a program AE (Automatic Exposure) chart in the dual image mode. The abscissa indicates Tv value and corresponding shutter speed, and the ordinate indicates Av value and corresponding aperture value. Further, the diagonal direction is equivalent Bv line. The relationship between the Bv value and the ISO sensitivity of the "picture A" is represented in a gain notation area 556, and the relationship between the Bv value and the ISO sensitivity of the "picture B" is represented in a gain notation area 557. In FIG. 21, each Bv value is represented as a numeric value surrounded by a rectangle to distinguish from the other parameters.

Referring to FIG. 21, it will be described how the shutter speed, the aperture value, and the ISO sensitivity vary according to variations from high brightness to low brightness.

First, when Bv value is 13, the ISO sensitivity of the "picture A" is set to ISO 100. The equivalent Bv line of the "picture A" intersects with a program chart 558 of the "picture A" at point 551, and it is determined from the point 551 that the shutter speed is 1/4000 second and the aperture value is F11. On the other hand, the ISO sensitivity of the "picture B" is set to ISO 12. The equivalent Bv line of the "picture B" intersects with a program chart 559 of the "picture B" at point 552, and it is determined from the point 552 that the shutter speed is 1/500 second and the aperture value is F11.

When Bv value is 10, the ISO sensitivity of the "picture A" increases by one step and is set to ISO 200. The equivalent Bv line of the "picture A" intersects with the program chart 558 of the "picture A" at point 553, and it is determined from the point 553 that the shutter speed is 1/1000 second and the aperture value is F11. On the other hand, the ISO sensitivity of the "picture B" is set to ISO 12. The equivalent Bv line of the "picture B" intersects with the program chart 559 of the "picture B" at point 560, and it is determined from the point 560 that the shutter speed is 1/60 second and the aperture value is F11.

When Bv value is 6, the ISO sensitivity of the "picture A" is set to ISO 200. The equivalent Bv line of the "picture A" intersects with the program chart 558 of the "picture A" at point 554, and it is determined from the point 554 that the shutter speed is 1/1000 second and the aperture value is F2.8. On the other hand, the ISO sensitivity of the "picture B" is set to ISO 12. The equivalent Bv line of the "picture B" intersects with the program chart 559 of the "picture B" at point 555, and it is determined from the point 555 that the shutter speed is 1/60 second and the aperture value is F2.8.

When Bv value is 5, the ISO sensitivity of the "picture A" increases by one step and is set to ISO 400. The equivalent Bv line of the "picture A" intersects with the program chart 558 of the "picture A" at the point 554, and it is determined from the point 554 that the shutter speed is 1/1000 second and the aperture value is F2.8. On the other hand, the ISO sensitivity of the "picture B" is set to ISO 25. The equivalent Bv line of the "picture B" intersects with the program chart 559 of the "picture B" at the point 555, and it is determined from the point 555 that the shutter speed is 1/60 second and the aperture value is F2.8.

After that, as the brightness is reduced, gain-up is performed to increase the ISO sensitivity without changing the shutter speed and the aperture value of both of the "picture A" and the "picture B."

The exposure operation illustrated in this program AE chart is so performed that the "picture A" will keep a shutter speed of 1/1000 second or faster over the entire brightness range written, and the "picture B" will keep a shutter speed of 1/60 second over most of the brightness range. Thus, a high-definition moving image with less jerkiness can be obtained in the "picture B" while achieving the stop motion effect in the "picture A."

Figure 22:
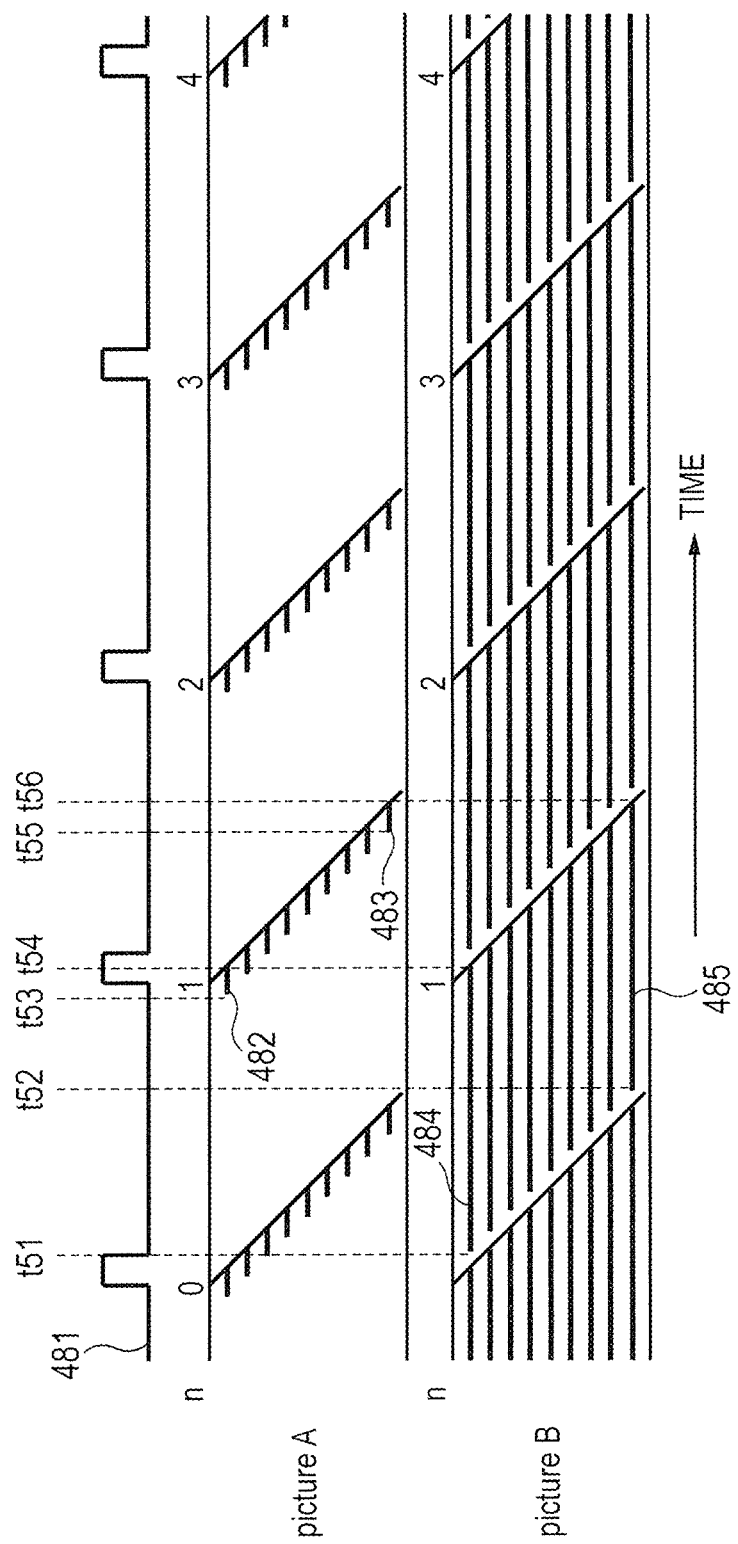
FIG. 22 is a chart for describing a shutter speed difference between "picture A" and "picture B" along an imaging sequence.

FIG. 22 is a chart for describing a shutter speed difference between the "picture A" and the "picture B" along an imaging sequence. In FIG. 22, the abscissa is expressed in time to illustrate a V synchronizing signal 481, accumulation periods 482, 483 of the "picture A," and accumulation periods 484, 485 of the "picture B," where n denotes a frame number.

The accumulation period 482 is an accumulation period of a screen upper edge line of the "picture A," and the accumulation period 483 is an accumulation period of a screen lower edge line of the "picture A." Since the imaging element 184 performs exposure operation with the function of a rolling electronic shutter, the accumulation is started at predetermined time intervals sequentially from the screen upper edge line toward the screen lower edge line, and the accumulation is finished sequentially at the time intervals. When the accumulation is completed, the signal charge is read out sequentially from the imaging element 184, and input to the analog front end 185. A period from time t53 to time t54 is the accumulation period 482, and a period from time t55 to time t56 is the accumulation period 483.

Further, the accumulation period 484 is an accumulation period of a screen upper edge line of the "picture B," and the accumulation period 485 is an accumulation period of a screen lower edge line of the "picture B." Like in the "picture A," the accumulation in the "picture B" is also started at predetermined time intervals from the screen upper edge line toward the screen lower edge line, and the accumulation is finished sequentially at the time intervals. When the accumulation is completed, the signal charge is read out sequentially from the imaging element 184, and input to the analog front end 186. A period from time t51 to time t54 is the accumulation period 484, and a period from time t52 to time t56 is the accumulation period 485.

Although the two images of the "picture A" and the "picture B" are shot in different accumulation time settings, similar levels of signal charge are obtained in the imaging element 184, rather than performing the gain-up on the "picture A." Therefore, both the "picture A" and the "picture B" become noiseless images having excellent S/N ratios.

Figure 23:
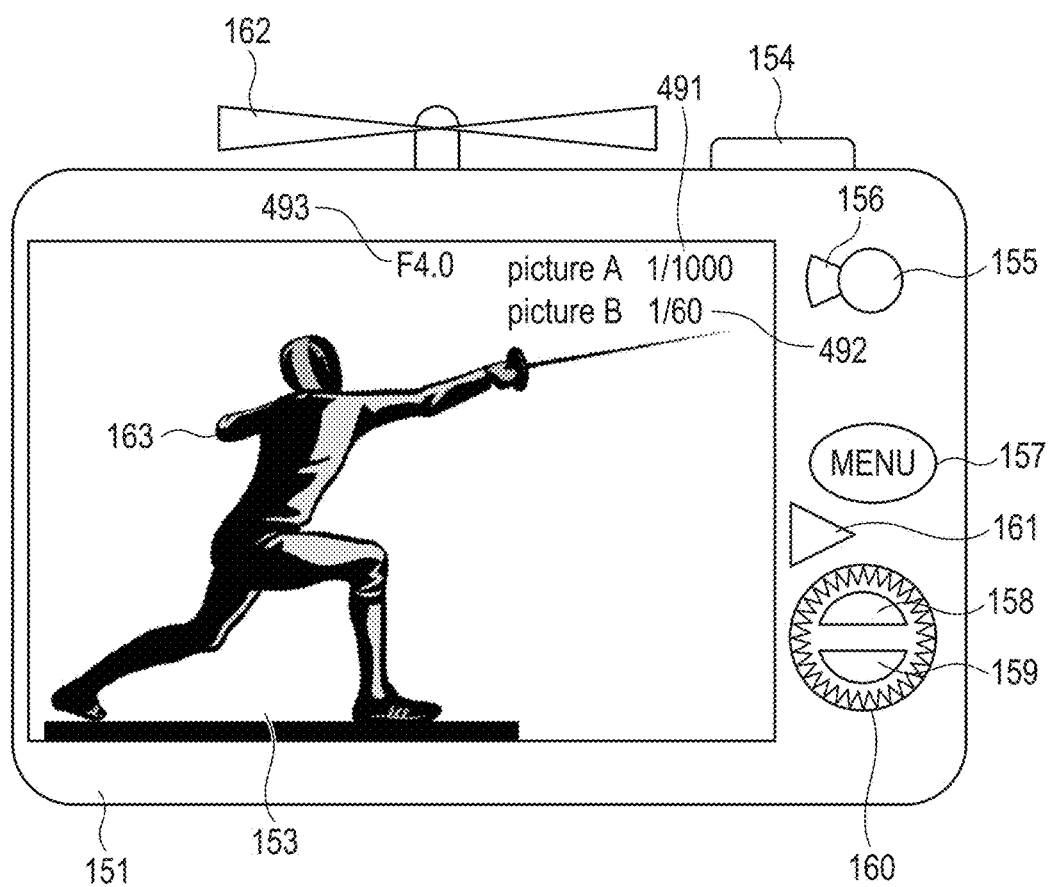
FIG. 23 is a diagram illustrating a state of a display unit during live view display after the imaging device is powered up.

FIG. 23 is a diagram illustrating a state of the display unit 153 during live view display after the imaging element 184 is powered up. A sports scene of a person 163 captured through the photographing optical system 152 is displayed on the display unit 153. Further, since the shooting mode selecting lever 156 is placed in a position turned 90 degrees clockwise from the state in FIG. 1B, shutter speeds 491, 492 of the "picture A" and the "picture B," and an F-number 493 in the dual image mode are displayed.

Figure 24A:
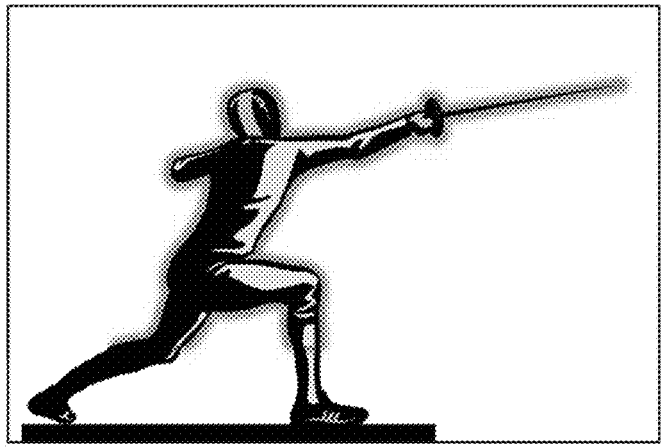
FIG. 24A and FIG. 24B are diagrams illustrating one frame among image frames acquired by operating a switch ST and a switch MV.
Figure 24B:
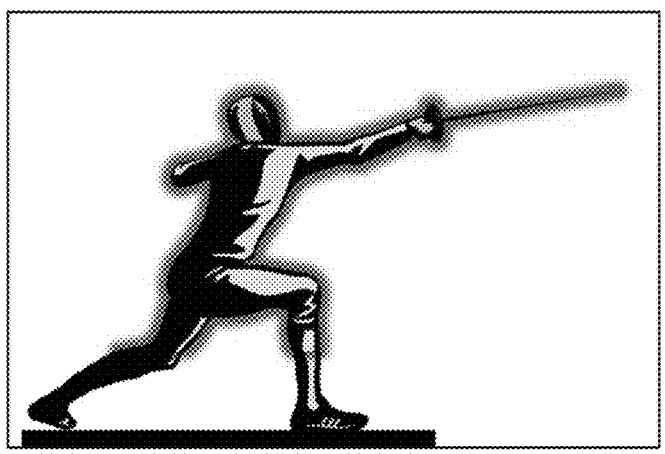

FIG. 24A and FIG. 24B illustrate one frame among image frames acquired by operating the switch ST 154 and the switch MV 155, respectively. FIG. 24A is an image of the "picture A" shot with a shutter speed of 1/1000 second and an aperture value of F4.0. FIG. 24B is an image of the "picture B" shot with a shutter speed of 1/60 second and an aperture value of F4.0. The image illustrated in FIG. 24B is blurred due to such a slow shutter speed that the motion of the object does not stop. However, if this image is played back as a moving image at a frame rate of about 60 fps, this blur will work rather well, leading to a smooth high-definition image with less jerkiness. On the other hand, the stop motion effect is supposed to be seen in the image illustrated in FIG. 24A because the shutter speed is fast. However, as previously described with reference to FIG. 15, signal charge generated inside the silicon substrate leaks into adjacent pixel elements by diffusion to result in a blurred image as if the image illustrated in FIG. 24B is added. This crosstalk phenomenon also occurs in the image illustrated in FIG. 24B, but it is barely noticeable because the image is originally blurred.

Therefore, in the imaging device according to the present embodiment, a crosstalk correction to be described below is applied to an image signal output from the imaging element 184 in order to obtain an original stop motion effect by the fast shutter speed.

Figure 25:
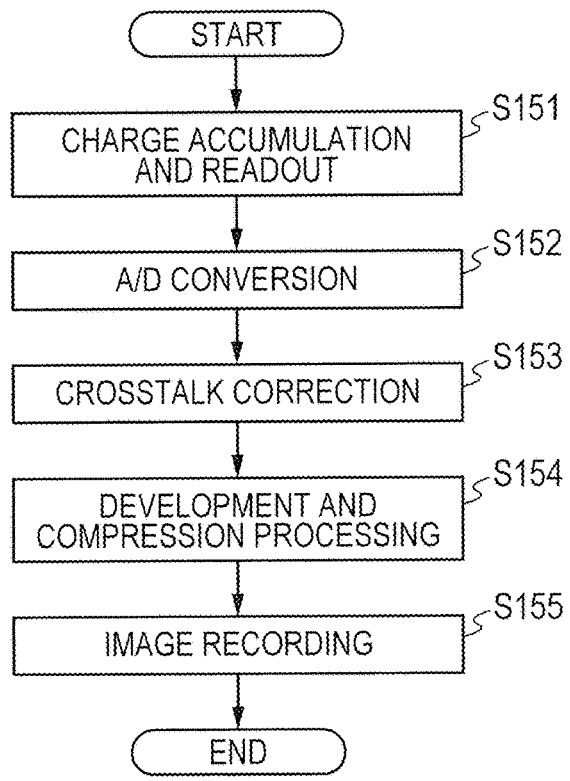
FIG. 25 is a flowchart illustrating a series of processing procedure steps including crosstalk correction.

FIG. 25 is a flowchart illustrating a series of processing procedure steps including the crosstalk correction. Processing from imaging to recording in the imaging device 100 according to the present embodiment is performed, for example, in step S151 to step S155 illustrated in FIG. 25.

In step S151, the accumulation of signal charge and readout of the signal charge to the photodiodes 310A, 310B are performed according to the sequence described with reference to FIG. 12 in response to the operation of the switch MV 155 at time t32 as described with reference to FIG. 16.

In step S152, signals read out from the imaging element 184 are input to the analog front ends 185, 186, in which analog signals are digitized.

In step S153, a correction (crosstalk correction) to reduce crosstalk caused by the leakage of signal charge generated inside the silicon substrate into adjacent pixel elements is performed. The crosstalk correction is performed in the digital signal processing units 187, 188. In other words, the digital signal processing units 187, 188 function as crosstalk correction units.

In step S154, development processing and compression processing as needed are performed. In the development processing, a gamma correction is performed as one of a series of processing steps. The gamma correction is processing to apply a gamma function to an input light amount distribution. As a result, the linearity of the output with respect to the input light amount distribution is not kept, and the crosstalk ratio also varies with the light amount at the time. Therefore, as illustrated in FIG. 25, it is desired to perform the crosstalk correction in a stage prior to step S154. When the crosstalk correction is performed after the development, the crosstalk processing may be changed depending on the magnitude of the light amount, or the crosstalk correction may be performed after the image signals are subjected to inverse gamma correction.

In step S155, images are recorded on the recording medium 193. Instead of or in addition to recording on the recording medium 193, the images may also be stored in a storage device on a network 199 through the radio interface 198.

Figure 26:
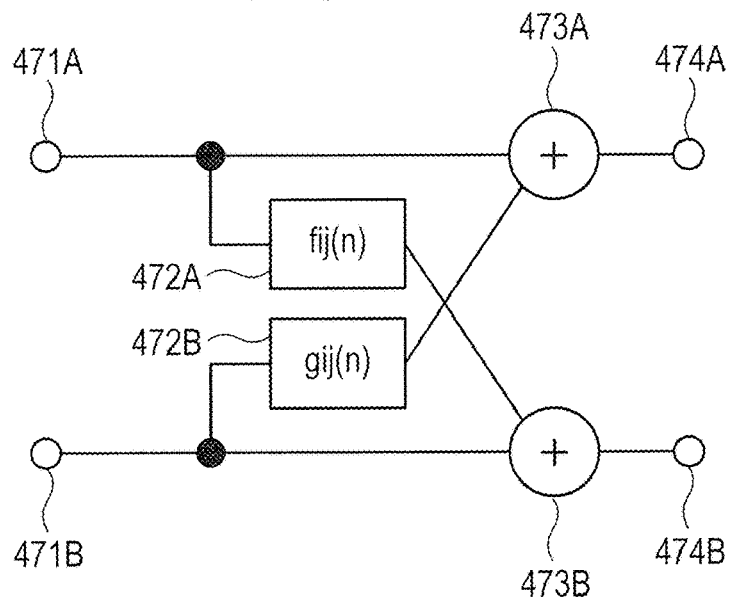
FIG. 26 is a diagram for describing crosstalk correction processing performed in a digital signal processing unit.

FIG. 26 is a diagram for describing the crosstalk correction processing performed in step S153 by the digital signal processing units 187, 188. Actual processing is performed as digital signal processing.

In the digital signal processing unit 187, a signal 471A after being subjected to A/D conversion processing is input to a crosstalk amount correcting part 473A, and further input to a crosstalk amount correcting part 473B via a crosstalk amount calculating part 472A. Similarly, in the digital signal processing unit 188, a signal 471B after being subjected to A/D conversion processing is input to the crosstalk amount correcting part 473B, and further input to the crosstalk amount correcting part 473A via a crosstalk amount calculating part 472B.

In the crosstalk amount correcting part 473A, a crosstalk correction is performed on the signal 471A based on the signal 471A and the signal 471B after being subjected to a predetermined calculation by a crosstalk correction function gij(n) in the crosstalk amount calculating part 472B to obtain an output signal 474A. The output signal 474A is subjected to development and/or compression processing as a subsequent processing step in the digital signal processing unit 187.

In the crosstalk amount correcting part 473B, a crosstalk correction is performed on the signal 471B based on the signal 471B and the signal 471A after being subjected to a predetermined calculation by a crosstalk correction function fij(n) in the crosstalk amount calculating part 472A to obtain an output signal 474B. The output signal 474B is subjected to development and/or compression processing as a subsequent processing step in the digital signal processing unit 188.

Since the crosstalk depends on the amount of generated signal charge, the crosstalk amount correcting parts 473A, 473B can perform crosstalk corrections in a manner to correct an output signal of one pixel element by a crosstalk amount corresponding to the amount of signal charge generated in the other pixel element. This can remove, from the output signal of the one pixel element, a crosstalk component from the other pixel element, which is superimposed on the output signal.

Here, data at a pixel address ij of the n-th frame of "picture A" are denoted as DATA_Aij(n), data at a pixel address ij of the n-th frame of "picture B" is denoted as DATA_Bij(n), and a correction coefficient is denoted as α. Since the crosstalk depends on the input light amount, corrected data C_DATA_Aij(n) at a pixel address ij of the n-th frame of "picture A" can be expressed as Equation (4).

$$C\_DATA\_Aij(n) = DATA\_Aij(n) - \alpha \times DATA\_Bij(n) \quad (4)$$

When a crosstalk correction function fij(n) is $$fij(n) = -\alpha \times DATA\_Bij(n),$$

Equation (4) can be expressed as follows.

$$C\_DATA\_Aij(n) = DATA\_Aij(n) + fij(n).$$

Similarly, corrected data C_DATA_Bij(n) at a pixel address ij of the n-th frame of "picture B" can be expressed as Equation (5) with the correction coefficient denoted as β.

$$C\_DATA\_Bij(n) = DATA\_Bij(n) - \beta \times DATA\_Aij(n) \quad (5)$$

When a crosstalk correction function gij(n) is $$gij(n) = -\beta \times DATA\_Aij(n),$$

Equation (5) can be expressed as follows.

$$C\_DATA\_Bij(n) = DATA\_Bij(n) + gij(n) \quad (6).$$

As mentioned above, although crosstalk also occurs in the "picture B," since it is barely noticeable because the image is originally blurred, processing expressed in Equation (5) and Equation (6) may be omitted. If the crosstalk correction is performed on an image with a relatively short accumulation time without performing the crosstalk correction on an image with a relatively long accumulation time, the calculation load can be reduced.

Figure 27:
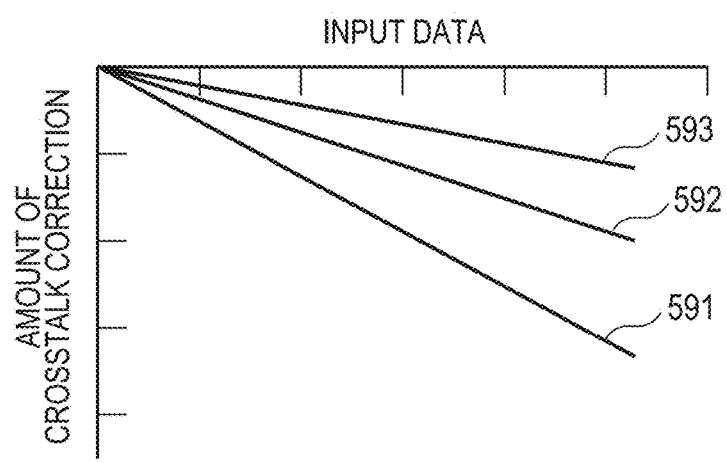
FIG. 27 is a graph illustrating a specific example of crosstalk correction functions.

FIG. 27 is a graph illustrating a specific example of the crosstalk correction functions fij(n), gij(n). In FIG. 27, the abscissa indicates the size of input data, and the ordinate indicates crosstalk correction amount to be corrected. Both of the crosstalk correction functions fij(n), gij (n) are functions to obtain crosstalk correction amounts proportional to the input data, respectively. Although both are different depending on the pixel structure in a precise sense, the correction coefficient α and the correction coefficient β are nearly equal numeric values. However, the degree of leakage of signal charge, generated inside the silicon substrate depending on the incident angle of light on each pixel element, into adjacent pixel elements by diffusion is different. Therefore, the more the aperture 181 is opened to increase the F-number, the larger the crosstalk and hence the larger the absolute value of the crosstalk correction amount. On the other hand, the more the aperture 181 is narrowed to decrease the F-number, the smaller the crosstalk and hence the smaller the absolute value of the crosstalk correction amount. In FIG. 27, a characteristic 591 is a crosstalk correction function at F2.8, a characteristic 592 is a crosstalk correction function at F5.6, and a characteristic 593 is a crosstalk correction function at F11. The gradients of the characteristic 591, the characteristic 592, and the characteristic 593 become smaller in this order. Note that the F-number of the photographing optical system 152 can be continuously changed. Therefore, if the correction coefficient $\alpha$ and the correction coefficient $\beta$ are set as an F-number function, more precise crosstalk corrections can be achieved.

Further, as previously described with reference to FIG. 13, the correction coefficient $\alpha$ and the correction coefficient $\beta$ can be set as a function of the accumulation time of a photodiode for "picture A" set to be relatively short.

The crosstalk correction amount can also be changed depending on the image height to achieve further more accurate crosstalk corrections. Since crosstalk increases when light enters the light guide 255 obliquely, distance ZK from the optical axis 180 to each pixel may be calculated based on the pixel address ij to apply a crosstalk correction so as to increase the absolute value in proportion to the distance ZK. Further, since the change in incident angle of light on the light guide 255 depends also on distance HK between an exit pupil of the photographing optical system 152 and the imaging element 184, the crosstalk correction function can be set as a function of the distance HK to perform more precise corrections.

Figure 28:
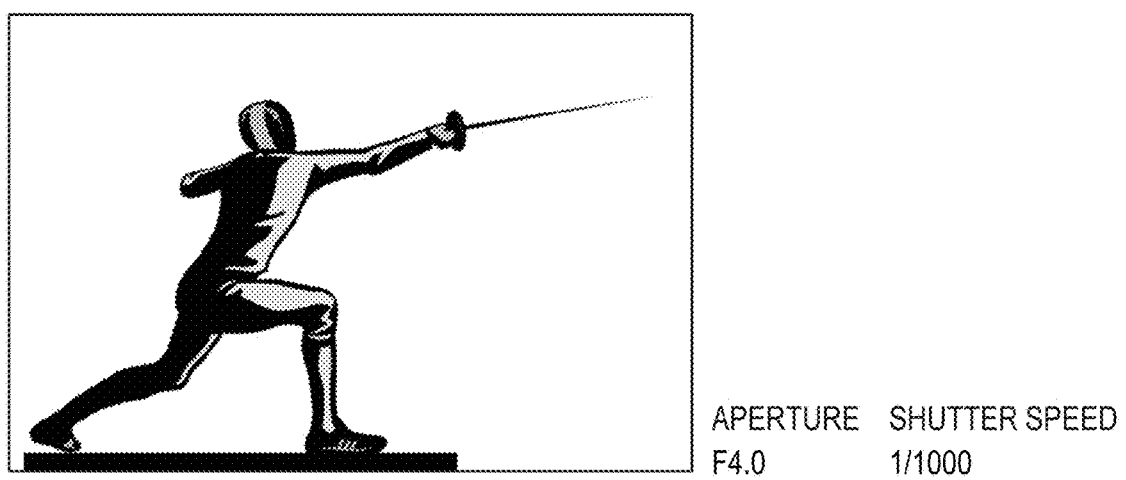
FIG. 28 is a diagram illustrating an example of an image after being subjected to crosstalk correction.
Figure 29:
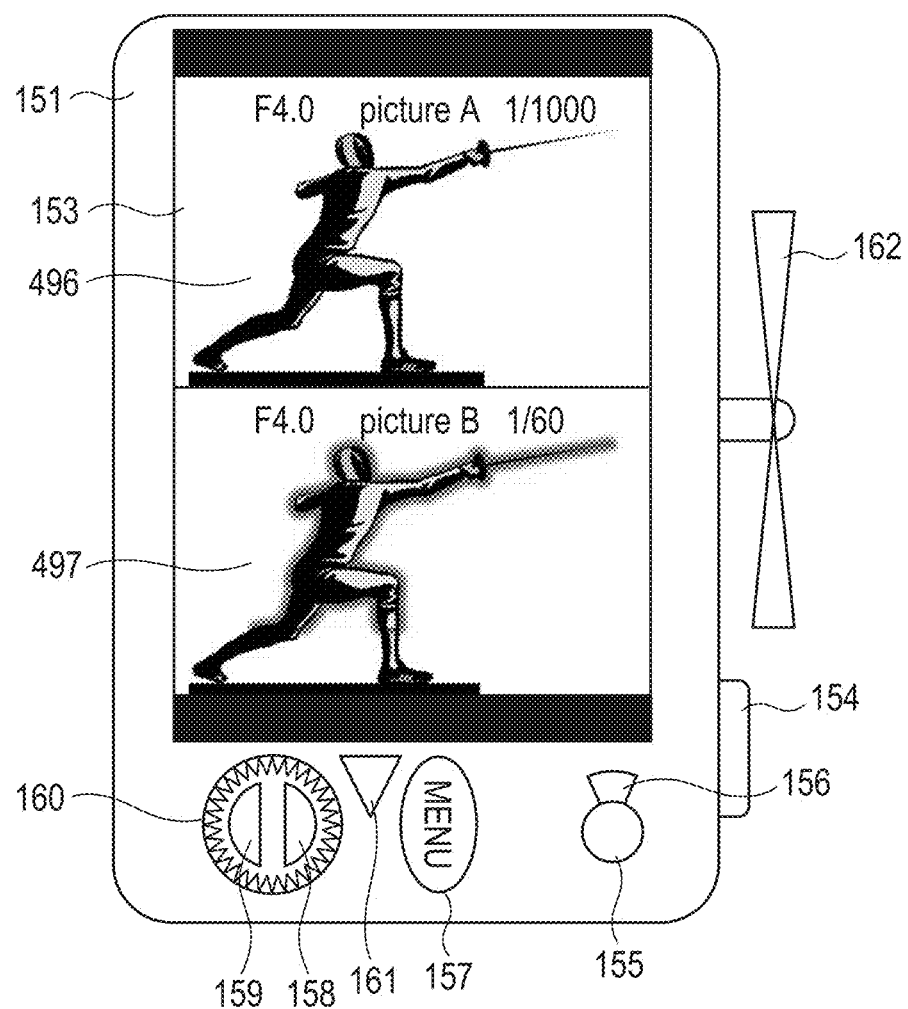
FIG. 29 is a diagram illustrating a state of displaying "picture A" and "picture B" next to each other on a display unit.

FIG. 28 is an image of "picture A" after the image of "picture A" (FIG. 24A) shot with a shutter speed of $\frac{1}{1000}$ second and an aperture value of F4.0 is subjected to a crosstalk correction. In the image of FIG. 24A, signal charge generated inside the silicon substrate leaks into adjacent pixel elements by diffusion to result in a blurred image as if the image illustrated in FIG. 24B were added. On the other hand, in the image of FIG. 28, the original stop motion effect by the fast shutter speed is achieved. On the display unit 153 of a digital still motion camera, for example, it is desired to be able to display both "picture A" 496 and "picture B" 497 side by side or up and down as illustrated in FIG. 29 when the playback button 161 is operated. Thus, the images can be compared to check on the level of the stop motion effect. This processing may also be performed in such a manner that image data are supplied to a system or an apparatus through a network to cause the system or a computer of the apparatus to read and execute a program.

Figure 30:
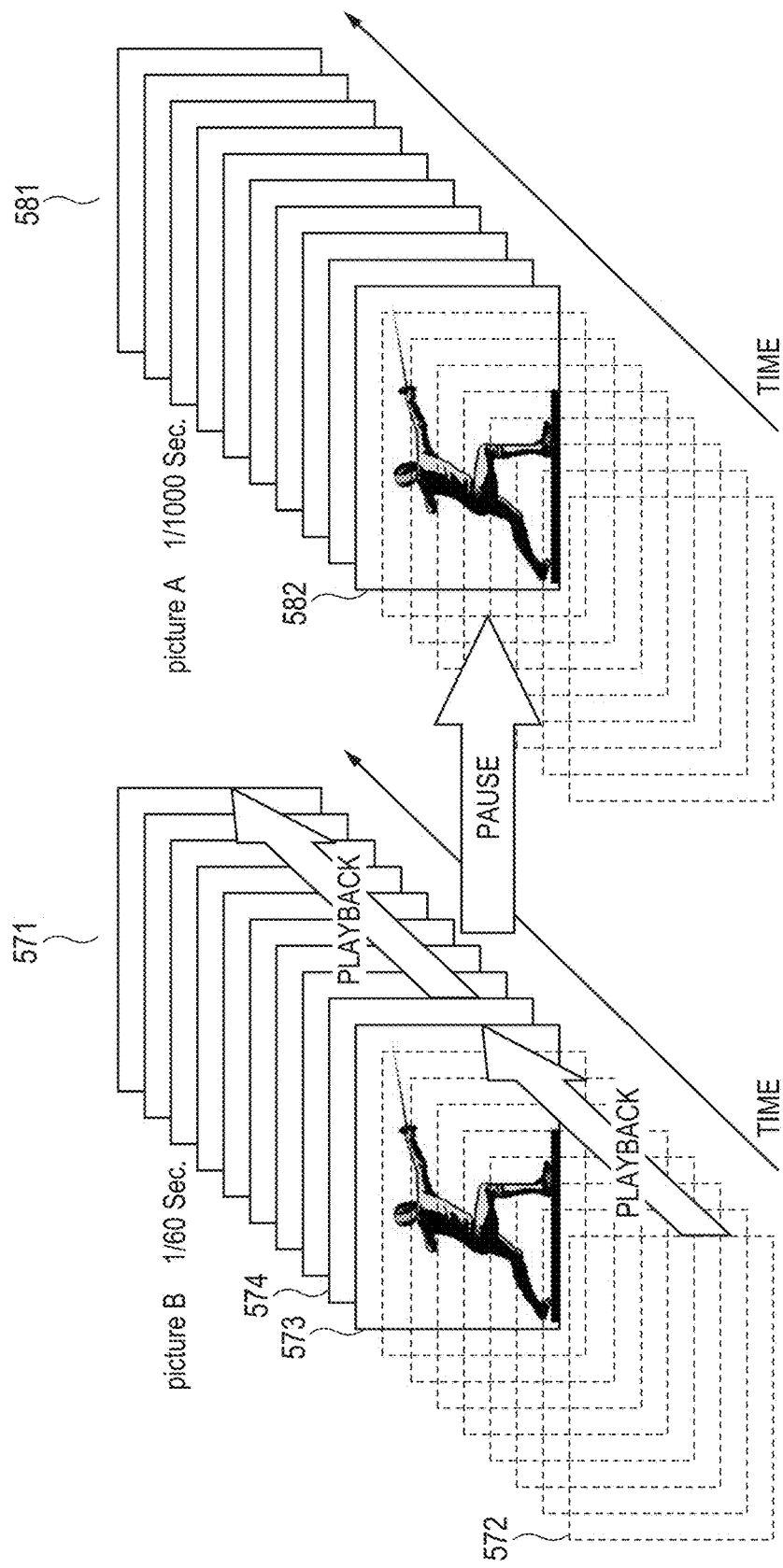
FIG. 30 is a diagram for describing an image playback method according to the first embodiment of the present invention.

FIG. 30 is a diagram for describing a playback method in an image playback device for data files including "picture A" and "picture B" stored in a storage. As the image playback device, a tablet terminal, a personal computer, a TV monitor, or the like can be used in addition to the image playback device included in the imaging device 100 described in the present embodiment. Components (such as a CPU, a demodulation unit, and a display unit) are provided in the device, such as the tablet terminal, the personal computer, or the TV monitor, to play back a moving image file like an MP4 file so as to serve as the image playback device. In the imaging device 100 of the present embodiment, the function as the image playback unit is implemented mainly by the system control CPU 178.

It is assumed here that data files of "picture A" and "picture B" are stored in a storage on a network. In FIG. 30, a frame group 581 is a frame group of "picture A" stored in an MP4 file, and a frame group 571 is a frame group of "picture B" stored in another MP4 file. The same CLIP-UMID is set for these MP4 files to associate the MP4 files at the time of shooting.

When the playback of a moving image is started, frames are played back sequentially from a head frame 572 of the frame group 571 of "picture B" at a predetermined frame rate. Since the "picture B" is shot in such a setting that the shutter speed is not excessively fast ($\frac{1}{60}$ second in this example), the image playbacked is a high-definition image with less jerkiness. In this specification, a playback mode for a moving image file when the moving image is playbacked at a frame rate higher than the frame rate at the time of shooting may be represented as a presentation mode to change presented images with time.

Suppose here that a user gives an instruction to change the playback mode while a moving image of "picture B" is being presented. For example, when the user pauses the playback at the time where the playback progresses up to a frame 573, a frame 582 with the same time code is automatically retrieved from the data file of the "picture A" associated with the "picture B," and the frame 582 is displayed. The "picture A" is shot with a fast shutter speed ($\frac{1}{1000}$ second in this example) at which the stop motion effect can be easily obtained, i.e., the "picture A" is a powerful image obtained by shooting a moment of the sports scene. Although the two images of the "picture A" and the "picture B" are shot in different accumulation time settings, similar levels of signal charge are obtained in the imaging element 184, rather than performing the gain-up on the "picture A." Therefore, both the "picture A" and the "picture B" become noiseless images having excellent S/N ratios.

Here, when printing is instructed, data on the frame 582 of the "picture A" are output to the printer 195 through the print interface 194. Thus, the print also become powerful one having the stop motion effect that reflects the "picture A."

When the user releases the pause, the procedure automatically returns to the frame group 571 of the "picture B" to resume playback from a frame 574. At this time, the image to be played back is a high-definition image with less jerkiness.

In the example of FIG. 30, although the frame presentation is changed to the "picture A" when the playback of the "picture B" is paused, the frame presentation may be changed to the "picture A" when frame-by-frame playback of the "picture B" is performed. In this specification, the playback mode for a moving image file when playback is paused or frame-by-frame playback is performed may also be referred to as the presentation mode without any change in presented image with time. Further, the frame presentation may be changed to the "picture A" when the playback is put in a mode to reduce the frame rate to a certain rate or slower so as to perform playback while checking the image continuously frame by frame. In other words, it is convenient to present the "picture A" regardless of the present or absence of an instruction to switch to the presentation mode when the speed of frame-by-frame advance is sufficiently slower than the normal playback frame rate (the frame rate at the time of shooting).

The above difference in effect on the image played back is considered to be caused by the difference in image presentation method between the presentation to change the presented image with time and the presentation (including the frame-by-frame playback) without any change in presented image with time. In other words, the presentation method varies according to a presentation condition as to which of conflicting demands is important, a demand for an image with less jerkiness or a demand for an image having a high stop motion effect.

In the present embodiment, in view of the image acquisition feature of the imaging device, an image based on signals from pixels whose accumulation times are relatively long is presented in the presentation (moving image presentation) to change the presented image with time. On the other hand, an image based on signals from pixels whose accumulation times are relatively short is presented in the presentation (still image presentation) without any change in presented image with time. Thus, images according to the conflicting demands, i.e., the image with less jerkiness and the image having a high stop motion effect, can be provided. This effect is very beneficial.

The image presentation method illustrated in the present embodiment can be used to provide images suitable for viewing of both of moving image/still image when two or more images are shot at the same time and viewed using a single imaging element.

Thus, according to the present embodiment, images suitable for viewing of both of a moving image and a still image can be acquired and played back.

Second Embodiment

An imaging device according to a second embodiment of the present invention will be described with reference to FIG. 31A to FIG. 31E. The same constituent elements as those of the imaging device according to the first embodiment illustrated in FIG. 1A to FIG. 30 are given the same reference numerals to omit or simplify the description.

In the first embodiment, the method of generating two or more moving image files in consideration of compatibility with conventional file formats and automatically associating these moving image files is illustrated.

In the present embodiment, an example of another preferred file format, and association between "picture A" and "picture B" in this example will be described. Note that the configuration of the imaging device used to obtain "picture A" and "picture B" is the same as that of the first embodiment.

Figure 31A:
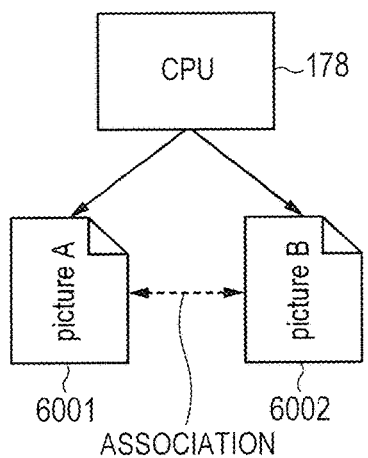
FIG. 31A, FIG. 31B, FIG. 31C, FIG. 31D, and FIG. 31E are diagrams for describing file formats for storing "picture A" and "picture B."
Figure 31B:
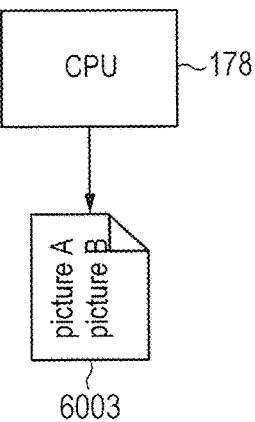
Figure 31C:
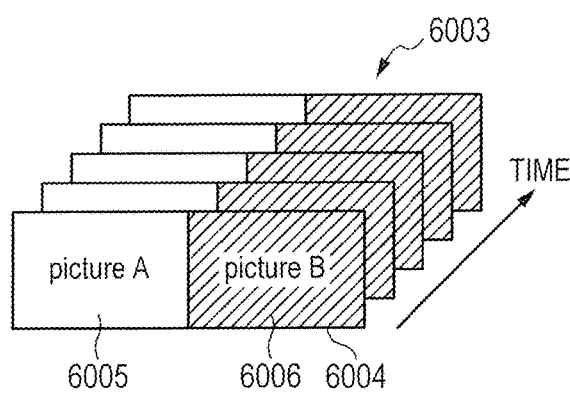
Figure 31D:
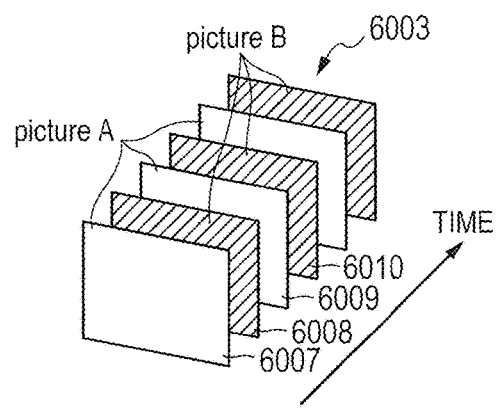
Figure 31E:
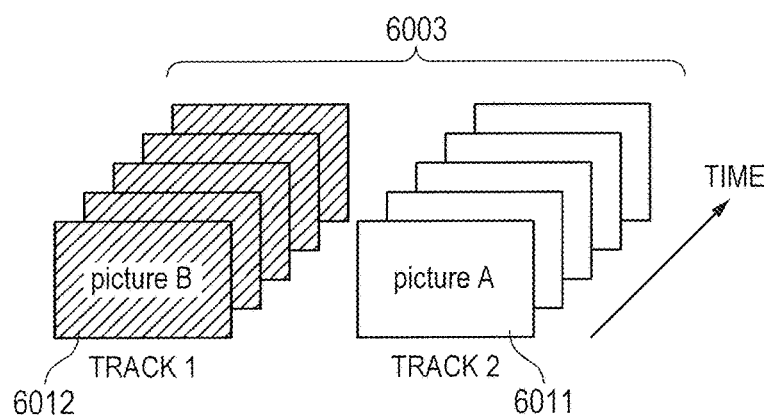

FIG. 31A is a schematic view illustrating the method described in the first embodiment. FIG. 31B is a schematic view illustrating a method to be described in the present embodiment. FIG. 31C, FIG. 31D, and FIG. 31E are diagrams for specifically describing image storing methods in the present embodiment.

In the method of the first embodiment, as illustrated in FIG. 31A, the system control CPU 178 separately generates a file 6001 as a moving image file of "picture A" and a file 6002 as a moving image file of "picture B." The system control CPU 178 has the function as a moving image file generating unit. The file 6001 and the file 6002 are associated using CLIP-UMID as described in the first embodiment. In other words, the file 6001 contains a moving image of "picture A," and synchronization information for synchronizing the moving image of "picture A" and a moving image of "picture B" frame by frame. The file 6002 contains the moving image of "picture B," and synchronization information for synchronizing the moving image of "picture A" and the moving image of "picture B" frame by frame.

In contrast, in the method of the present embodiment, the system control CPU 178 generates one file 6003 from moving image data on "picture A" and moving image data on "picture B" as illustrated in FIG. 31B. Specific examples of storage methods into the file 6003 are illustrated in FIG. 31C to FIG. 31E.

The method illustrated in FIG. 31C is an example of using a stereo image format, so-called side-by-side. Since no parallax between "picture A" and "picture B" obtained by the imaging device of the first embodiment as illustrated in FIG. 5, a three-dimensional image is not obtained even using the stereo image format. Information is just stored using the stereo image format.

In the case of a stereo image, there is proposed a method (side-by-side) as one of methods for recoding an image presented to the right eye and an image presented to the left eye to store these images as one image with the images set laterally side-by-side. In the example of FIG. 31C, this method is used to store an image of "picture A" and an image of "picture B" as one image data with the images arranged as illustrated. The image of "picture A" and the image of "picture B" stored as one image are acquired in sync with a synchronization period. When focusing on a specific frame 6004 at this time, data on the frame 6004 is an image double in size in the lateral direction and composed of an image 6005 of "picture A" and an image 6006 of "picture B" that lie next to each other. In other words, the file 6003 is a moving image file in which each frame contains a frame image of a moving image of "picture A," and a frame image of a moving image of "picture B" acquired in sync with that of "picture A."

When the playback of the moving image is started, frame images are played back sequentially at a set frame rate from the head frame of a frame group of "picture B." In other words, in a playback device, only an image to be present to one eye in the stereo image format is continuously presented. In the side-by-side method, an area corresponding to the "picture B" can be clipped and presented. Since the "picture B" is shot in such a setting that the shutter speed will not be excessively fast (1/60 second in this example), the image played back is a high-definition image with less jerkiness.

For example, when the user pauses the playback at the time where the playback progresses up to the frame 6004, the image 6005 of "picture A" corresponding to the image 6006 of "picture B" is automatically displayed. In other words, the image is switched to an image to be presented to the other eye in the stereo image format. The "picture A" is shot with a fast shutter speed (1/1000 second in this example) at which the stop motion effect can be easily obtained, i.e., the "picture A" is a powerful image obtained by shooting a moment of the sports scene. Although the two images of the "picture A" and the "picture B" are shot in different accumulation time settings, similar levels of signal charge are obtained in the imaging element 184, rather than performing the gain-up on the "picture A." Therefore, both the "picture A" and the "picture B" become noiseless images having excellent S/N ratios.

The method illustrated in FIG. 31D is an example of using another stereo image format suitable for a so-called liquid-crystal shutter type playback device. In the playback device using a liquid-crystal shutter, images are presented by switching an image presented to the right eye and an image presented to the left eye in a time-division manner. Using this format, the "picture A" and the "picture B" can be stored in one file. For example, when the frame rate of an image at the time of shooting is designated as 60 fps, the "picture A" and the "picture B" are alternately stored as frames of a moving image at 120 fps, which is twice the frame rate. For example, a pair of an image of "picture A" and an image of "picture B" acquired in sync with each other are stored as data on frames 6007 and 6008. Then, a pair of an image of "picture A" and an image of "picture B" acquired in sync with each other at the next timing are stored as data on frames 6009 and 6010. When focusing only on data of either the "picture A" or the "picture B," the data thus stored are data on a moving image at the same frame rate of 60 fps as that of the shooting time. In other words, the file 6003 is a moving image file recorded to present frames of a moving image of "picture A" and frames of a moving image of "picture B" alternately. Then, the frames of the moving image of "picture A" and the frames of the moving image of "picture B" synchronized with each other are continuously recorded in this moving image file.

When the playback of the moving image is started, frame images are played back sequentially at a set frame rate from the head frame of a frame group of "picture B." In other words, in the playback device, only an image to be present to one eye in the stereo image format is continuously presented. In the example of FIG. 31D, every other frame can be played back to present only the "picture B."

For example, when the user pauses the playback at the time where the playback progresses up to the frame 6008, an image of the frame 6007 of "picture A" corresponding to the image of the frame 6008 of "picture B" is displayed. Thus, images suitable for viewing of both of moving image/still image can be provided.

The method illustrated in FIG. 31E is an example of using a format to store, in one file, two or more moving images as a multitrack moving image. The format of FIG. 31E is a format capable of storing an auxiliary image, a parallax image, and the like as two or more tracks. Here, "picture B" is recorded as a main image 6012 of track 1, "picture A" is recorded as an auxiliary image 6011 of track 2, and information on the imaging device and the like is stored in a meta data recording part. Moving images on the two or more tracks correspond to one time code. In other words, a file 6003 is a moving image file including a first moving image track containing a moving image of "picture A" and synchronization information, and a second moving image track containing a moving image of "picture B" and synchronization information.

When the playback of the moving image is started, frame images are played back sequentially at a set frame rate from the head frame of a frame group of "picture B." In other words, in the playback device, the image of track is presented. When the user pauses the playback, an image of track 2 corresponding to the same time code can be presented. Thus, images suitable for viewing of both of moving image/still image can be provided.

Third Embodiment

An imaging device according to a third embodiment of the present invention will be described with reference to FIG. 32 to FIG. 38. The same constituent elements as those of the imaging devices according to the first and second embodiments illustrated in FIG. 1A to FIG. 31E are given the same reference numerals to omit or simplify the description.

In the first and second embodiments, the two photodiodes 310A, 310B different in light-receiving efficiency (sensitivity) are used depending on the accumulation time to enable moving image shooting suitable for various shooting scenes. In the present embodiment, an example of controlling the accumulation time of one photodiode to achieve the same effect as that of the first and second embodiments will be described.

The imaging device according to the present embodiment is the same as the imaging device according to the first embodiment except that the circuit configuration of the pixels 303 of the imaging element 184 is different.

Figure 32:
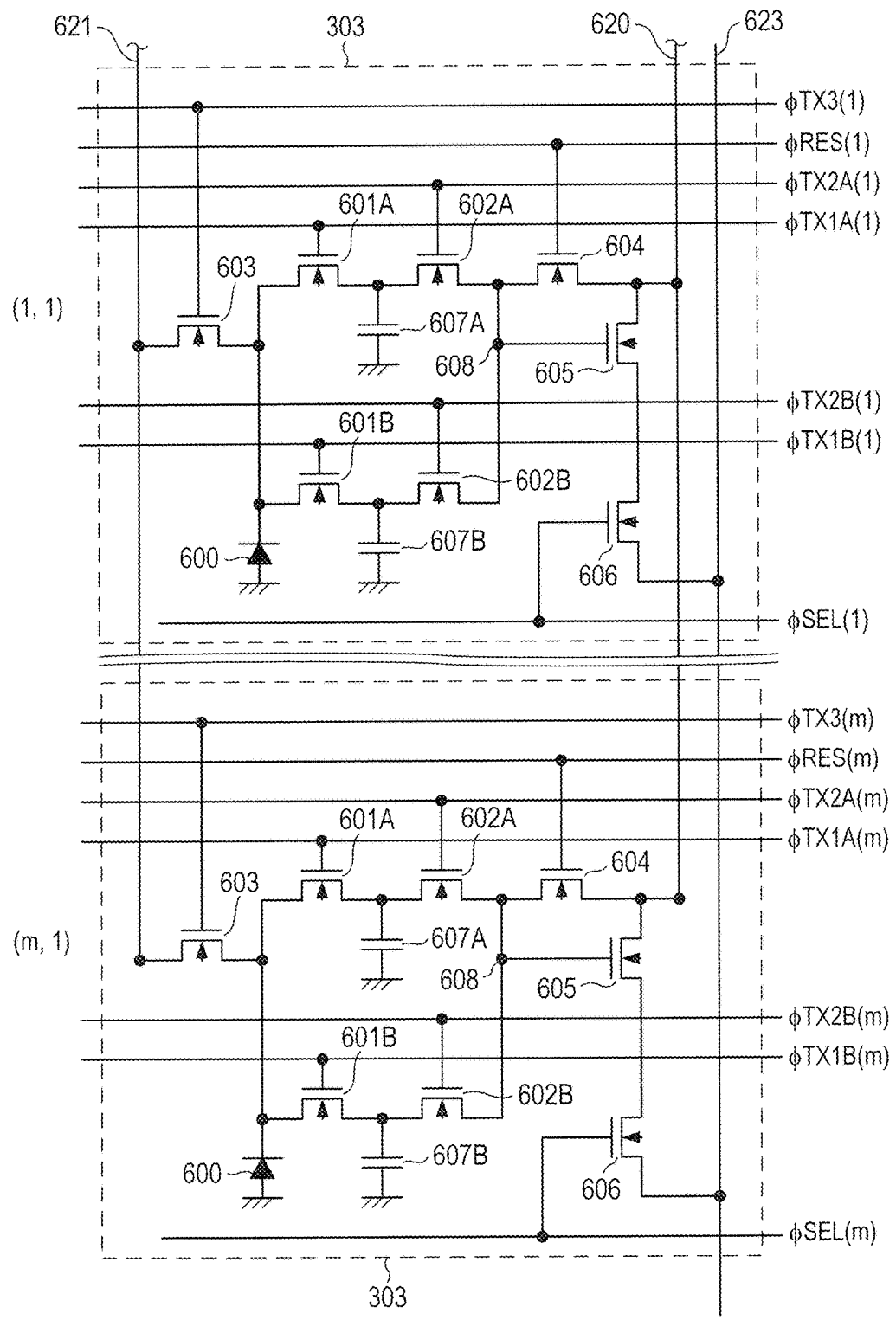
FIG. 32 is a circuit diagram illustrating a configuration example of pixels of an imaging element of the imaging device according to a third embodiment of the present invention.

FIG. 32 is a circuit diagram illustrating a circuit configuration of the pixels 303 of the imaging element 184 of the imaging device according to the present embodiment. FIG. 32 illustrates a pixel 303 in the first column and the first row and a pixel 303 in the first column and the m-th row among the plurality of pixels 303 that constitute the pixel array 302. As illustrated in FIG. 32, each pixel 303 includes a photodiode 600, transfer transistors 601A, 601B, 602A, 602B, and 603, a reset transistor 604, an amplifier transistor 605, and a select transistor 606.

The anode of the photodiode 600 is connected to the ground line. The cathode of the photodiode 600 is connected to the source of the transfer transistor 601A, the source of the transfer transistor 601B, and the source of the transfer transistor 603, respectively. The drain of the transfer transistor 601A is connected to the source of the transfer transistor 602A. A connection node between the drain of the transfer transistor 601A and the source of the transfer transistor 602A forms a signal holding unit 607A. The drain of the transfer transistor 601B is connected to the source of the transfer transistor 602B. A connection node between the drain of the transfer transistor 601B and the source of the transfer transistor 602B forms a signal holding unit 607B.

The drain of the transfer transistor 602A and the drain of the transfer transistor 602B are connected to the source of the reset transistor 604 and the gate of the amplifier transistor 605. A connection node of the drain of the transfer transistor 602A, the drain of the transfer transistor 602B, the source of the reset transistor 604, and the gate of the amplifier transistor 605 forms a floating diffusion region 608. The source of the amplifier transistor 605 is connected to the drain of the select transistor 606. The drain of the reset transistor 604 and the drain of the amplifier transistor 605 are connected to a power source line 620. The drain of the transfer transistor 603 is connected to a power source line 621. The source of the select transistor 606 is connected to a signal output line 623.

Thus, each pixel 303 of the imaging element 184 of the imaging device according to the present embodiment includes two signal holding units 607A, 607B for one photodiode 600. Since the basic structure of a CMOS type imaging element 184 having signal holding units is disclosed, for example, in Japanese Patent Application Laid-Open No. 2013-172210 by the applicant of the present application, detailed description thereof will be omitted here.

The plurality of pixels 303 of the pixel array 302 are connected in units of rows to control lines arranged in the row direction from the vertical scanning circuit 307. The control lines in each row include a plurality of control lines connected to the gates of the transfer transistors 601A, 602A, 601B, 602B, and 603, the reset transistor 604, and the select transistor 606, respectively. The transfer transistor 601A is controlled by a transfer pulse φTX1A, and the transfer transistor 602A is controlled by a transfer pulse φTX2A. The transfer transistor 601B is controlled by a transfer pulse φTX1B, and the transfer transistor 602B is controlled by a transfer pulse φTX2B. The reset transistor 604 is controlled by a reset pulse φRES, and the select transistor 606 is controlled by a select pulse φSEL. The transfer transistor 603 is controlled by a transfer pulse φTX3. Each control pulse is sent out from the vertical scanning circuit 307. Each transistor is on-state when the control pulse is at the high level, and off-state when the control pulse is at the low level.

The imaging element 184 that forms part of the imaging device of the present embodiment includes the two signal holding units 607A, 607B for one photodiode 600. This enables a first moving image having a stop motion effect and a second moving image with less jerkiness to be shot at the same time. Therefore, two images different in accumulation period can be read out without reducing the S/N ratios.

The shooting conditions for the first moving image (corresponding to "picture A") and the second moving image (corresponding to "picture B") in the imaging device may be set in the same way as those in the first and second embodiments.

FIG. 33 is a program AE chart in the dual image mode. The abscissa indicates Tv value and corresponding shutter speed, and the ordinate indicates Av value and corresponding aperture value. Further, the diagonal direction is equivalent Bv line. The relationship between the Bv value and the ISO sensitivity of the first moving image ("picture A") is represented in a gain notation area 556, and the relationship between the Bv value and the ISO sensitivity of the second moving image ("picture B") is represented in a gain notation area 557. In FIG. 33, each Bv value is represented as a numeric value surrounded by a rectangle to distinguish from the other parameters.

Referring to FIG. 33, it will be described how the shutter speed, the aperture value, and the ISO sensitivity vary according to variations from high brightness to low brightness. Since the imaging device of the present embodiment is used to shoot the first moving image and the second moving image at the same time, the same aperture value is set for the same object brightness in the program AE chart.

First, when Bv value is 14, the ISO sensitivity of the first moving image is set to ISO 100. The equivalent Bv line of the first moving image intersects with a program chart 558 of the first moving image at point 551, and it is determined from the point 551 that the shutter speed is 1/4000 second and the aperture value is F11. On the other hand, the ISO sensitivity of the second moving image is set to ISO 1. The equivalent Bv line of the second moving image intersects with a program chart 559 of the second moving image at point 552, and it is determined from the point 552 that the shutter speed is 1/60 second and the aperture value is F11.

When Bv value is 11, the ISO sensitivity of the first moving image increases by one step and is set to ISO 200. The equivalent Bv line of the first moving image intersects with the program chart 558 of the first moving image at point 553, and it is determined from the point 553 that the shutter speed is 1/1000 second and the aperture value is F11. On the other hand, the ISO sensitivity of the second moving image is set to ISO 12. The equivalent Bv line of the second moving image intersects with the program chart 559 of the second moving image at the point 552, and it is determined from the point 552 that the shutter speed is 1/60 second and the aperture value is F11.

When Bv value is 7, the ISO sensitivity of the first moving image is set to ISO 200. The equivalent Bv line of the first moving image intersects with the program chart 558 of the first moving image at point 554, and it is determined from the point 554 that the shutter speed is 1/1000 second and the aperture value is F2.8. On the other hand, the ISO sensitivity of the second moving image is set to ISO 12. The equivalent Bv line of the second moving image intersects with the program chart 559 of the second moving image at point 555, and it is determined from the point 555 that the shutter speed is 1/60 second and the aperture value is F2.8.

When Bv value is 6, the ISO sensitivity of the first moving image increases by one step and is set to ISO 400. The equivalent Bv line of the first moving image intersects with the program chart 558 of the first moving image at the point 554, and it is determined from the point 554 that the shutter speed is 1/1000 second and the aperture value is F2.8. On the other hand, the ISO sensitivity of the second moving image is set to ISO 25. The equivalent Bv line of the second moving image intersects with the program chart 559 of the second moving image at the point 555, and it is determined from the point 555 that the shutter speed is 1/60 second and the aperture value is F2.8.

After that, as the brightness is reduced, gain-up is performed to increase the ISO sensitivity without changing the shutter speed and the aperture value of both of the first moving image and the second moving image.

The exposure operation illustrated in this program AE chart is so performed that the first moving image will keep a shutter speed of 1/1000 second or faster over the entire brightness range written, and the second moving image will keep a shutter speed of 1/60 second over the entire brightness range. Thus, a high-definition moving image with less jerkiness can be obtained in the second moving image while achieving the stop motion effect in the first moving image.

In the meantime, the first moving image and the second moving image shot with the same aperture value at the same time are controlled to be different in ISO sensitivity from each other. However, when exposure control is performed to make the exposure of the first moving image proper, the signal of the second moving image is so saturated that the ISO sensitivity cannot be controlled. Therefore, in the imaging device according to the present embodiment, a short accumulation period is performed Np times (where Np is an integer of 2 or more (Np>1)) at equal intervals while the shutter speed is 1/60 second corresponding to the frame rate of the second moving image. Then, the charge accumulated between respective accumulation periods performed Np times is added up to generate an image to make the ISO sensitivity virtually low.

In the present embodiment, a period corresponding to the shutter speed of 1/60 second of the second moving image is set as a period during which accumulation in the short accumulation period performed Np times for the second moving image is performed. Further, a period corresponding to the shutter speed of 1/1000 second of the first moving image is set as an accumulation period for the first moving image (i.e., the accumulation time for the first moving image is 1/1000 second). Then, the short accumulation period for the second moving image is so controlled that the total accumulation time for the second moving image will become equal to the accumulation time for the first moving image.

In other words, the total accumulation time for the second moving image generated by adding up charge accumulated during the short accumulation period performed Np times during the period corresponding to the shutter speed of the second moving image is controlled to become equal to the accumulation time for the first moving image. Further, each of the accumulation times of Np times of accumulation periods for one second moving image is so controlled that the ISO sensitivity of the second moving image will become equal to the ISO sensitivity of a first moving image shot during the shooting period of the second moving image.

As an example, suppose that when the brightness is Bv7, charge is accumulated and added up 16 times during the period corresponding to the shutter speed of 1/60 second to generate the second moving image. In this case, each of the accumulation times of Np times of accumulation periods for generation of the second moving image is set to 1/16000 second to make the ISO sensitivity of the second moving image equivalent to the ISO sensitivity (ISO 200) of the first moving image.

Figure 34:
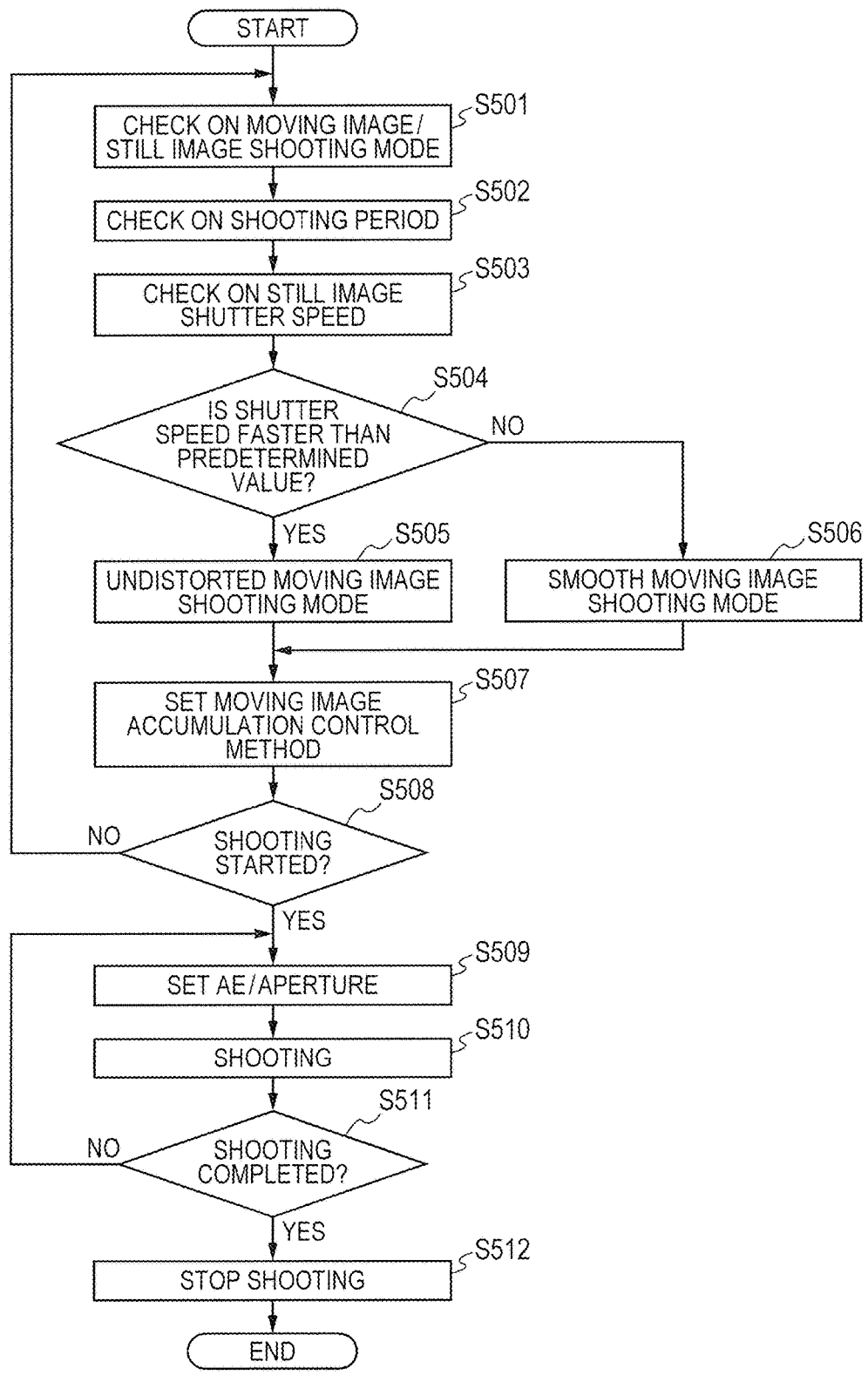
FIG. 34 is a flowchart illustrating a method of driving the imaging device according to the third embodiment of the present invention.

FIG. 34 is a flowchart of shooting operation in the dual image mode to shoot the first moving image and the second moving image at the same time. Since the first moving image is suitable for viewing of a still image having the stop motion effect, the first moving image may be referred to as "still image" and the second moving image may be referred to as "moving image" in the following description to distinguish between the first moving image and the second moving image. Further, the shooting mode in the present embodiment may be called a "moving image/still image shooting mode" for descriptive purposes.

When the first moving image and the second moving image are shot at the same time, the imaging device of the present embodiment can perform shooting in either of a moving image shooting mode capable of shooting a smooth moving image and a moving image shooting mode in which rolling distortion generally produced in a CMOS-type imaging element is not generated. Therefore, in the present embodiment, either a first moving image/still image shooting mode capable of shooting a smooth moving image or a second moving image/still image shooting mode capable of shooting a moving image without rolling distortion is selected depending on the shutter speed of the first moving image. Referring to the flowchart of FIG. 34, shooting operation in the dual image mode will be described below.

First, in step S501, the system control CPU 178 as a control unit of the imaging device checks on a moving image/still image shooting mode set by a person who performs shooting. When checking that the shooting mode is the dual image mode to shoot the first moving image and the second moving image at the same time, the system control CPU 178 proceeds to step S502.

Then, in step S502, the system control CPU 178 checks on a set shooting period of the second moving image.

Then, in step S503, the system control CPU 178 checks on a shutter speed (still image shutter speed) of the first moving image set by the person who performs shooting.

Then, in step S504, the system control CPU 178 determines whether the set shutter speed of the first moving image is faster than a predetermined value. When determining that the shutter speed of the first moving image is set to a shutter speed faster than a predetermined shutter speed Tth to obtain an image having the stop motion effect on an object moving fast (yes), the system control CPU 178 proceeds to step S505. In step S505, the system control CPU 178 sets the moving image/still image shooting mode to the second moving image/still image shooting mode (undistorted moving image shooting mode) in which rolling distortion is not generated, and proceeds to step S507.

On the other hand, when determining that the shutter speed of the first moving image is set to a shutter speed slower than the predetermined shutter speed Tth (no), the system control CPU 178 proceeds to step S506. In step S506, the system control CPU 178 sets the moving image/still image shooting mode to the first moving image/still image shooting mode (smooth moving image shooting mode) capable of shooting a smooth moving image, and proceeds to step S507.

When the moving image/still image shooting mode is set in step S505 or step S506, the system control CPU 178 sets, in step S507, a control method for the imaging element 184 according to the set moving image/still image shooting mode. The control methods for the imaging element 184 in the first moving image/still image shooting mode and the second moving image/still image shooting mode will be described later.

Then, in step S508, the system control CPU 178 checks on the state of the switch MV 155 as a button used to start and stop moving image shooting through the switch input unit 179 to determine whether to start shooting. When the start of moving image shooting is not instructed at the switch MV 155 (no), the system control CPU 178 returns to step S501 to repeat the procedure from checking on the moving image/still image shooting mode. On the other hand, when the start of moving image shooting is instructed at the switch MV 155 (yes), the system control CPU 178 proceeds to step S509.

In step S509, the system control CPU 178 controls the aperture 181 of the photographing optical system 152 through the aperture control unit 182 based on AE information on images captured before then and the set shutter speed of the first moving image.

Then, in step S510, the system control CPU 178 drives the imaging element 184 through the timing generation unit 189 to perform shooting. In the present embodiment, since the shooting mode is the dual image mode to shoot the first moving image and the second moving image at the same time, the shooting operation is performed by the switch MV 155 as the button to start and stop moving image shooting. The shooting operation is performed according to the control method for the imaging element 184 set in step S507. The control method for the imaging element 184 will be described later.

Then, in step S511, the system control CPU 178 checks on the state of the switch MV 155 as the button to start and stop moving image shooting through the switch input unit 179 to determine whether the shooting is completed. When the switch MV 155 is set in a shooting state (no), the system control CPU 178 returns to step S509 to continue shooting. On the other hand, when the switch MV 155 is set in a shooting stopped state (yes), the system control CPU 178 proceeds to step S512 to stop shooting.

Figure 35:
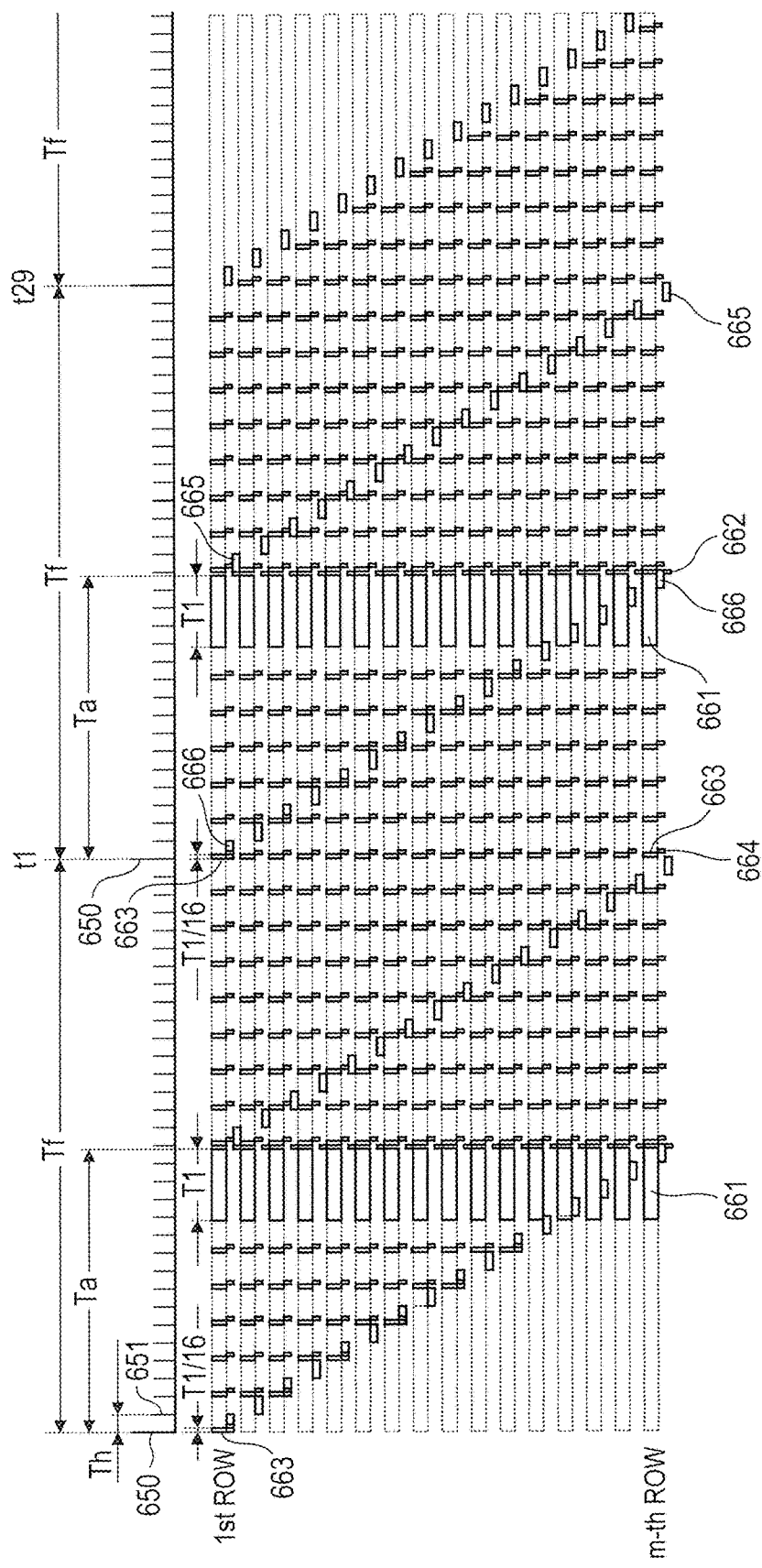
FIG. 35 is a chart for describing a method of driving the imaging element in a first moving image/still image shooting mode.

FIG. 35 is a chart for describing the accumulation and readout timings of the imaging element 184 in the imaging device of the present embodiment when the first moving image and the second moving image are shot at the same time in the first moving image/still image shooting mode capable of shooting a smooth moving image. The term "accumulation" here means operation for transferring and accumulating charge generated in the photodiode 600 to and in the signal holding units 607A, 607B. The term "readout" means operation for outputting signals based on the charges, held in the signal holding units 607A, 607B, to the outside of the imaging element 184 via the floating diffusion region 608.

In FIG. 35, the abscissa is expressed in time to illustrate a vertical synchronization signal 650, a horizontal synchronization signal 651, a still image accumulation period 661, a still image transfer period 662, a still image readout period 665, a moving image accumulation period 663, a moving image transfer period 664, and a moving image readout period 666. Here, the still image accumulation period 661 indicates an accumulation period of signal charge for the first moving image into the photodiode 600. The still image transfer period 662 indicates a period of transferring the signal charge for the first moving image from the photodiode 600 to the signal holding unit 607A. The still image readout period 665 indicates a readout period of the first moving image. The moving image accumulation period 663 indicates an accumulation period of signal charge for the second moving image into the photodiode 600. The moving image transfer period 664 indicates a period of transferring the signal charge for the second moving image from the photodiode 600 to the signal holding unit 607B. The moving image readout period 666 indicates a readout period of the second moving image.

In this driving example, the first moving image and the second moving image are read out during each cycle of the vertical synchronization signal 650. Further, timings of 16 rows are illustrated in FIG. 35 for descriptive purposes, but the actual imaging element 184 has thousands of rows. In FIG. 35, the final row is the m-th row.

The first moving image is generated based on signal charge generated during one accumulation period (still image accumulation period 661) performed simultaneously in all rows during each cycle (time Tf) of the vertical synchronization signal 650. The second moving image is generated based on signal charge obtained by adding up signal charges respectively generated during accumulation periods (moving image accumulation periods 663) divided by the number of Np times (where Np is an integer of 2 or more (Np>1)). Np as the number of accumulation periods of the second moving image performed during one shooting period is, for example, 16 times, and these accumulation periods are performed at equal time intervals. The interval (time Tf) of the vertical synchronization signal 650 is ⅟60 second, which approximately corresponds to a period during which Np times of accumulation periods of the second moving image are performed in the first moving image/still image shooting mode. The accumulation of the first moving image is performed during the readout of the second moving image (moving image readout period 666) in one shooting period.

This enables shooting of the first moving image and the second moving image at the same time. An image having no blur can also be acquired as the first moving image at a short accumulation time intended by the person who performs shooting. Further, Np times of accumulation periods performed at equal time intervals virtually mean one long accumulation period from the start time of the first accumulation period to the end time of the Np-th accumulation period. Therefore, a smooth image with less jerkiness can be acquired as the second moving image.

In FIG. 35, the accumulation period of the first moving image (still image accumulation period 661) is set to a time corresponding to a shutter speed T1 set by the person who performs shooting. In this driving example, the shutter speed T1 is set to ⅟500 second. The accumulation period of the first moving image is set to be performed simultaneously in all rows and be completed immediately before the start of readout of the first moving image in the first row (still image readout period 665). The end time of the accumulation period of the first moving image is a time after a lapse of time Ta from the vertical synchronization signal 650. The time Ta is set to be half or less of the interval Tf of the vertical synchronization signal 650. Since the end time of the accumulation period of the first moving image (still image accumulation period 661) is the same in all rows, the start time of the accumulation period of the first moving image with respect to the vertical synchronization signal 650 is set according to the shutter speed T1 of the first moving image.

On the other hand, the accumulation period of the second moving image (moving image accumulation period 663) is performed plural times at equal time intervals during each cycle. In this driving example, the time interval is set to complete the accumulation period divided into 16 times immediately before the start of the readout of each row (moving image readout period 666). The time interval of the accumulation period of the second moving image may be set to be a multiple of an integer for the interval Th of the horizontal synchronizing signal 651. Thus, the accumulation timing of the second moving image in each row is the same as that in the other rows. In FIG. 35, the time interval of the accumulation period of the second moving image is illustrated to be twice the interval Th of the horizontal synchronization signal 651 for descriptive purposes. When the number of rows of the imaging element 184 is denoted by m, and the number of accumulations of the second moving image during each cycle is denoted by Np, the time interval of the accumulation period of the second moving image is generally set to a value obtained by multiplying an integer not exceeding m/Np by the interval Th of the horizontal synchronization signal 651.

Further, one accumulation time of the second moving image is set to T1/Np (=⅟8000 second). The start time of the accumulation period of the second moving image in each row is fixed with respect to the vertical synchronization signal 650. The end time of one accumulation period of the second moving image is set with respect to the vertical synchronization signal 650 depending on the still image shutter speed T1 set by the person who performs shooting.

In FIG. 35, since the accumulation time (T1) of the first moving image is long, the number of accumulations Np of the second moving image during each cycle is 14 times. Therefore, the second moving image generated during one shooting period is corrected using the first moving image generated during the same shooting period.

Figure 36:
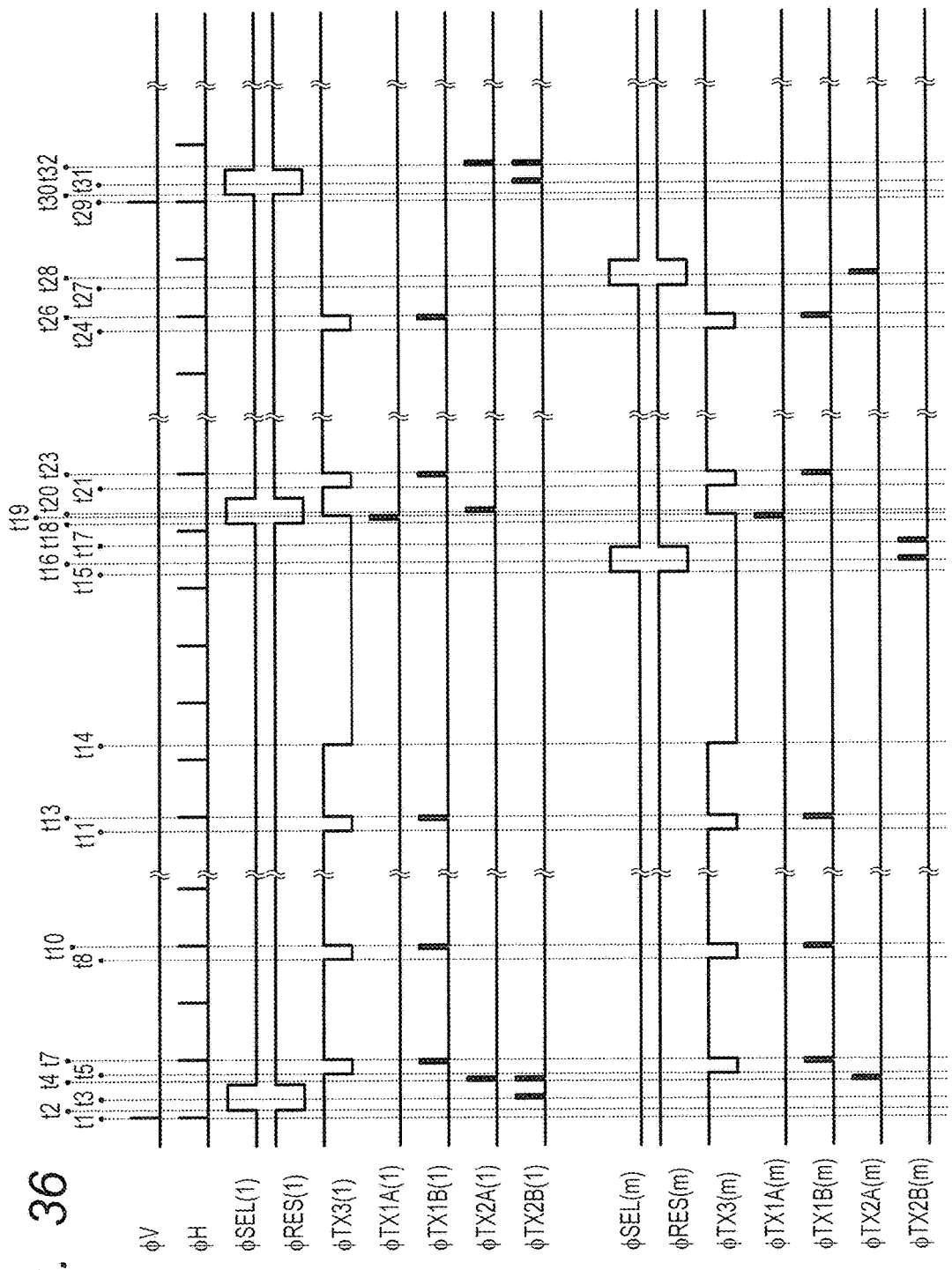
FIG. 36 is a timing chart illustrating a driving sequence of the imaging element in the first moving image/still image shooting mode.

Referring next to a timing chart of FIG. 36, an example of the control method for the imaging element 184 during the shooting period starting at time t1 in FIG. 35 will be described. Time t1 at which a vertical synchronization signal φV rises in FIG. 36 is the same as time t1 at which the vertical synchronization signal 650 rises in FIG. 35.

It is assumed here that the imaging element 184 has m rows of pixels in the vertical direction. In FIG. 36, the timings of the first row and the m-th row as the final row are illustrated among the m rows. In FIG. 36, a signal φV is the vertical synchronization signal, and a signal φH is the horizontal synchronization signal.

First, at time t1, the vertical synchronization signal φV and the horizontal synchronization signal φH supplied from the timing generation unit 189 are changed from the low level to the high level.

Then, at time t2 synchronized with the change of the vertical synchronization signal φV to the high level, a reset pulse φRES(1) for the first row supplied from the vertical scanning circuit 307 is changed from the high level to the low level. This causes the reset transistor 604 of each pixel 303 in the first row to be turned off to release the reset state of the floating diffusion region 608. Simultaneously, a select pulse φSEL(1) for the first row supplied from the vertical scanning circuit 307 is changed from the low level to the high level. This causes the select transistor 606 of each pixel 303 in the first row to be turned on to enable the readout of an image signal from each pixel 303 in the first row.

Then, at time t3, a transfer pulse φTX2B(1) for the first row supplied from the vertical scanning circuit 307 is changed from the low level to the high level. This causes the transfer transistor 602B of each pixel 303 in the first row to be turned on to transfer, to the floating diffusion region 608, signal charge of the second moving image accumulated in the signal holding unit 607B during the previous shooting period (a shooting period completed at time t1). As a result, a signal corresponding to a change in the potential of the floating diffusion region 608 is read out into the signal output line 623 via the amplifier transistor 605 and the select transistor 606. The signal read out into the signal output line 623 is supplied to an unillustrated readout circuit, and output to the outside as an image signal of the second moving image of each pixel in the first row (corresponding to the moving image readout period 666 in FIG. 35).

Then, at time t4, a transfer pulse φTX2B(1) for the first row and transfer pulses φTX2A (φTX2A(1), φTX2A(m)) for all rows supplied from the vertical scanning circuit 307 are changed from the low level to the high level. This causes the transfer transistor 602B of each pixel 303 in the first row and the transfer transistors 602A of the pixels 303 in all rows to be turned on. At this time, the reset pulses φRES (φRES(1), φRES(m)) in all rows are already changed to the high level, and hence the reset transistors 604 are in the on-state. Thus, the floating diffusion regions 608 of the pixels 303 in all rows, the signal holding units 607A of the pixels 303 in all rows, and the signal holding unit 607B of each pixel 303 in the first row are reset. At this time, the select pulse φSEL(1) in the first row is also changed to the low level, and each pixel 303 in the first row is returned to an unselected state.

Then, at time t5, transfer pulses φTX3 (φTX3(1), φTX3(m)) for all rows supplied from the vertical scanning circuit 307 are changed from the high level to the low level. This causes the transfer transistors 603 in all rows to be turned off to release the reset of the photodiodes 600 of the pixels 303 in all rows so as to start the accumulation of signal charge of the second moving image in the photodiodes 600 of the pixels 303 in all rows (corresponding to the moving image accumulation period 663 in FIG. 35).

Here, a time interval Tb between time t1, at which the vertical synchronization signal φV becomes the high level, and time t5, at which the accumulation of signal charge of the second moving image in the photodiodes 600 of the pixels 303 in all rows is started, is fixed.

Note that the start of the accumulation period of the first row of the second moving image at time t5 in FIG. 36 represents the start of the accumulation period of the second moving image in the shooting period from time t1 in FIG. 35. Further, the start of the accumulation period of the m-th row of the second moving image at time t5 represents the start of the accumulation period of the second moving image in the shooting period before time t1 in FIG. 35.

Then, immediately before time t7, transfer pulses φTX1B (φTX1B(1), φTX1B(m)) for all rows supplied from the vertical scanning circuit 307 are changed from the low level to the high level. This causes the transfer transistors 601B of the pixels 303 in all rows to be turned on to transfer, to the signal holding units 607B, the signal charges accumulated in the photodiodes 600 of the pixels 303 in all rows (corresponding to the moving image transfer period 664 in FIG. 35).

Then, at time t7, the transfer pulses φTX1B (φTX1B(1), φTX1B(m)) for all rows are changed from the high level to the low level. This causes the transfer transistors 601B of the pixels 303 in all rows to be turned off to complete the transfer of the signal charges accumulated in the photodiodes 600 to the signal holding units 607B.

A period from time t5 to time t7 corresponds to the accumulation time (=T1/16) in each of the Np accumulation periods of the second moving image.

Similarly, at time t7, the transfer pulses φTX3 (φTX3(1), φTX3(m)) for all rows are changed from the low level to the high level. This causes the transfer transistors 603 of the pixels 303 in all rows to be turned on to put the photodiodes 600 of the pixels 303 in all rows into the reset state.

The second accumulation period of the second moving image is started at time t8 after a lapse of the time twice the interval Th of the horizontal synchronization signal φH from time t5 at which the first accumulation period of the second moving image in the shooting period starting at time t1 is started.

Since the operation of the second accumulation period of the second moving image starting at time t8 and ending at time t10 is the same as the operation of the first accumulation period of the second moving image starting at time t5 and ending at time t7 as mentioned above, the description thereof will be omitted.

Here, in the operation of the first and the second accumulation periods of the second moving image, signal charges of the second moving image generated during these two accumulation periods are added up and held in the signal holding unit 607B.

Then, during a period from time t10 to time t11, the third to fifth accumulation periods of the second moving image are performed in the same manner as the period from time t5 to time t7 as mentioned above.

Then, the sixth accumulation period of the second moving image is started at time t11. Here, the start time t11 of the sixth accumulation period of the second moving image is set to the time after a lapse of the time T (=6×2×Th+Tb) from time t1 at which the vertical synchronization signal φV becomes the high level. Here, Th denotes the time interval of the horizontal synchronization signal φH, and Tb denotes a time interval between time t1 at which the vertical synchronization signal φV becomes the high level and time t5 at which the first accumulation period of the second moving image is started in the photodiode 600.

Since the operation of the sixth accumulation period of the second moving image starting at time t11 and ending at time t13 is the same as the operation of the first accumulation period of the second moving image starting at time t5 and ending at time t7 as mentioned above, the description thereof will be omitted.

Then, the accumulation period of the first moving image as the first image is started at time t14. In this driving example, the number of accumulation periods of the first moving image in one shooting period is once. The start time of the readout period of the first moving image (corresponding to the still image readout period 665 in FIG. 35) with respect to the vertical synchronization signal φV is fixed. Therefore, the end time of the accumulation period of the first moving image with respect to the vertical synchronization signal φV is fixed to a time after a lapse of time Ta from the start time, and the accumulation period of the first moving image is set to be completed at time t19. Here, a time interval from time t1 to time t19 corresponds to time Ta in FIG. 35. The start time of the accumulation period of the first moving image is controlled based on the shutter speed T1 of the first moving image set by the person who performs shooting.

At time t14 back by time T1 from time t19 as the end time of the accumulation period of the first moving image, the transfer pulses φTX3 (φTX3(1), φTX3(m)) for all rows are changed from the high level to the low level. This causes the transfer transistors 603 of the pixels 303 in all rows to be turned off to release the reset of the photodiodes 600 of the pixels 303 in all rows. Then, the accumulation period of signal charge of the first moving image in the photodiodes 600 of the pixels 303 in all rows is started (corresponding to the still image accumulation period 661 in FIG. 35).

Further, during the accumulation period of signal charge of the first moving image, the readout period of the m-th row of the second moving image in the previous shooting period that ends at time t1 is completed.

First, at time t15, the reset pulse ϕRES(m) for the m-th row supplied from the vertical scanning circuit 307 is changed from the high level to the low level. This causes the reset transistor 604 of each pixel 303 in the m-th row to be turned off to release the reset state of the floating diffusion region 608. Simultaneously, a select pulse ϕSEL(m) for the m-th row supplied from the vertical scanning circuit 307 is changed from the low level to the high level. This causes the select transistor 606 of each pixel 303 in the m-th row to be turned on to enable the readout of the image signal from each pixel 303 in the m-th row.

Then, at time t16, a transfer pulse ϕTX2B(m) for the m-th row is changed from the low level to the high level. This causes the transfer transistor 602B of each pixel 303 in the m-th row to be turned on to transfer, to the floating diffusion region 608, the signal charge of the second moving image accumulated in the signal holding unit 607B during the previous shooting period that ends at time t1. As a result, a signal corresponding to a change in the potential of the floating diffusion region 608 is read out into the signal output line 623 via the amplifier transistor 605 and the select transistor 606. The signal read out into the signal output line 623 is supplied to an unillustrated readout circuit, and output to the outside as an image signal of the second moving image of each pixel in the m-th row (corresponding to the moving image readout period 666 in FIG. 35).

Thus, the readout of the second moving image in the previous shooting period that ends at time t1 is completed. Next, the readout of the first moving image in the shooting period that starts at time t1 is performed (corresponding to the still image readout period 665 in FIG. 35).

Then, at time t17, the transfer pulse ϕTX2B(m) for the m-th row is changed from the low level to the high level. This causes the transfer transistor 602B of each pixel 303 in the m-th row to be turned on. At this time, the reset pulse ϕRES(m) in the m-th row is already changed to the high level, and hence the reset transistor 604 is in the on-state. Thus, the floating diffusion region 608 of each pixel 303 in the m-th row, and the signal holding unit 607B of each pixel 303 in the m-th row are reset. At this time, the select pulse ϕSEL(m) in the m-th row is also changed to the low level, and each pixel in the m-th row is returned to the unselected state.

Then, at time t18, the reset pulse ϕRES(1) for the first row is changed from the high level to the low level. This causes the reset transistor 604 of each pixel 303 in the first row to be turned off to release the reset of the floating diffusion region 608. Simultaneously, the select pulse ϕSEL(1) for the first row is changed from the low level to the high level. This causes the select transistor 606 of each pixel 303 in the first row to be turned on to enable the readout of an image signal from each pixel 303 in the first row.

Then, immediately before time t19, transfer pulses ϕTX1A (ϕTX1A(1), ϕTX1A(m)) for all rows supplied from the vertical scanning circuit 307 are changed from the low level to the high level. This causes the transfer transistors 601A of the pixels 303 in all rows to be turned on to transfer, to the signal holding units 607A, the signal charges accumulated in the photodiodes 600 of the pixels 303 in all rows (corresponding to the still image transfer period 662 in FIG. 35).

At time t19, the transfer pulses ϕTX1A (ϕTX1A(1), ϕTX1A(m)) for all rows are changed from the high level to the low level. This causes the transfer transistors 601A of the pixels 303 in all rows to be turned off to complete the transfer of the signal charges accumulated in the photodiodes 600 of the pixels 303 in all rows to the signal holding units 607A.

A period from time t14 to time t19 corresponds to the accumulation time (T1) of the first moving image in the shooting period that starts at time t1. In this driving example, since the number of accumulation periods of the first moving image in one shooting period is once, the accumulation time of the first moving image is the same as the time corresponding to the accumulation period.

Then, at time t20, the transfer pulse ϕTX2A(1) for the first row is changed from the low level to the high level. This causes the transfer transistor 602A of each pixel 303 in the first row to be turned on to transfer, to the floating diffusion region 608, the signal charge accumulated in the signal holding unit 607A of each pixel 303 in the first row. As a result, a signal corresponding to a change in the potential of the floating diffusion region 608 is read out into the signal output line 623 via the amplifier transistor 605 and the select transistor 606 of each pixel 303 in the first row. The signal read out into the signal output line 623 is supplied to an unillustrated readout circuit, and output to the outside as an image signal of the first moving image of each pixel in the first row (corresponding to the still image readout period 665 in FIG. 35).

Then, the seventh accumulation period of the second moving image is started at time t21. Here, the start time t21 of the seventh accumulation period of the second moving image is set to a time after a lapse of time T (=(7+2)×2×Th+Tb) from time t1 at which the vertical synchronization signal ϕV becomes the high level. In this driving example, two accumulation periods of the second moving image overlap the accumulation period of the first moving image (corresponding to the still image accumulation period 661 in FIG. 35). Therefore, the start time t21 of the seventh accumulation period of the second moving image is equivalent to the start time of the ninth accumulation period of the second moving image in the shooting period that starts at time t1.

Since the operation of the seventh accumulation period of the second moving image starting at time t21 and ending at time t23 is the same as the operation of the first accumulation period of the second moving image starting at time t5 and ending at time t7 as mentioned above, the description thereof will be omitted.

Then, during a period from time t23 to time t24, the eighth to thirteenth accumulation periods of the second moving image are performed in the same manner as the period from time t5 to time t7 as mentioned above.

Then, the final fourteenth accumulation period of the second moving image in the shooting period that starts at time t1 is started at time t24. Here, the start time t24 of the fourteenth accumulation period of the second moving image is set to a time after a lapse of time T (=(14+2)×2×Th+Tb) from time t1 at which the vertical synchronization signal ϕV becomes the high level.

Since the operation of the fourteenth accumulation period of the second moving image starting at time t24 and ending at time t26 is the same as the operation of the first accumulation period of the second moving image starting at time t5 and ending at time t7 as mentioned above, the description thereof will be omitted. In the shooting mode, the period to perform the Np accumulation periods of the second moving image is a period from time t5 to time t26.

Then, at time t27, the reset pulse φRES(m) for the m-th row is changed from the high level to the low level. This causes the reset transistor 604 of each pixel 303 in the m-th row to be turned off to release the reset state of the floating diffusion region 608. Simultaneously, the select pulse φSEL (m) for the m-th row is changed from the low level to the high level. This causes the select transistor 606 of each pixel 303 in the m-th row to be turned on to enable the readout for the image signal from each pixel 303 in the m-th row.

Then, at time t28, the transfer pulse φTX2A(m) for the m-th row is changed from the low level to the high level. This causes the transfer transistor 602A of each pixel 303 in the m-th row to be turned on to transfer, to the floating diffusion region 608, the signal charge of the first moving image accumulated in the signal holding unit 607A of each pixel 303 in the m-th row. As a result, a signal corresponding to a change in the potential of the floating diffusion region 608 is read out into the signal output line 623 via the amplifier transistor 605 and the select transistor 606 of each pixel 303 in the m-th row. The signal read out into the signal output line 623 is supplied to an unillustrated readout circuit, and output to the outside as an image signal of the first moving image of each pixel in the m-th row (corresponding to the still image readout period 665 in FIG. 35).

Then, at time t29, the vertical synchronization signal φV supplied from the timing generation unit 189 is changed from the low level to the high level to start the next shooting period.

As described above, in the first moving image/still image shooting mode, the end time of the accumulation period of the first moving image is fixed with respect to the vertical synchronization signal, and the start time of the accumulation periods of the second moving image performed plural times in one shooting period is fixed with respect to the vertical synchronization signal. This enables the readout of the first moving image and the second moving image within the same shooting period.

Therefore, when the shutter speed T1 of the first moving image is slower than the predetermined shutter speed Tth, the first moving image short in accumulation time and having no blur, and the second moving image long in accumulation period and with less jerkiness can be shot in one shooting period at the same time.

Figure 37:
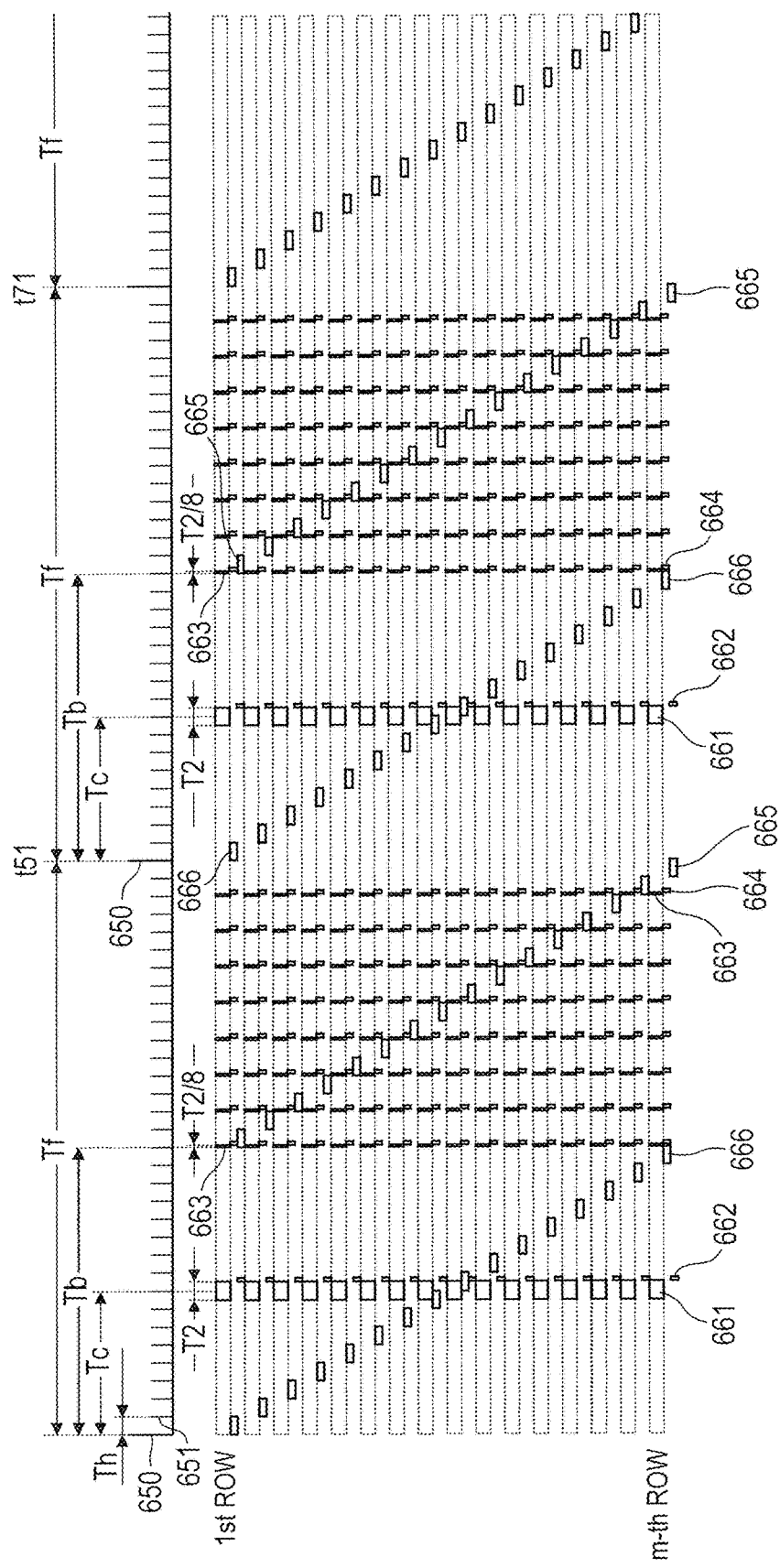
FIG. 37 is a chart for describing a method of driving the imaging element in a second moving image/still image shooting mode.

FIG. 37 is a chart for describing the accumulation and readout timings of the imaging element 184 in the imaging device of the present embodiment when the first moving image and the second moving image are shot at the same time in the second moving image/still image shooting mode capable of shooting a moving image without rolling distortion. The term "accumulation" here means operation for transferring and accumulating charge generated in the photodiode 600 to and in the signal holding units 607A, 607B. The term "readout" means operation for outputting signals based on the electric charges, held in the signal holding units 607A, 607B, to the outside of the imaging element 184 via the floating diffusion region 608.

In FIG. 37, the abscissa is expressed in time to illustrate a vertical synchronization signal 650, a horizontal synchronization signal 651, a still image accumulation period 661, a still image transfer period 662, a still image readout period 665, a moving image accumulation period 663, a moving image transfer period 664, and a moving image readout period 666. In this driving example, the first moving image and the second moving image are read out during each cycle of the vertical synchronization signal 650. Further, timings of 16 rows are illustrated in FIG. 37 for descriptive purposes, but the actual imaging element 184 has thousands of rows. In FIG. 37, the final row is the m-th row.

The first moving image is generated based on signal charge generated during one accumulation period (still image accumulation period 661) performed simultaneously in all rows during each cycle (time Tf) of the vertical synchronization signal 650. The second moving image is generated based on signal charge obtained by adding up signal charges respectively generated during accumulation periods (moving image accumulation periods 663) divided by the number of Np times (where Np is an integer of 2 or more (Np>1)). Np as the number of accumulation periods of the second moving image performed during one shooting period is, for example, eight times, and these accumulation periods are performed in all rows at equal time intervals during the readout period (still image readout period 665) of the first moving image. The interval (time Tf) of the vertical synchronization signal 650 corresponds to the frame rate of the moving image, which is 1/60 second in this driving example. Further, the accumulation of the first moving image is performed during the readout of the second moving image (moving image readout period 666) in one shooting period.

This enables shooting of the first moving image and the second moving image at the same time. An image having no blur can also be acquired as the first moving image at a short accumulation time intended by the person who performs shooting. Further, Np times of accumulation periods performed at equal time intervals virtually mean one long accumulation period from the start time of the first accumulation period to the end time of the Np-th accumulation period. Therefore, an image with less jerkiness and without rolling distortion can be acquired as the second moving image.

In the previous shooting period that ends at time t51 in FIG. 37, the accumulation period of the first moving image (still image accumulation period 661) is set to a time corresponding to a shutter speed T2 set by the person who performs shooting. In this driving example, the shutter speed T2 is set to 1/2000 second. The center time of the accumulation period of the first moving image is the same in all rows (a time after a lapse of time Tc from the vertical synchronization signal 650), which is so set that the accumulation period will be completed before the readout period of the first row of the first moving image (still image readout period 665). Here, since the time Tc up to the center time of the accumulation period of the first moving image is the same in all rows, the start time and end time of the accumulation period of the first moving image with respect to the vertical synchronization signal 650 are set depending on the shutter speed T2 of the first moving image. The time Tc up to the center time of the accumulation period of the first moving image is set to be the center of the readout period of the second moving image (moving image readout period 666), which is set to be about 1/4 of the time Tf corresponding to the interval of the vertical synchronization signal 650.

On the other hand, the accumulation period of the second moving image (moving image accumulation period 663) is performed plural times at equal time intervals during the readout period of the first moving image (still image readout period 665). In this driving example, the time interval is set to complete the accumulation period divided into eight times immediately before the start of the readout period of the first row of the second moving image (moving image readout period 666). The time interval of the accumulation period of the second moving image is set to be a multiple of an integer for the interval Th of the horizontal synchronization signal 651. Thus, the Np accumulation periods of all rows of the second moving image become the same. In FIG. 37, the time interval of the accumulation period of the second moving image is illustrated to be twice the interval Th of the horizontal synchronization signal 651 for descriptive purposes. When the number of rows of the imaging element 184 is denoted by m, and the number of accumulations of the second moving image during each cycle is denoted by Np, the time interval of the accumulation period of the second moving image is generally set to a value obtained by multiplying an integer not exceeding m/Np by the interval Th of the horizontal synchronizing signal 651.

Further, one accumulation time of the second moving image is set to T2/Np (=$\frac{1}{16000}$ second). The start time of the accumulation period of the second moving image in all rows is fixed with respect to the vertical synchronization signal 650. The end time of one accumulation period of the second moving image is set with respect to the vertical synchronization signal 650 depending on the shutter speed T2 of the first moving image set by the person who performs shooting.

It is also effective that the dead time of the second moving image generated during the previous shooting period that ends at time t51 is corrected using the first moving image generated in this shooting period.

Thus, the accumulation period of the second moving image is performed in all rows at the same timing during the readout period of a still image (still image readout period 665) so that a moving image without rolling distortion can be acquired.

Figure 38:
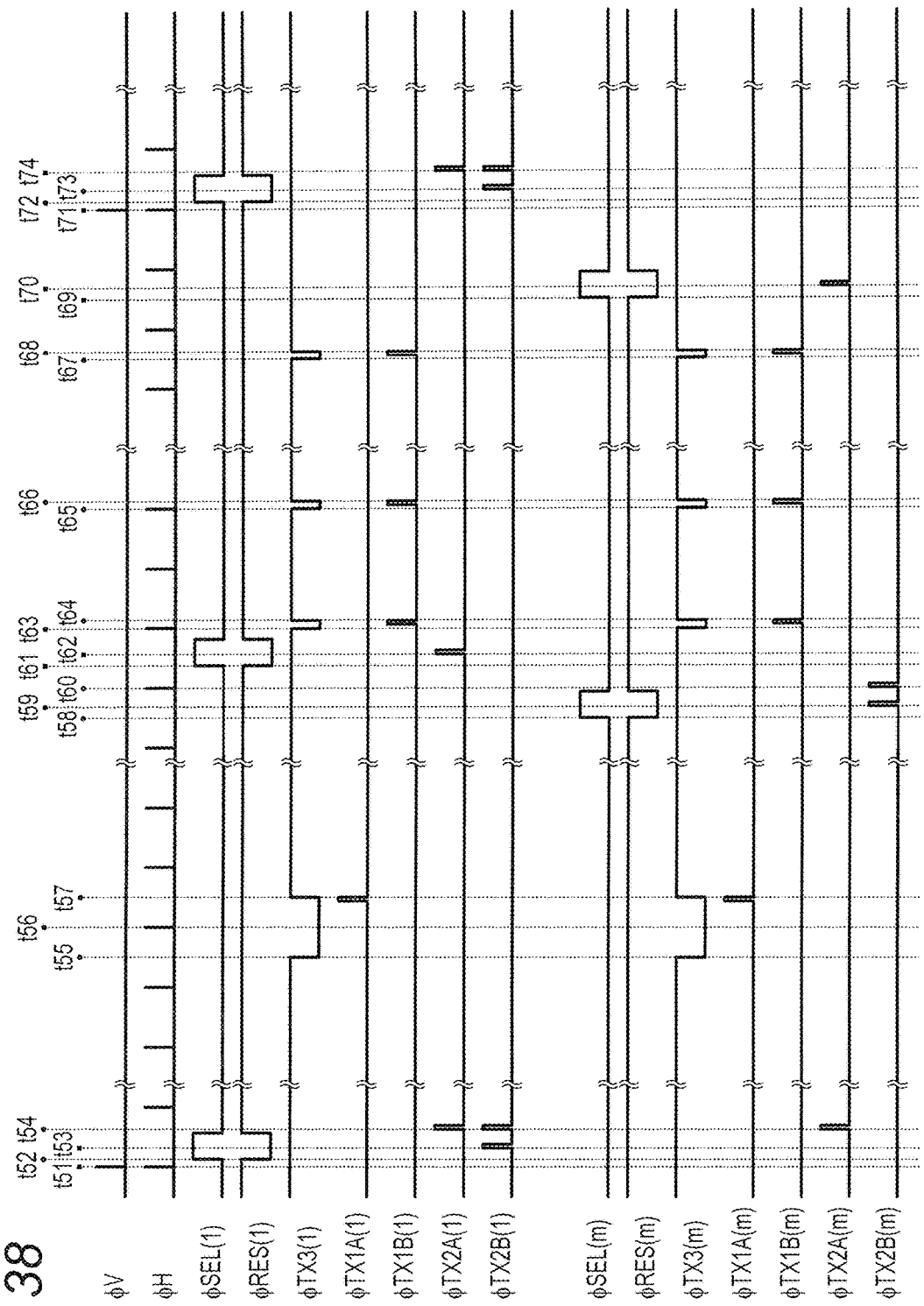
FIG. 38 is a timing chart illustrating a driving sequence of the imaging element in the second moving image/still image shooting mode.

Referring next to a timing chart of FIG. 38, an example of the control method for the imaging element 184 in a shooting period starting at time t51 in FIG. 37 will be described. Time t51 at which a vertical synchronization signal φV rises in FIG. 38 is the same as time t51 at which the vertical synchronization signal φV 650 rises in FIG. 37.

It is assumed here that the imaging element 184 has m rows of pixels in the vertical direction. In FIG. 38, the timings of the first row and the m-th row as the final row are illustrated among the m rows. In FIG. 38, a signal φVV is the vertical synchronization signal, and a signal φVH is the horizontal synchronization signal.

First, at time t51, the vertical synchronization signal φV and the horizontal synchronization signal φH supplied from the timing generation unit 189 are changed from the low level to the high level.

Then, at time t52 synchronized with the change of the vertical synchronization signal φV to the high level, a reset pulse φRES(1) for the first row supplied from the vertical scanning circuit 307 is changed from the high level to the low level. This causes the reset transistor 604 of each pixel 303 in the first row to be turned off to release the reset state of the floating diffusion region 608. Simultaneously, a select pulse φSEL(1) for the first row supplied from the vertical scanning circuit 307 is changed from the low level to the high level. This causes the select transistor 606 of each pixel 303 in the first row to be turned on to enable the readout of an image signal from each pixel 303 in the first row.

Then, at time t53, a transfer pulse φTX2B(1) for the first row supplied from the vertical scanning circuit 307 is changed from the low level to the high level. This causes the transfer transistor 602B of each pixel 303 in the first row to be turned on to transfer, to the floating diffusion region 608, signal charge of the second moving image accumulated in the signal holding unit 607B during the previous shooting period (a shooting period completed at time t51). As a result, a signal corresponding to a change in the potential of the floating diffusion region 608 is read out into the signal output line 623 via the amplifier transistor 605 and the select transistor 606. The signal read out into the signal output line 623 is supplied to an unillustrated readout circuit, and output to the outside as an image signal of the second moving image of each pixel in the first row (corresponding to the moving image readout period 666 in FIG. 37).

Then, at time t54, a transfer pulse φTX2B(1) for the first row and transfer pulses φTX2A (φTX2A(1), φTX2A(m)) for all rows supplied from the vertical scanning circuit 307 are changed from the low level to the high level. This causes the transfer transistor 602B of each pixel 303 in the first row and the transfer transistors 602A of the pixels 303 in all rows to be turned on. At this time, the reset pulses φRES (φRES(1), φRES(m)) in all rows are already changed to the high level, and hence the reset transistors 604 are in the on-state. Thus, the floating diffusion regions 608 of the pixels 303 in all rows, the signal holding units 607A of the pixels 303 in all rows, and the signal holding unit 607B of each pixel 303 in the first row are reset. At this time, the select pulse φSEL(1) in the first row is also changed to the low level, and each pixel 303 in the first row is returned to the unselected state.

Then, the accumulation period of the first moving image is performed from time t55. In this driving example, the number of accumulation periods of the first moving image in one shooting period is once. The center time of the accumulation period of the first moving image is the same in all rows (a time after a lapse of time Tc from the vertical synchronization signal 650), which is so set that the accumulation period will be completed before the readout period of the first row of the first moving image (still image readout period 665). Here, since the time Tc up to the center time of the accumulation period of the first moving image is the same in all rows, the start time and end time of the accumulation period of the first moving image with respect to the vertical synchronization signal 650 are set depending on a shutter speed T2 of the first moving image set by the person who performs shooting.

At time t55 back by time T2/2 from time t56 as the center time of the accumulation period of the first moving image, transfer pulses φTX3 (φTX3(1), φTX3(m)) for all rows are changed from the high level to the low level. This causes the transfer transistors 603 of the pixels 303 in all rows to be turned off to release the reset of the photodiodes 600 of the pixels 303 in all rows. Then, in the photodiodes 600 of the pixels 303 in all rows, the accumulation period of signal charge of the first moving image is started (corresponding to the still image accumulation period 661 in FIG. 37). Here, a period from time t51 to time t56 corresponds to time Tc in FIG. 37. Further, the accumulation of the signal charge of the first moving image is completed before the end of the readout period of the second moving image in the m-th row during a shooting period until time t51 (corresponding to the moving image readout period 666 in FIG. 37).

Then, immediately before time t57, transfer pulses φTX1A (φTX1A(1), φTX1A(m)) for all rows supplied from the vertical scanning circuit 307 are changed from the low level to the high level. This causes the transfer transistors 601A of the pixels 303 in all rows to be turned on to transfer, to the signal holding units 607A, signal charges accumulated in the photodiodes 600 of the pixels 303 in all rows (corresponding to the still image transfer period 662 in FIG. 37).

Then, at time t57, the transfer pulses φTX1A (φTX1A(1), φTX1A(m)) for all rows are changed from the high level to the low level. This causes the transfer transistors 601A of the pixels 303 in all rows to be turned off to complete the transfer of the signal charges accumulated in the photodiodes 600 to the signal holding units 607A.

A period from time t55 to time t57 corresponds to the accumulation time (shutter speed T2) of the first moving image in the shooting period that starts at time t51 in FIG. 37. In this driving example, since the number of accumulation periods of the first moving image in one shooting period is once, the accumulation time of the first moving image in one shooting period is the same as the accumulation period.

Then, at time t58, a reset pulse φRES(m) for the m-th row is changed from the high level to the low level. This causes the reset transistor 604 of each pixel 303 in the m-th row to be turned off to release the reset state of the floating diffusion region 608. Simultaneously, a select pulse φSEL(m) for the m-th row is changed from the low level to the high level. This causes the select transistor 606 of each pixel 303 in the m-th row to be turned on to enable the readout of an image signal from each pixel 303 in the m-th row.

Then, at time t59, a transfer pulse φTX2B(m) for the m-th row supplied from the vertical scanning circuit 307 is changed from the low level to the high level. This causes the transfer transistor 602B of each pixel 303 in the m-th row to be turned on to transfer, to the floating diffusion region 608, signal charge of the second moving image accumulated in the signal holding unit 607B during the previous shooting period (a shooting period until time t51 in FIG. 37). As a result, a signal corresponding to a change in the potential of the floating diffusion region 608 is read out into the signal output line 623 via the amplifier transistor 605 and the select transistor 606. The signal read out into the signal output line 623 is supplied to an unillustrated readout circuit, and output to the outside as an image signal of the second moving image of each pixel in the m-th row (corresponding to the moving image readout period 666 in FIG. 37).

Then, at time t60, the transfer pulse φTX2B(m) for the m-th row is changed from the low level to the high level. This causes the transfer transistor 602B of each pixel 303 in the m-th row to be turned on. At this time, the reset pulse φRES(m) for the m-th row is already changed to the high level, and hence the reset transistor 604 is in the on-state. Thus, the floating diffusion regions 608 of each pixel 303 in the m-th row and the signal holding unit 607B of each pixel 303 in the m-th row are reset. At this time, the select pulse φSEL(m) in the m-th row is also changed to the low level, and each pixel 303 in the m-th row is returned to the unselected state.

When the readout of a moving image as the second image in the previous shooting period that ends at time t51 is completed, the readout of the first moving image in the shooting period that start at time t51 (corresponding to the still image readout period 665 in FIG. 37) is started. Further, the accumulation of the second moving image (corresponding to the moving image accumulation period 663 in FIG. 37) is started.

At time t61, the reset pulse φRES(1) for the first row is changed from the high level to the low level. This causes the reset transistor 604 of each pixel 303 in the first row to be turned off to release the reset state of the floating diffusion region 608. Simultaneously, the select pulse φSEL(1) for the first row is changed from the low level to the high level. This causes the select transistor 606 of each pixel 303 in the first row to be turned on to enable the readout of an image signal from each pixel 303 in the first row.

Then, at time t62, the transfer pulse φTX2A(1) for the first row is changed from the low level to the high level. This causes the transfer transistor 602A of each pixel 303 in the first row to be turned on to transfer, to the floating diffusion region 608, signal charge accumulated in the signal holding unit 607A of each pixel 303 in the first row. As a result, a signal corresponding to a change in the potential of the floating diffusion region 608 is read out into the signal output line 623 via the amplifier transistor 605 and the select transistor 606 of each pixel 303 in the first row. The signal read out into the signal output line 623 is supplied to an unillustrated readout circuit, and output to the outside as an image signal of the first moving image in the first row (corresponding to the still image readout period 665 in FIG. 37).

Then, at time t63, the transfer pulses φTX3 (φTX3(1), φTX3(m)) for all rows are changed from the high level to the low level. This causes the transfer transistors 603 of the pixels 303 in all rows to be turned off to release the reset of the photodiodes 600 of the pixels 303 in all rows so as to start the accumulation of signal charge in the photodiodes 600 (corresponding to the moving image accumulation period 663 in FIG. 37).

Here, a time interval Tb between time t51, at which the vertical synchronization signal φV becomes the high level, and time t63, at which the accumulation of signal charge in the photodiodes 600 of the pixels 303 in all rows is started, is fixed.

Then, immediately before time t64, transfer pulses φTX1B (φTX1B(1), φTX1B(m)) for all rows supplied from the vertical scanning circuit 307 are changed from the low level to the high level. This causes the transfer transistors 601B of the pixels 303 in all rows to be turned on to transfer, to the signal holding units 607B, the signal charges accumulated in the photodiodes 600 of the pixels 303 in all rows corresponding to the moving image transfer period 664 in FIG. 37).

Then, at time t64, the transfer pulses φTX1B (φTX1B(1), φTX1B(m)) for all rows are changed from the high level to the low level. This causes the transfer transistors 601B of the pixels 303 in all rows to be turned off to complete the transfer of the signal charges accumulated in the photodiodes 600 to the signal holding units 607B.

A period from time t63 to time t64 corresponds to the accumulation time (=T2/8) in one accumulation period for the second moving image.

Similarly, at time t64, the transfer pulses φTX3 (φTX3(1), φTX3(m)) for all rows are changed from the low level to the high level. This causes the transfer transistors 603 of the pixels 303 in all rows to be turned on to put the photodiodes 600 of the pixels 303 in all rows into the reset state.

The second accumulation period of the second moving image is started at time t65 after a lapse of the time twice the interval Th of the horizontal synchronization signal φH from the start time t63 of the first accumulation period of the second moving image in the shooting period that starts at time t51.

Since the operation of the second accumulation period of the second moving image starting at time t65 and ending at time t66 is the same as the operation of the first accumulation period of the second moving image starting at time t63 and ending at time t64 as mentioned above, the description thereof will be omitted.

Here, in the operation of the first and the second accumulation periods of the second moving image, signal charges of the second moving image generated during these two accumulation periods are added up and held in the signal holding unit 607B.

Then, during a period from time t66 to time t67, the third to seventh accumulation periods of the second moving image are performed in the same manner as the period from time t63 to time t64 as mentioned above.

Then, the eighth accumulation period of the second moving image as the final period in one shooting period is started at time t67. Here, the start time t67 of the eighth accumulation period of the second moving image is set to the time after a lapse of the time T (=8×2×Th+Tb) from time t51 at which the vertical synchronization signal φV becomes the high level. Here, Th denotes the time interval of the horizontal synchronization signal φH, and Tb denotes a time interval between time t51 at which the vertical synchronization signal φV becomes the high level and time t63 at which the first accumulation period of the second moving image is started in the photodiode 600.

Since the operation of the eighth accumulation period of the second moving image starting at time t67 and ending at time t68 is the same as the operation of the first accumulation period of the second moving image starting at time t63 and ending at time t64 as mentioned above, the description thereof will be omitted.

The period from time t63 to time t68 is the period of accumulating signal charge for the second moving image in the shooting mode, which is performed during the readout period of the first moving image (a period from time t62 to time t70).

At time t69, at which the accumulation period of the second moving image is completed, the reset pulse φRES(m) for the m-th row is changed from the high level to the low level. This causes the reset transistor 604 of each pixel 303 in the m-th row to be turned off to release the reset state of the floating diffusion region 608. Simultaneously, the select pulse φSEL(m) for the m-th row is changed from the low level to the high level. This causes the select transistor 606 of each pixel 303 in the m-th row to be turned on to enable the readout of an image signal from each pixel 303 in the m-th row.

Then, at time t70, the transfer pulse φTX2A(m) for the m-th row is changed from the low level to the high level. This causes the transfer transistor 602A of each pixel 303 in the m-th row to be turned on to transfer, to the floating diffusion region 608, the signal charge accumulated in the signal holding unit 607A of each pixel 303 in the m-th row. As a result, a signal corresponding to a change in the potential of the floating diffusion region 608 is read out into the signal output line 623 via the amplifier transistor 605 and the select transistor 606 of each pixel 303 in the m-th row. The signal read out into the signal output line 623 is supplied to an unillustrated readout circuit, and output to the outside as an image signal of the first moving image of each pixel in the m-th row (corresponding to the still image readout period 665 in FIG. 37).

Then, at time t71, the vertical synchronization signal φV supplied from the timing generation unit 189 is changed from the low level to the high level to start the next shooting period.

As described above, in the second moving image/still image shooting mode, the accumulation period of the second moving image is performed in all rows at the same timing during readout period of the first moving image (still image readout period 665). Thus, a moving image without rolling distortion can be acquired. Further, since the accumulation period of the second moving image is set longer than the accumulation period of the first moving image, an image with less jerkiness can be acquired.

As described above, according to the present embodiment, "picture A" having the stop motion effect and "picture B" with less jerkiness can be acquired at the same time. The image presentation method as illustrated in the first embodiment can be used for two moving images difference in characteristics to provide an image suitable for viewing of both of moving image/still image when two or more images are shot at the same time and viewed using the single imaging element 184.

Alternative Embodiments

The present invention is not limited to the aforementioned exemplary embodiments, and various modifications can be made.

For example, the configuration of the imaging device described in the aforementioned embodiments is just an example, and an imaging device to which the present invention can be applied is not limited to the configuration illustrated in FIG. 1A to FIG. 2. Further, the circuit configuration of each unit of the imaging element is not limited to the configuration illustrated in FIG. 3, FIG. 8, FIG. 11, FIG. 32, or the like.

Further, in the above first embodiment, the example of performing crosstalk correction on "picture A" and "picture B" is illustrated as the preferred mode, but the crosstalk correction is not necessarily required.

Further, in the above first embodiment, the example of shooting "picture A" and "picture B" at the same frame rate is illustrated, "picture A" and "picture B" are not necessarily required to be at the same frame rate. In this case, for example, at least one of plural frames of "picture A" shot within one frame period of "picture B" can be associated with the frame of "picture B."

Further, in the above third embodiment, the accumulation period of the first moving image is performed once, and the accumulation period of the second moving image is performed sixteen times or eight times. However, the number of accumulation periods is selected appropriately according to the shooting conditions and the like, and not limited thereto. For example, the number of accumulations of the first moving image may be at least once, or may be twice or more. Further, the number of accumulations of the second moving image may be at least twice or more.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A playback device comprising:
one or more processors; and
a memory including instructions stored thereon that, when executed by the one or more processors, cause the playback device to function as:
 a playback unit that playbacks first image files which are acquired based on a first signal charge generated during a first accumulation time and second image files which are acquired based on a second signal charge generated during a second accumulation time and associated with the first image files,
wherein the playback unit playbacks the first image files at a start of playbacking and playbacks the second image files when a pause instruction is received,
wherein the second accumulation time overlaps with at least part of the first accumulation time,
wherein the playback unit playbacks the first image files and the second image files acquired by an imaging device including a plurality of pixels, each of the plurality of pixels including a first transistor and a second transistor, and
wherein the playback unit acquires the first image files based on the first signal charge output via the first transistor and the second image files based on the second signal charge output via the second transistor.

2. The playback device according to claim 1, wherein the first image files are still image data, and the second image files are moving image data.

3. The playback device according to claim 1, wherein the second accumulation time is relatively longer than the first accumulation time, and the second image files are recorded in synch with the first image files during a synchronization period including the first accumulation time.

4. The playback device according to claim 1, wherein an exposure condition for acquiring the first image files and an exposure condition for acquiring the second image files are different from each other.

5. The playback device according to claim 1, wherein the second accumulation time is relatively longer than the first accumulation time.

6. The playback device according to claim 1,
wherein each of the plurality of pixels including a first photoelectric conversion unit corresponding to the first transistor and a second photoelectric conversion unit corresponding to the second transistor, and
wherein the playback unit acquires the first image files based on the first signal charge generated by the first photoelectric conversion unit and the second image files based on the second signal charge generated by the second photoelectric conversion unit.

7. The playback device according to claim 1,
wherein each of the plurality of pixels including one photoelectric conversion unit, a first signal holding unit corresponding to the first transistor and a second signal holding unit corresponding to the second transistor, and
wherein the playback unit acquires the first image files based on signals generated by transferring a signal charge, generated by the photoelectric conversion unit during one shooting period, to the first signal holding unit at least once, and the second image files based on signals generated by transferring a signal charge, generated by the photoelectric conversion unit during the one shooting period, to the second signal holding unit at least twice or more and adding up the signal charges.

8. The playback device according to claim 1, wherein the first image files and the second image files are stored in storage on a network.

9. The playback device according to claim 1, wherein the first image files and the second image files are associated to each other with time codes therein.

10. The playback device according to claim 1, wherein the playback unit switches between playbacking of the first image files and playbacking of the second image files in accordance with a frame rate.

11. The playback device according to claim 1, wherein the first image files and the second image files are stored in one file including synchronization information for synchronizing the first image files and the second image files frame by frame.

* * * * *